(12) United States Patent
Takeuchi et al.

(10) Patent No.: US 7,818,479 B2
(45) Date of Patent: Oct. 19, 2010

(54) INTERFACE APPARATUS AND PACKET TRANSFER METHOD

(75) Inventors: Katsuhiko Takeuchi, Kawasaki (JP);
Shin-ichi Utsunomiya, Kawasaki (JP);
Nobuyuki Myoga, Kawasaki (JP);
Sumie Matsubayashi, Kawasaki (JP);
Hirohide Sugahara, Kawasaki (JP)

(73) Assignee: Toshiba Storage Device Corporation, Tokyo (JP)

( * ) Notice: Subject to any disclaimer, the term of this patent is extended or adjusted under 35 U.S.C. 154(b) by 1974 days.

(21) Appl. No.: 10/777,937

(22) Filed: Feb. 12, 2004

(65) Prior Publication Data

US 2005/0080842 A1 Apr. 14, 2005

(30) Foreign Application Priority Data

Sep. 26, 2003 (JP) ............................. 2003-334986

(51) Int. Cl.
| G06F 3/00 | (2006.01) |
| G06F 5/00 | (2006.01) |
| G06F 13/00 | (2006.01) |
| G06F 15/16 | (2006.01) |

(52) U.S. Cl. ............................. 710/59; 710/32; 710/45; 710/52; 709/234

(58) Field of Classification Search .................... 710/32, 710/59, 45, 52; 709/234
See application file for complete search history.

(56) References Cited

U.S. PATENT DOCUMENTS 6,323,867 B1 * 11/2001 Nookala et al. ............. 345/522
6,765,889 B1 * 7/2004 Ludwig ....................... 370/331
2002/0144004 A1 * 10/2002 Gaur et al. ................... 709/310

FOREIGN PATENT DOCUMENTS

| JP | 63-185252 | 7/1988 |
| JP | 03-201152 | 9/1991 |
| JP | 07-098633 | 4/1995 |
| JP | 07-264262 | 10/1995 |
| JP | 11-298458 | 10/1999 |
| JP | 11-355495 | 12/1999 |
| JP | 2001-117724 | 4/2001 |
| JP | 2001-197067 | 7/2001 |
| JP | 2001-229115 | 8/2001 |
| JP | 2001-510960 | 8/2001 |
| JP | 2001-325204 | 11/2001 |
| JP | 2002-051072 | 2/2002 |
| JP | 3087350 | 5/2002 |
| JP | 2003-6144 | 1/2003 |
| JP | 2003-023471 | 1/2003 |
| WO | WO 99/04539 | 1/1999 |

* cited by examiner

*Primary Examiner*—Alford W Kindred
*Assistant Examiner*—Farley J Abad
(74) *Attorney, Agent, or Firm*—Greer, Burns & Crain, Ltd.

(57) ABSTRACT

A device interface circuit unit transfers a command and data in packet format between the unit and the host. A transport layer is provided with a receive FIFO, a command detection circuit and a send FIFO, and an application layer is provided with a receive task file register and a send task control file register. An available time is generated for each break point of a packet during data transfer in order to receive another command packet from the host. When the command packet is received from the host in the available time during data transfer, the data transfer is suspended and the received command is decoded to execute a process for continuing or canceling the data transfer, after which the data transfer is resumed.

12 Claims, 45 Drawing Sheets

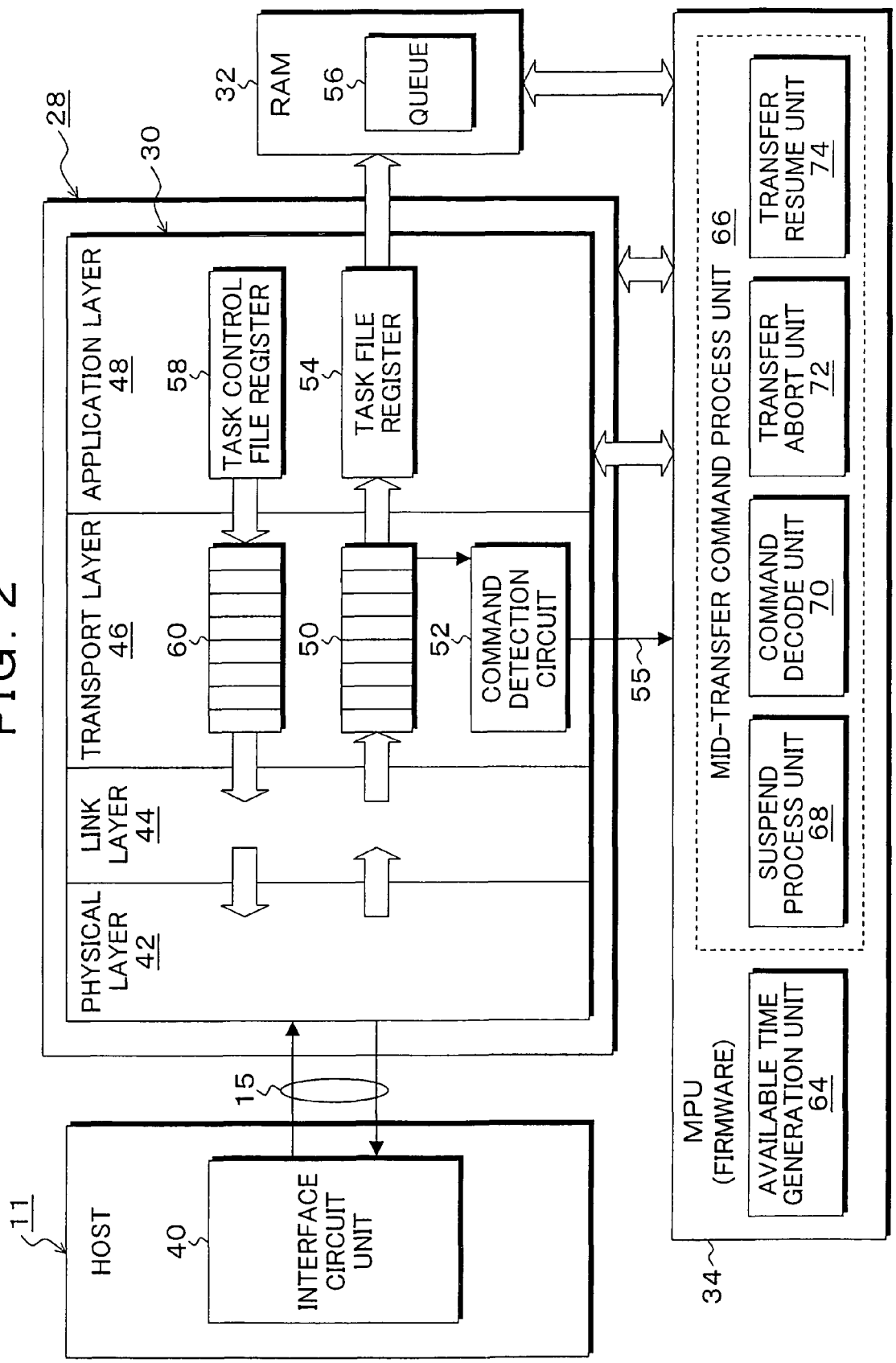

| | 0 | 1 | 2 | 3 | 4 |
|---|---|---|---|---|---|
| | Features | Command | C R R Reserved(0) | FIS Type(27h) |
| | Dev/Head | Cyl High | Cyl Low | Sector Number |
| | Features(exp) | Cyl High(exp) | Cyl Low(exp) | Sector Num(exp) |
| | Control | Reserved(0) | Sector Count(exp) | Sector Count |
| | Reserved(0) | Reserved(0) | Reserved(0) | Reserved(0) |

| | 0 | 1 | 2 | 3 | 4 |
|---|---|---|---|---|---|
| | FIS Type(34h) | Reserved(0) | R | I | R | Status | Error |
| | Sector Number | Cyl Low | Cyl High | Dev/Head |
| | Sector Num(exp)(0) | Cyl Low(exp) | Cyl High(exp) | Reserved(0) |
| | Sector Count | Sector Count(exp) | Reserved(0) | Reserved(0) |
| | Reserved(0) | Reserved(0) | Reserved(0) | Reserved(0) |

FIG. 10

| | | | | | | | |
|---|---|---|---|---|---|---|---|
| 0 | Reserved(0) | Reserved(0) | R | I | D | Reserved(0) | FIS Type(41h) |
| 1 | DMA Buffer Identifier Low | | | | | | |
| 2 | DMA Buffer Identifier High | | | | | | |
| 3 | Reserved(0) | | | | | | |
| 4 | DMA Buffer Offset | | | | | | |
| 5 | DMA Transfer Count | | | | | | |
| 6 | Reserved(0) | | | | | | |

| | Error | R | Status Hi | R | Status Lo | R | I | R | Reserved(0) | FIS Type(A1h) |
|---|---|---|---|---|---|---|---|---|---|---|
| 0 | | | | | | | | | | |
| 1 | Reserved(0) | | | | | | | | | |

174

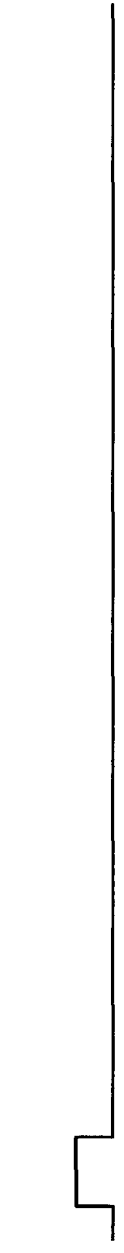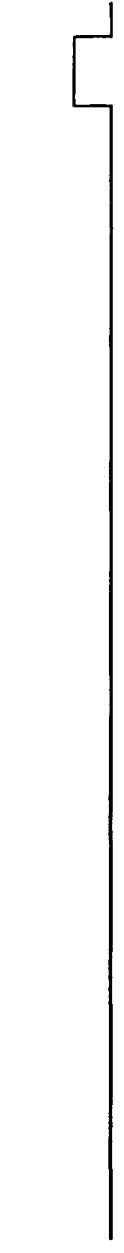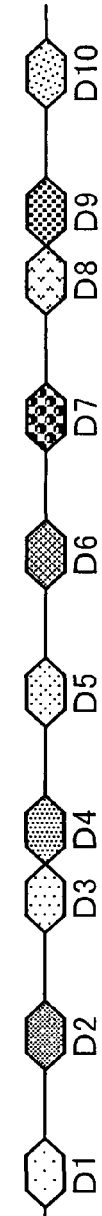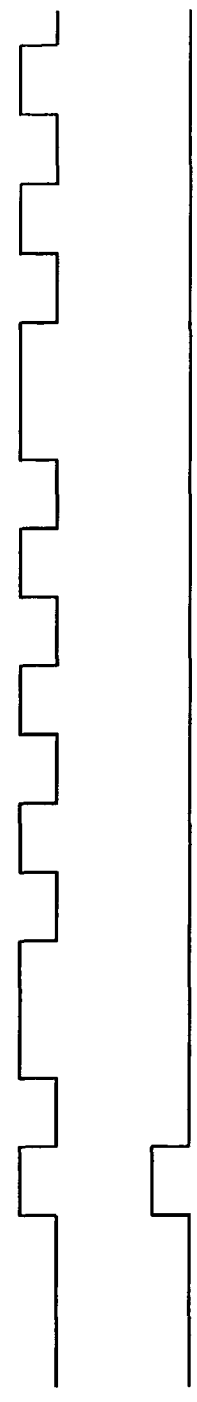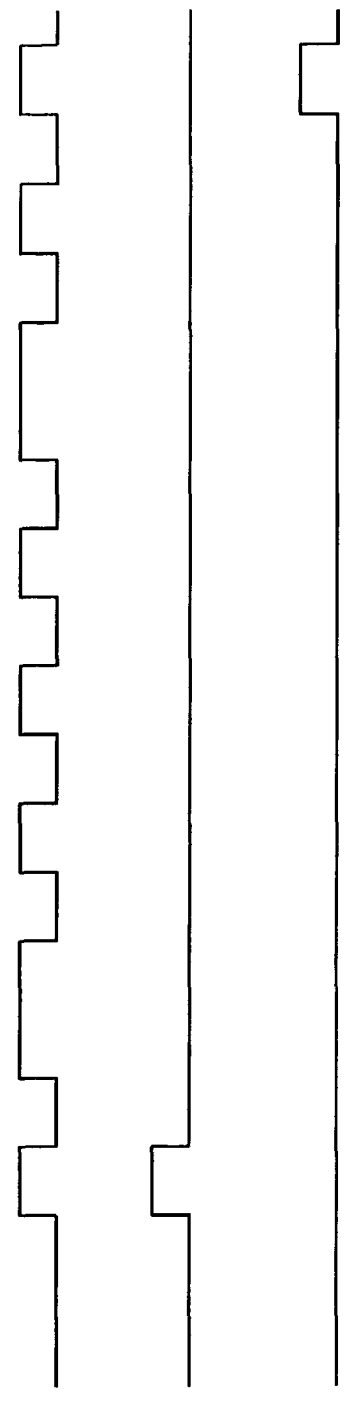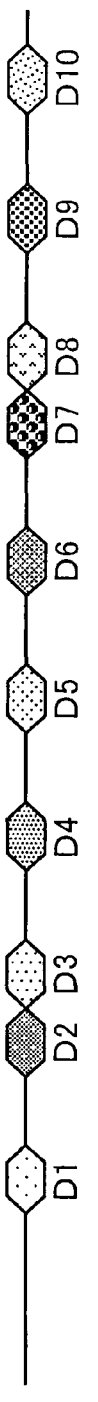
FIG. 19A INPUT VALID SIGNAL
FIG. 19B INPUT HEAD SIGNAL
FIG. 19C INPUT TAIL SIGNAL
FIG. 19D INPUT DATA
FIG. 19E OUTPUT VALID SIGNAL
FIG. 19F OUTPUT HEAD SIGNAL
FIG. 19G OUTPUT TAIL SIGNAL
FIG. 19H OUTPUT DATA

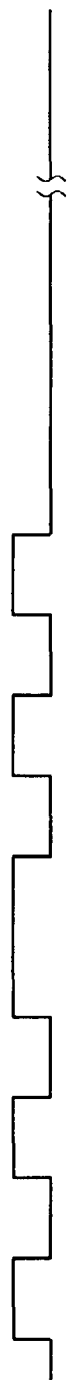
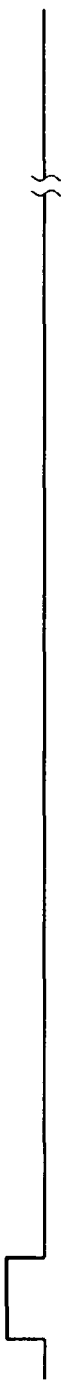
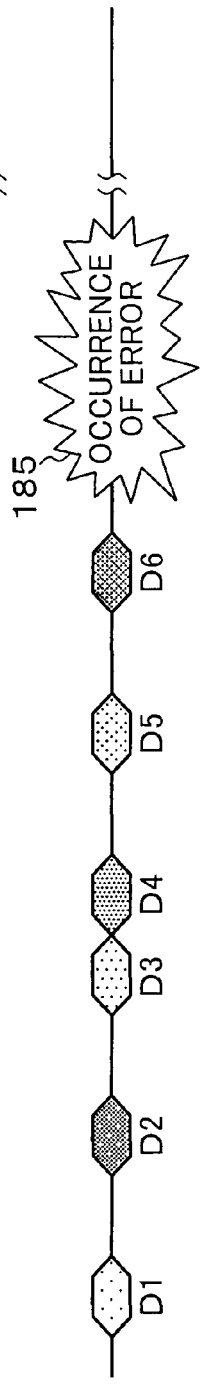
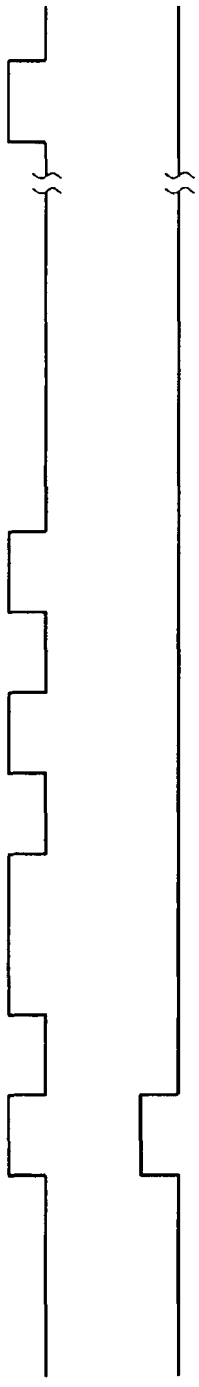
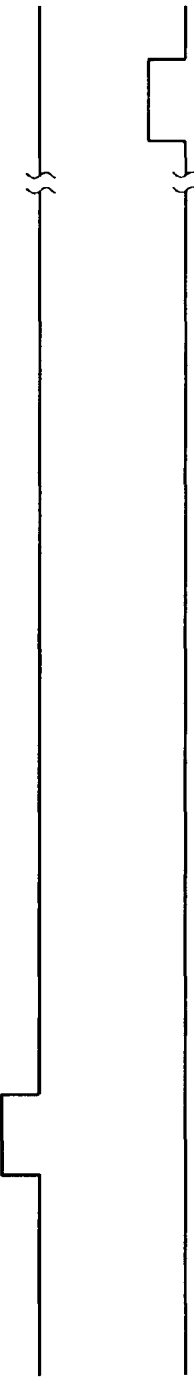
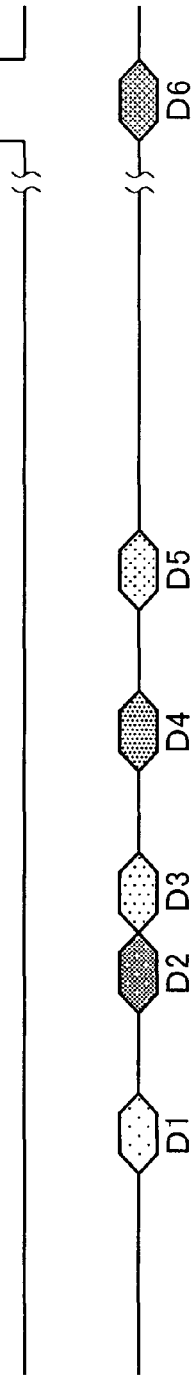
FIG. 20A INPUT VALID SIGNAL
FIG. 20B INPUT HEAD SIGNAL
FIG. 20C INPUT TAIL SIGNAL
FIG. 20D INPUT DATA
FIG. 20E OUTPUT VALID SIGNAL
FIG. 20F OUTPUT HEAD SIGNAL
FIG. 20G OUTPUT TAIL SIGNAL
FIG. 20H OUTPUT DATA

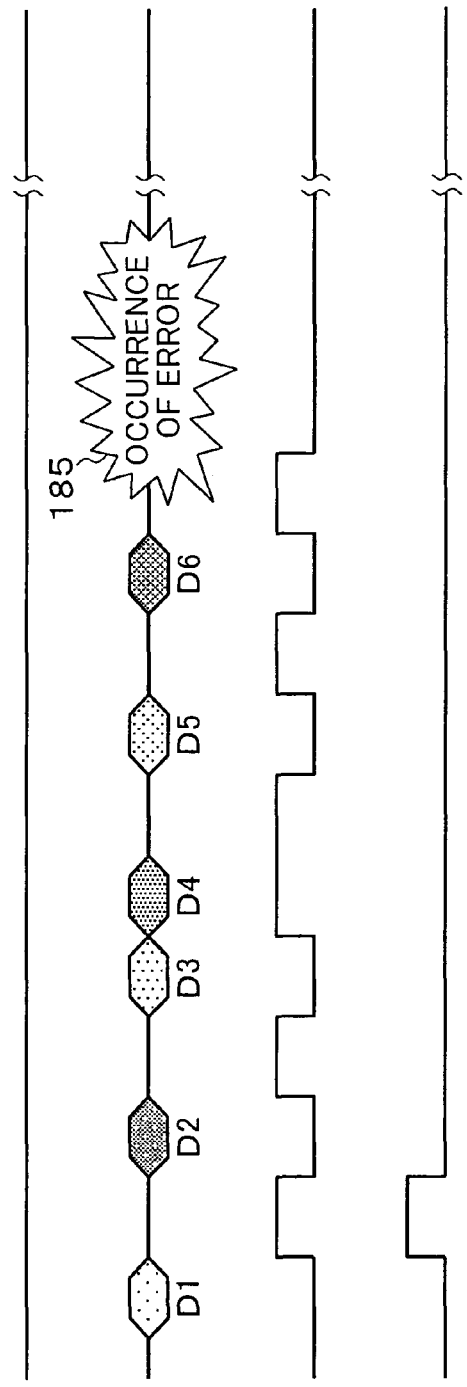
FIG. 21A INPUT VALID SIGNAL
FIG. 21B INPUT HEAD SIGNAL
FIG. 21C INPUT TAIL SIGNAL
FIG. 21D INPUT DATA
FIG. 21E OUTPUT VALID SIGNAL
FIG. 21F OUTPUT HEAD SIGNAL
FIG. 21G OUTPUT TAIL SIGNAL
FIG. 21H OUTPUT DATA

| BIT | 15 | 14 | 13 | 12 ............ 0 |
|---|---|---|---|---|
| FUNCTION | RRDY INHIBITION | RRDY INHIBITION CANCELLATION | POWER MODE | NUMBER OF PACKETS |
| | 204 | 206 | 208 | 210 |

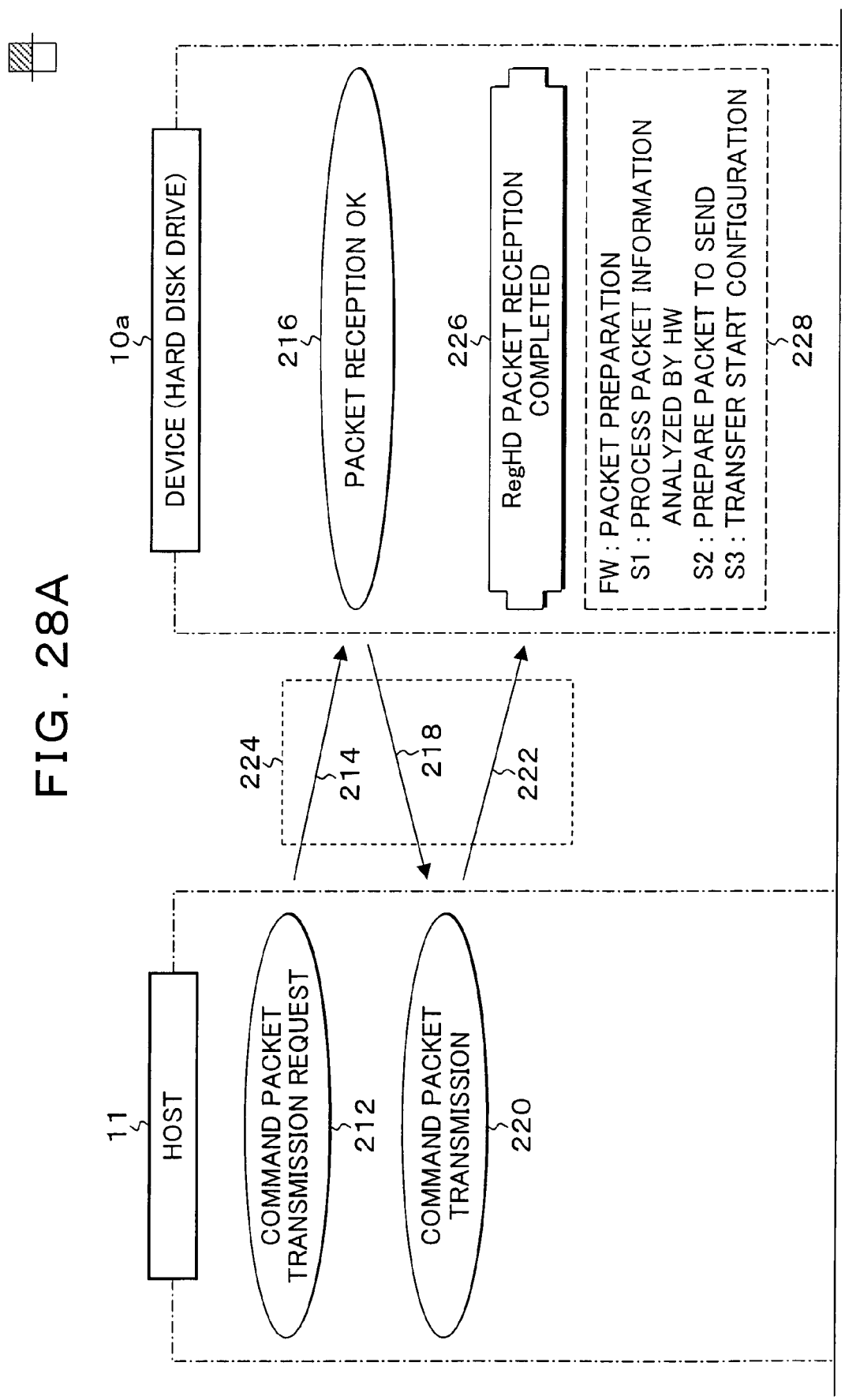

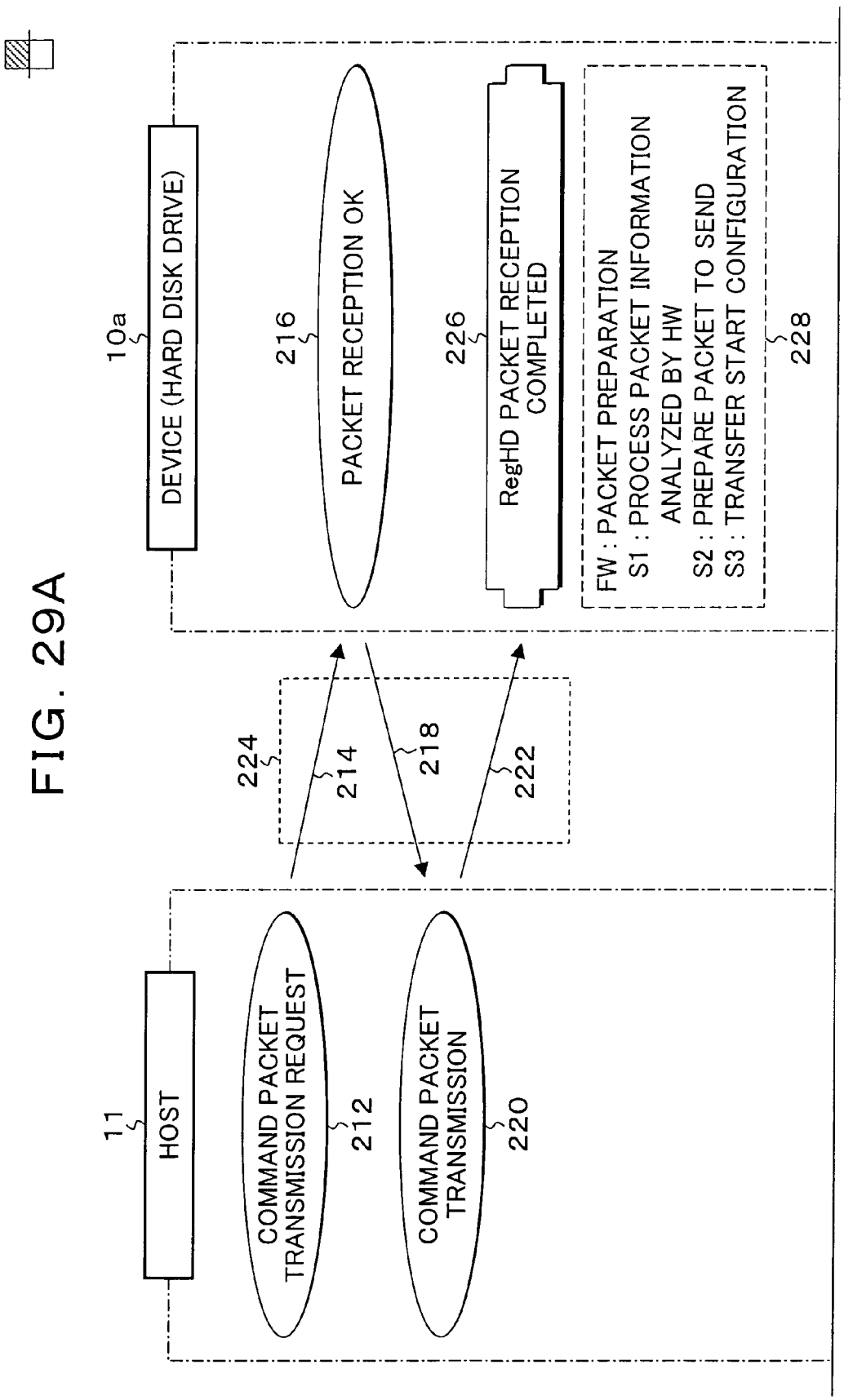

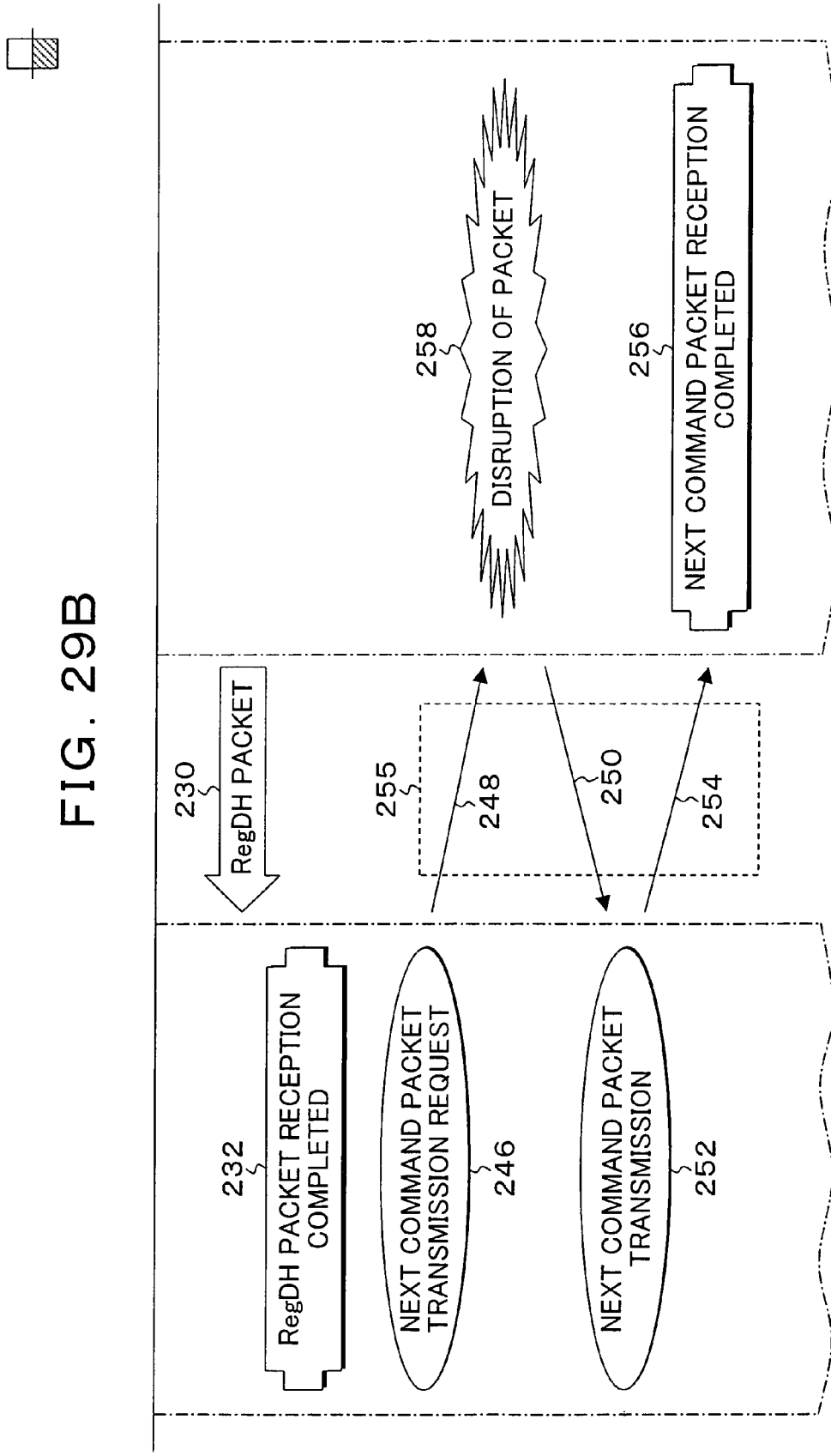

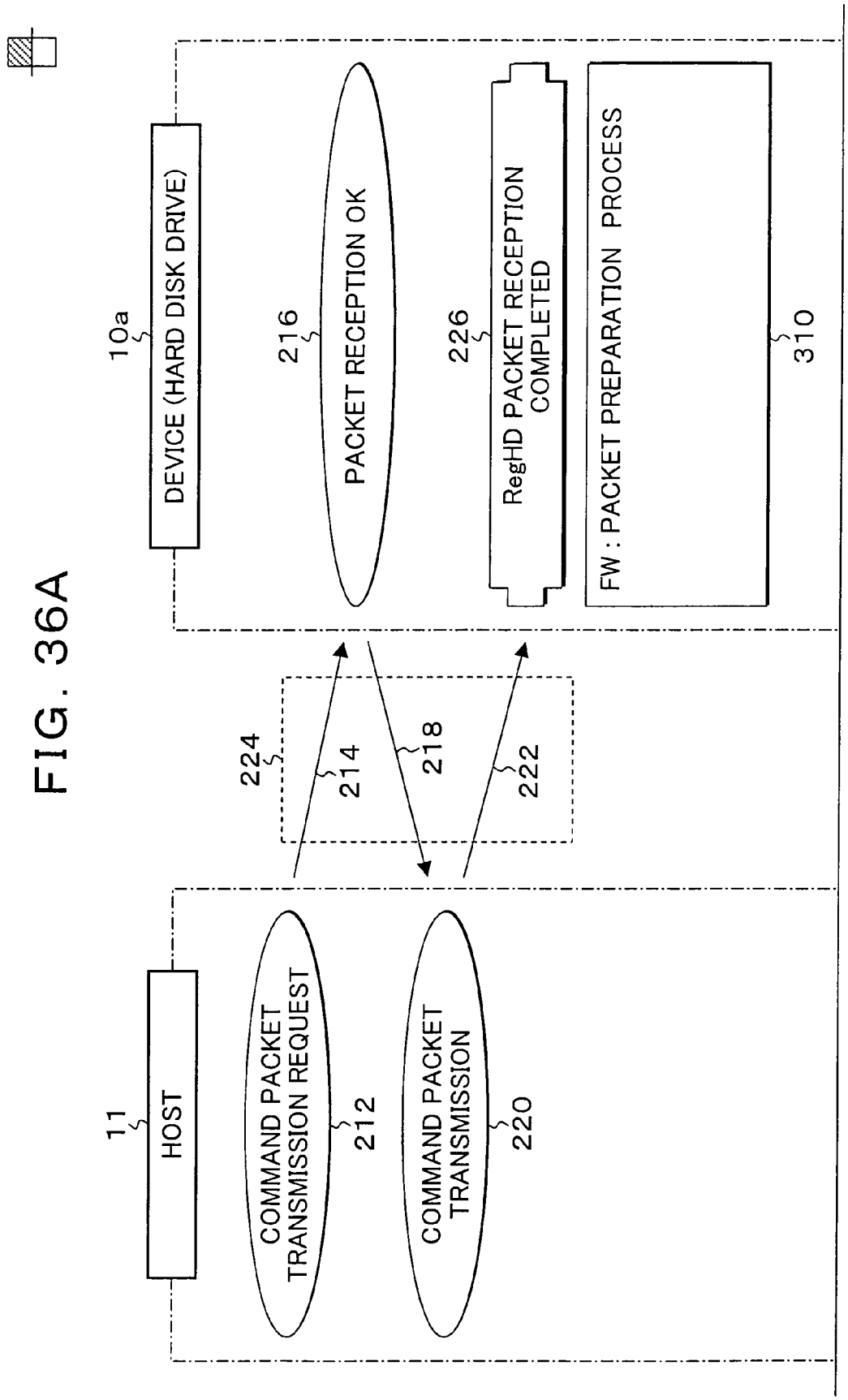

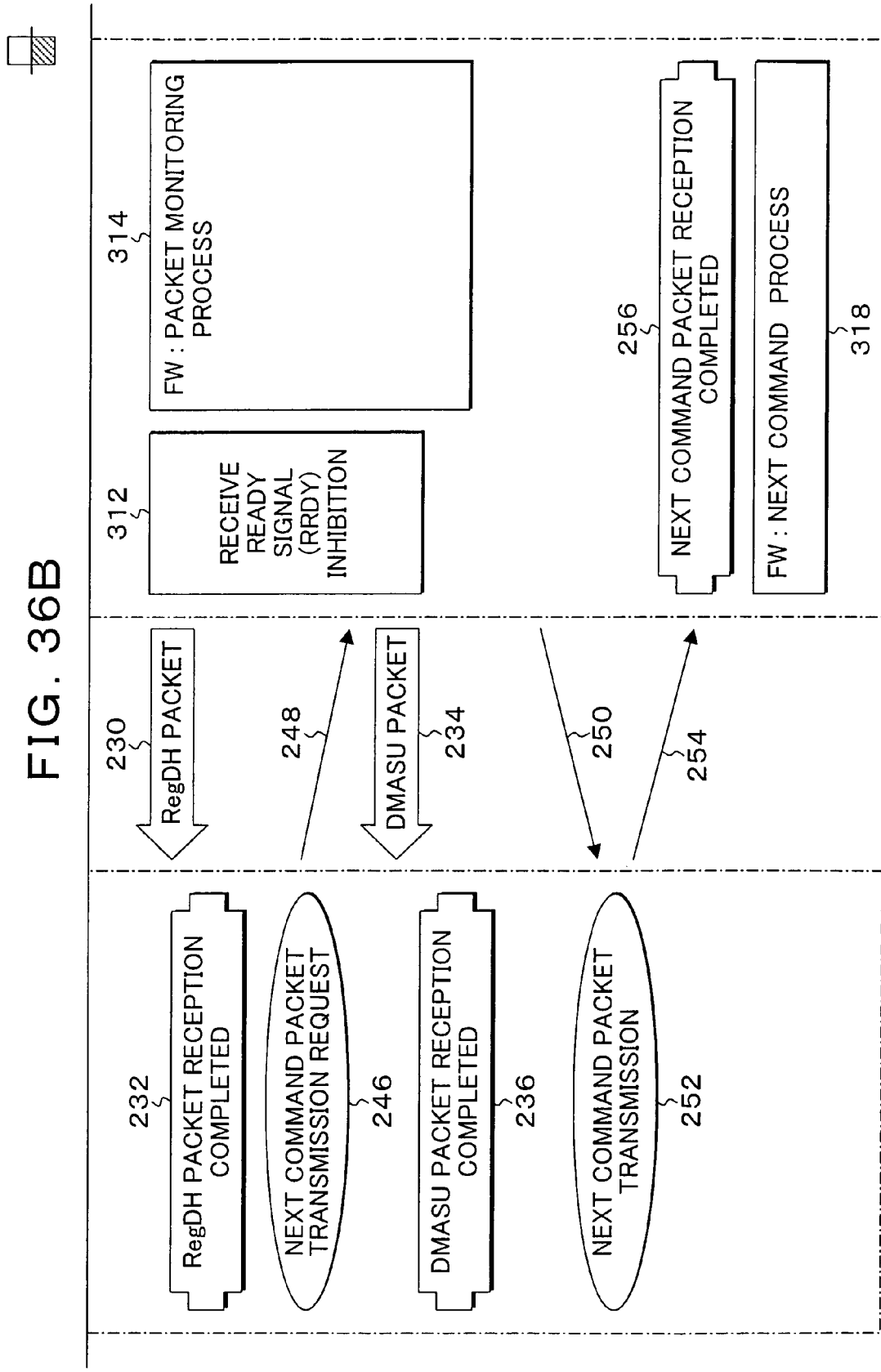

INTERFACE APPARATUS AND PACKET TRANSFER METHOD

BACKGROUND OF THE INVENTION

1. Field of the Invention

The present invention relates generally to an interface apparatus and a packet transfer method for transferring commands and data in the form of packets between a host and a device, and, more particularly, to an interface apparatus and a packet transfer method for transferring the packets by connecting the host and the device via a serial transmission line.

2. Description of the Related Arts

Traditionally, an ATA interface (AT Attachment Interface) using a parallel transmission line has been a mainstream of an interface between a host computer and a device such as a hard disk drive, but recently, in order to accommodate for the speeding up of interfaces and the expansion of capacities of hard disk drives, practical application of the serial ATA interface (SATA) using a serial transmission line is being promoted.

However, for a write access or a read access from a host to a hard disk drive which is on a device side in the conventional parallel ATA interface, even if the host issues an new command during a series of transmission sequences from the issuance of a write command or a read command to the termination of data transfer, the command newly issued by the host has to wait until the data transfer based on the command is completed. This is because the conventional parallel ATA interface employs a configuration in which the host and the device refer to the same task file register, and since only one (1) task file register is disposed at an interface circuit on the device side, if a next command is accepted during data transfer, the content of the task file register executing a current command will be destroyed. For this reason, the next command can not be accepted during data transfer, and in order to accept the next command during data transfer, only one approach is to forcibly cancel the data transfer in execution to accept the next command. Also in the serial ATA interface which is currently coming into practical use, basically the same concept as that of the conventional parallel ATA interface is diverted, and therefore, a single task file register is disposed on the device side. Thus, in the serial ATA interface as well, the next command can not be received during data transfer, as in the case of the conventional parallel ATA interface. Further, in the conventional parallel ATA interface, if the method is employed such that the currently executed data transfer is cancelled to accept the next command, since the determination to cancel the command processing is performed by hardware, only the cases assumed in advance can be accommodated, and therefore there is a problem that flexibility to the cases which are not assumed is less than when firmware performs it, and exactly the same problem will occur when this is diverted to the serial ATA Interface.

SUMMARY OF THE INVENTION

It is therefore the object of the present invention to provide a device interface apparatus and a packet transfer method which can accept the next command without cancellation of the currently executed command during data transfer.

(Command Reception during Data Transfer)

The present invention provides a device interface apparatus having a physical layer, a link layer, a transport layer and an application layer, for transferring commands and data in packet format by serial transmission between a device and a host, the interface apparatus comprising a receive FIFO disposed at the transport layer and storing on a first-in first-out basis a command packet or a data packet received from the host via the physical layer and the link layer; a command detection circuit detecting the command stored in the receive FIFO during data transfer and outputting a command detection signal (an interrupt signal); a receive task file register disposed at the application layer and loading the command content of the receive FIFO; a send task file register disposed at the application layer and loading a command or data for packet sending; a send FIFO disposed at the transport layer and storing on a first-in first-out basis the content of the send task file register, the send FIFO causing a command packet or a data packet to be sent to the host via the link layer and the physical layer; an available time generation unit generating an available time for receiving another command packet from the host during data transfer; and a mid-transfer command processing unit, when a command packet is received from the host during the available time, suspending the data transfer to decode the received command for execution of processing and thereafter resuming the data transfer.

The mid-transfer command processing unit is firmware implemented by execution of a program, and the mid-transfer command processing unit comprises a suspend processing unit, when the command detection signal is output from the command detection circuit for the command packet received during the available time and stored in the receive FIFO, suspending the currently executed data transfer and saving parameters upon the suspension into a memory; a command decode unit decoding the command content loaded from the receive FIFO into the receive task file register; a data transfer abort unit, when abortion of the data transfer is determined by the command decode unit, discarding the currently executed command and the saved parameters and terminating the data transfer; and a transfer resume unit, when continuance of the data transfer is determined by the command decode unit, throwing the command content of the receive task file register into a command queue, storing command reception response information into the send FIFO and sending a command reception response packet to the host via the link layer and the physical layer, the transfer resume unit thereafter releasing the suspend of the data transfer and setting the saved parameters to resume the data transfer.

According to such a device interface apparatus of the invention, so as to receive a next command by generating an available time at a packet break point at which transfer of one (1) data packet is terminated during the data packet transfer, a packet receive FIFO, a command detection circuit and send FIFO are added to a transport layer; two (2) task file registers, which are a receive task file register (task file register TFR) and a send task file register (task control file register TCR) are added to an application layer; an interruption is generated in firmware when the next command is detected at the command detection circuit even during data transfer; the currently executed command process is suspended such that it can be resumed as a command is stored in the packet receive FIFO; and the next command content of the packet receive FIFO is loaded only to the receive task file register according to an instruction of the firmware. In this way, the next command can be accepted without destroying a content of the send task file register during data transfer, and for example, a command process for continuing or canceling the data transfer can be executed.

An available time generation unit detects termination of transfer of a data packet which is sent to or received by the host and sets certain available time.

The transfer resume unit rewrites the data stored in the send FIFO upon suspending of data transfer into response data to the received command for transfer of a command reception response packet, the transfer resume unit thereafter setting the saved parameters to resume the data transfer.

Another aspect of the present invention provides a device interface apparatus for transferring commands and data in packet format by serial transmission between a device and a host, the interface apparatus comprising:

a receive FIFO storing on a first-in first-out basis a command packet or a data packet received from the host;

a command detection circuit detecting the command stored in the receive FIFO during data transfer and outputting a command detection signal;

a receive task file register loading the command content of the receive FIFO;

a send task file register loading a command or data for packet sending;

a send FIFO storing on a first-in first-out basis the content of the send task file register and causing a command packet or a data packet to be sent to the host;

an available time generation unit generating an available time for receiving another command packet from the host during data transfer; and a mid-transfer command processing unit, when a command packet is received from the host during the available time, suspending the data transfer to decode the received command for execution of processing and thereafter resuming the data transfer.

In this case as well, the mid-transfer command processing unit is firmware implemented by execution of a program, and comprises a suspend processing unit, when the command detection signal is output from the command detection circuit for the command packet received during the available time and stored in the receive FIFO, suspending the currently executed data transfer and saving parameters upon the suspension into a memory; a command decode unit decoding the command content loaded from the receive FIFO into the receive task file register; a data transfer abort unit, when abortion of the data transfer is determined by the command decode unit, discarding the currently executed command and the saved parameters and terminating the data transfer; and a transfer resume unit, when continuance of the data transfer is determined by the command decode unit, throwing the command content of the receive task file register into a command queue, storing command reception response information into the send FIFO and sending a command reception response packet to the host, the transfer resume unit thereafter releasing the suspend of the data transfer and setting the saved parameters to resume the data transfer.

The present invention provides a packet transfer method for a device interface. The device interface to which the packet transfer method of the invention is applied, has a physical layer, a link layer, a transport layer and an application layer, and includes a receive FIFO disposed at the transport layer and storing on a first-in first-out basis a command packet or a data packet received from the host via the physical layer and the link layer; a command detection circuit detecting the command stored in the receive FIFO during data transfer and outputting a command detection signal (an interrupt signal); a receive task file register disposed at the application layer and loading the command content of the receive FIFO; a send task file register disposed at the application layer and loading a command or data for packet sending; and a send FIFO disposed at the transport layer and storing on a first-in first-out basis the content of the send task file register, the send FIFO causing a command packet or a data packet to be sent to the host via the link layer and the physical layer.

The packet transfer method of the present invention comprises:

an available time generation step generating an available time for receiving another command packet from the host during data transfer; and a mid-transfer command processing step, when a command packet is received from the host during the available time, suspending the data transfer to decode the received command for execution of processing and thereafter resuming the data transfer.

The mid-transfer command processing step comprises:

a suspend processing step, when the command detection signal is output from the command detection circuit for the command packet received during the available time and stored in the receive FIFO, suspending the currently executed data transfer and saving parameters upon the suspension into a memory;

a command decode step decoding the command content loaded from the receive FIFO into the receive task file register;

a data transfer abort step, when abortion of the data transfer is determined by the command decode step, discarding the currently executed command and the saved parameters and terminating the data transfer; and a transfer resume step, when continuance of the data transfer is determined by the command decode step, throwing the command content of the receive task file register into a command queue, storing command reception response information into the send FIFO, sending a command reception response packet to the host via the link layer and the physical layer, thereafter releasing the suspend of the data transfer and setting the saved parameters to resume the data transfer.

In another aspect of the packet transfer method of the present invention, the device interface includes a receive FIFO storing on a first-in first-out basis a command packet or a data packet received from the host; a command detection circuit detecting the command stored in the receive FIFO during data transfer and outputting a command detection signal (an interrupt signal); a receive task file register loading the command content of the receive FIFO; a send task file register loading a command or data for packet sending; and a send FIFO storing on a first-in first-out basis the content of the send task file register and causing a command packet or a data packet to be sent to the host; and the method comprises:

an available time generation step generating an available time for receiving another command packet from the host during data transfer; and a mid-transfer command processing step, when a command packet is received from the host during the available time, suspending the data transfer to decode the received command for execution of processing and thereafter resuming the data transfer.

The mid-transfer command processing step comprises:

a suspend processing step, when the command detection signal is output from the command detection circuit for the command packet received during the available time and stored in the receive FIFO, suspending the currently executed data transfer and saving parameters upon the suspension into a memory;

a command decode step decoding the command content loaded from the receive FIFO into the receive task file register;

a data transfer abort step, when abortion of the data transfer is determined by the command decode step, discarding the currently executed command and the saved parameters and terminating the data transfer; and a transfer resume step, when continuance of the data transfer is determined by the command decode step, throwing the command content of the receive task file register into a command queue, storing command reception response information into the send FIFO, sending a command reception response packet to the host, thereafter releasing the suspend of the data transfer and setting the saved parameters to resume the data transfer.

(Conclusion of Packet Transfer upon Error)

Also, another aspect of the invention provides an interface apparatus for concluding the packet transfer of data remaining unfinished so far and avoiding a malfunction that the transfer is continuously halted, if data input to the interface is stopped by an error during data transfer.

To this end, the present invention is characterized by the device interface apparatus having a physical layer, a link layer, a transport layer and an application layer, for transferring commands and data in packet format by serial transmission between a device and a host, the interface apparatus comprising a receive FIFO disposed at the transport layer and storing on a first-in first-out basis a command packet or a data packet received from the host via the physical layer and the link layer; a receive task file register disposed at the application layer and loading the command content of the receive FIFO; a send task file register disposed at the application layer and loading a command or data for packet sending; a send FIFO disposed at the transport layer and storing on a first-in first-out basis the content of the send task file register, the send FIFO causing a command packet or a data packet to be sent to the host via the link layer and the physical layer; an I/O control unit inputting and outputting data such that predefined one unit of data stays in the send FIFO at all times, the I/O control unit outputting a head signal in synchronism with input and output of headmost data of the packet and outputting a tail signal in synchronism with input and output of endmost data of the packet; and an error-terminated transfer control unit, when data input is halted by an error during data transmission, outputting to the link layer the one unit of data staying in the send FIFO together with the tail signal and causing a data packet to be transferred to the host.

Herein, if the tail signal is not present, the I/O control unit forces one (1) unit of data to stay in the send FIFO, and if the tail signal is present, it forces the data not to stay. Also, corresponding to the serial ATA interface, the I/O control unit forces minimum unit of data, for example one (1) double word data (four (4) bytes data) for the serial ATA interface, to stay in the send FIFO.

According to such an interface apparatus of the invention, if an uncorrectable error for which error-correction of the data can not be performed occurs during input of the read data for a packet transfer to the interface circuit unit in a hard disk drive which is the device side to the host and the data input is stopped, since the last data before the input is stopped by the error remains in the send FIFO, by outputting this remaining data as the last data to the link layer with the tail signal based on the detection of the error, it is possible to conclude the packet data and to transfer the packet of the data obtained until occurrence of the error to the host, therefore the problem that the packet transfer is continuously halted in the middle by an error is solved.

The invention provides a packet transfer method for a device interface for concluding the packet transfer remaining unfinished so far and avoiding transfer to be halted, even if data input to the interface is stopped by an error.

The present invention is characterized by a packet transfer method for a device interface having a physical layer, a link layer, a transport layer and an application layer, the device interface transferring commands and data in packet format by serial transmission between a device and a host, the device interface including a receive FIFO disposed at the transport layer and storing on a first-in first-out basis a command packet or a data packet received from the host via the physical layer and the link layer; a receive task file register disposed at the application layer and loading the command content of the receive FIFO; a send task file register disposed at the application layer and loading a command or data for packet sending; and a send FIFO disposed at the transport layer and storing on a first-in first-out basis the content of the send task file register, the send FIFO causing a command packet or a data packet to be sent to the host via the link layer and the physical layer; the packet transfer method comprising:

an I/O control step inputting and outputting data such that predefined one unit of data stays in the send FIFO at all times, the I/O control step outputting a head signal in synchronism with input and output of headmost data of the packet and outputting a tail signal in synchronism with input and output of endmost data of the packet; and an error-terminated transfer control step, when data input is halted by an error during data transmission, outputting to the link layer the one unit of data staying in the send FIFO together with the tail signal and causing a data packet to be transferred to the host.

(Monitoring of the Number of Packets)

Another mode of the invention provides an interface circuit and a packet transfer method which enable to simplify controls, such as the inhibition control to the command transmission request and the shift to the power mode for the seek request command, by configuring the number of packets in the packet transfer after reception and decoding of the command from the host.

To this end, the present invention is characterized by a device interface apparatus having a physical layer, a link layer, a transport layer and an application layer, for transferring commands and data in packet format by serial transmission between a device and a host, the interface apparatus comprising a packet control condition setting unit when the command received from the host is decoded to start the packet transfer, setting a type of a control function executed after start of the packet transfer and the number of packets to be received or transmitted which defines the start or end of the control function; and a packet control execution circuit unit detecting that the set number of packets has been reached during packet transfer and terminating or activating the control function.

For example, the packet control condition setting unit, prior to start of the packet transfer, sets the number of packets for canceling inhibition of a reception ready response (RRDY response) to a command transmission request from the host during packet transfer, and the packet control execution circuit unit activates an inhibition operation of the reception ready response to the command transmission request from the host at the time of start of the packet transfer, the packet control execution circuit unit canceling the inhibition operation when the number of the transferred packets reaches the set number of packets.

As another example, the packet control condition setting unit, prior to start of the packet transfer, sets a power mode after packet transfer and the number of packets for entering the power mode, and the packet control execution circuit unit instructs to enter the power mode when the number of the transferred packets reaches the set number of packets after start of the packet transfer.

According to the interface apparatus of the invention, in the packet transfer protocol of the hard disk device which is the device side, since certain functions are controlled by the number of packets sent or received, or the number of packets which are not depending on the protocol, the firmware is released from monitoring of the state of the packet transfer for controlling the certain functions and is able to execute other processes, and if the sequence of the packet transfer is changed, only changing the configuration of the number of packets by the firmware is needed, therefore it is possible to accommodate this with lower cost and faster speed than expensive modification of hardware.

Also, as functions controlled by the number of packets, possible cases include a case that, if inhibition of a reception ready response signal (reception ready signal) is set such that a packet is not received for a certain period of time, the inhibition is canceled by the number of packets and a case that the power mode which leads to a low power consumption is performed by the number of packets when a certain process such as reception of command involving a seek operation is completed, and in either cases, the firmware is released from monitoring of the state of the packet transfer and can use its time for other processes, as well as can accommodate changes of the sequence of the packet transfer with lower cost and faster speed.

The present invention provides a packet transfer method for a device interface having a physical layer, a link layer, a transport layer and an application layer, the device interface transferring commands and data in packet format by serial transmission between a device and a host, the packet transfer method comprising:

a packet control condition setting step when the command received from the host is decoded to start the packet transfer, setting into a control register a type of a control function executed after start of the packet transfer and the number of packets to be received or transmitted which defines the start or end of the control function; and a packet control execution step detecting that the set number of packets of the control register has been reached during packet transfer and terminating or activating the control function.

For example, the packet control condition setting step includes, prior to start of the packet transfer, setting the number of packets for canceling inhibition of a reception ready response to a command transmission request from the host during packet transfer, and the packet control execution step includes activating an inhibition operation of the reception ready response to the command transmission request from the host at the time of start of the packet transfer, and canceling the inhibition operation when the number of the transferred packets reaches the set number of packets.

As another example, the packet control condition setting step includes, prior to start of the packet transfer, setting a power mode after packet transfer and the number of packets for entering the power mode, and the packet control execution circuit step includes instructing to enter the power mode when the number of the transferred packets reaches the set number of packets after start of the packet transfer.

A further mode of the present invention provides a device interface apparatus arranged to monitor the number of packets by firmware. The device interface apparatus having a physical layer, a link layer, a transport layer and an application tion layer, for transferring commands and data in packet format by serial transmission between a device and a host, is characterized by comprising:

a packet control condition setting unit when the command received from the host is decoded to start the packet transfer, setting a type of a control function executed after start of the packet transfer; and a packet control condition monitor unit, posterior to start of the packet transfer, detecting a packet transfer status which determines start or termination of the control function and activating or terminating the control function.

In this case also, as specific examples, the inhibition and the inhibition cancellation of the reception ready response to the command transmission request or the turning the power mode on for the seek request command after the packet response according to the monitoring of the number of packets, which are described above, are performed.

According to such an interface apparatus of the invention, which monitors the packet transfer in order to control certain functions by the firmware, even if the sequence of the packet transfer is changed, only changing the configuration of the firmware is needed, therefore it is possible to accommodate this with lower cost and faster speed than expensive modification of hardware.

The present invention provides a packet transfer method for a device interface apparatus having a physical layer, a link layer, a transport layer and an application layer, the device interface transferring commands and data in packet format by serial transmission between a device and a host, the packet transfer method comprising:

a packet control condition setting step when the command received from the host is decoded to start the packet transfer, setting a type of a control function executed after start of the packet transfer; and a packet control condition monitor step, posterior to start of the packet transfer, detecting a packet transfer status which determines start or termination of the control function and activating or terminating the control function.

According to the invention, a device can accept a next command during data transfer. Also, the invention is especially useful for a command cueing protocol, and both of hardware and software can achieve a command cueing protocol easily and flexibly by small scale changes. The command cueing protocol is a protocol for improving performance and achieves efficiency of a command process by solving problems that the command process can only be executed sequentially till then. In this way, performance improvement of 25% over conventional protocols is expected in the whole system.

Performance improvement of about 5% to 10% is further expected for the invention, because command reception during data transfer, which can not be achieved conventionally, is enabled.

In the invention, after detection and reception of a next command is performed by hardware during data transfer, since interruption is notified to firmware and processed, the state of hardware at the time of interruption is unchanged, therefore, as another advantage, subsequent processes become easier for the firmware.

In the invention, since the firmware determines continuation or cancellation of data transfer according to the decoding of the command received during the data transfer, unexpected cases can be more flexibly accommodated than the case of hardware. In other words, in the case that continuation or cancellation of data transfer is handled by hardware, modification of the hardware is needed for the unexpected cases. Typically, modification of the hardware takes one (1) and a half month and gives significant impact to a development operation, but if it is possible to accommodate this by firmware according to the invention, the operation can be shortened accordingly.

In the invention, since an available time to accept a next command is generated at a packet break point during data transfer, more time is needed for data transfer accordingly. But, typically, a transfer rate of the interface between a host and a device is almost twice faster then writing speed to the disk, therefore, if the available time is generated during data transfer, this time delay will be absorbed by the difference of the speed and will not have affect on the performance of the device. Contrary, in the invention, the host can issue a command during data transfer, and MPU of the host can perform another task during the period it has to wait formerly, therefore as a result, throughput of the whole system can be improved.

According to the interface apparatus of the invention, if an uncorrectable error for which error-correction of the data can not be performed occurs during input of the read data for a packet transfer to the interface circuit unit in, for example, a hard disk drive which is the device side to the host and the data input is stopped, since the last data before the input is stopped by the error remains in a send FIFO, by outputting this remaining data as the last data to a link layer with the tail signal based on the detection of the error, it is possible to conclude the packet data and to transfer the packet of the data obtained until occurrence of the error to the host, therefore the malfunction that the packet transfer is continuously halted in the middle by an error can be prevented certainly.

Also, According to the interface apparatus of the invention, in the packet transfer protocol of the hard disk device which is the device side, since certain functions are controlled by the number of packets sent or received, or the number of packets which are not depending on the protocol, the firmware is released from monitoring of the state of the packet transfer for controlling the certain functions and is able to execute other processes, and if the sequence of the packet transfer is changed, only changing the configuration of the number of packets by the firmware is needed, therefore it is possible to accommodate this with lower cost and faster speed than expensive modification of hardware.

Also, as functions controlled by the number of packets, possible cases include a case that, if inhibition of a reception ready response signal (reception ready signal) is set such that a packet is not received for a certain period of time, the inhibition is canceled by the number of packets and a case that the power mode which leads to a low power consumption is performed by the number of packets when a certain process such as reception of command involving a seek operation is completed, and in either cases, the firmware is released from monitoring of the state of the packet transfer and can use its time for other processes, as well as can accommodate changes of the sequence of the packet transfer with lower cost and more promptly.

The above and other objects, aspects, features and advantages of the present invention will become more apparent from the following detailed description when taken in conjunction with the accompanying drawings.

BRIEF DESCRIPTION OF THE DRAWINGS

FIG. 2 is a block diagram of an embodiment of the interface circuit unit in FIG. 1;

FIG. 8 is an explanatory diagram of a RegHD packet transferring a command from the host to the Device;

FIG. 9 is an explanatory diagram of a RegDH packet transferring a packet reception response from the device to the host;

FIG. 10 is an explanatory diagram of a DMA setup packet transferred from the device to the host;

FIG. 13 is an explanatory diagram of a Set device bits packet transferred from the device to the host;

FIGS. 19A to 19H are time charts of normal input-output control in the send FIFO of FIG. 17;

FIGS. 20A to 20H are time charts of input-output control when an error occurs in the send FIFO of FIG. 17;

FIGS. 21A to 21H are time charts as a comparative example of the invention in which the operation is halted because data does not remain in the send FIFO when an error occurs;

FIG. 23 is an explanatory diagram of a control register used in the embodiment of FIG. 22;

FIGS. 28A and 28B are time charts of a packet transfer process in the command process of FIG. 27;

FIGS. 29A and 29B are time charts in the case that next command transmission request is generated from the host during packet transfer of FIGS. 21A to 21H;

FIGS. 36A and 36B are time charts of packet transfer control according to the embodiment of FIG. 34 which monitors with a firmware and inhibits next command request from the host during packet transfer;

DESCRIPTION OF THE PREFERRED EMBODIMENTS (Command Reception during Data Transfer)

Figure 1:
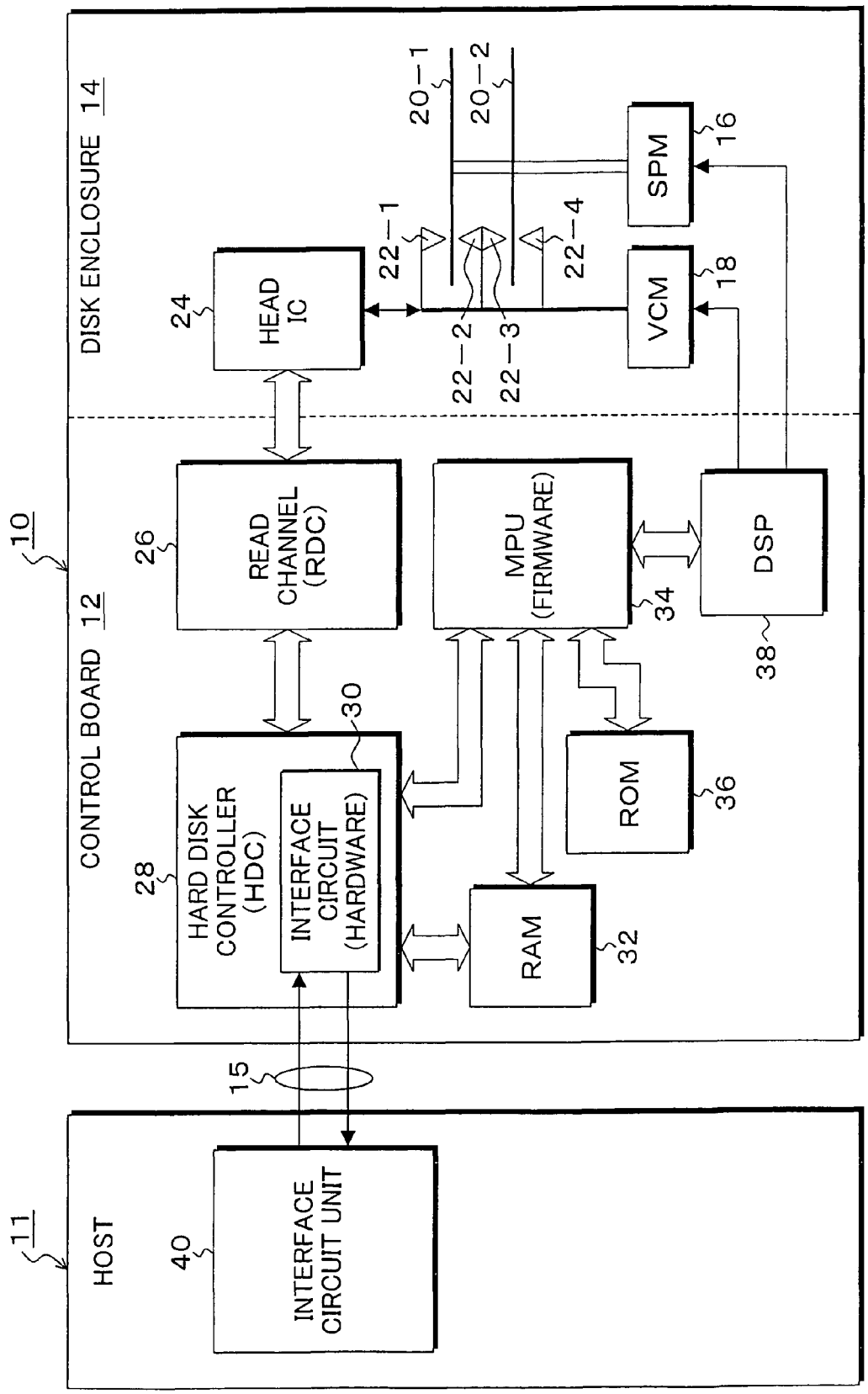
FIG. 1 is a block diagram of a hard disk drive to which the invention is applied.

FIG. 1 is a block diagram of a hard disk drive (HDD) to which a device interface according to the invention is applied. The hard disk drive 10 as a magnetic disk apparatus consists of a control board 12 and a disk enclosure 14 and is connected to a host 11 via a serial transmission line 15. The disk enclosure 14 is provided with a spindle motor 16, and an axis of rotation of the spindle motor (SPM) 16 is equipped with magnetic disks 20-1 and 20-2 which are rotated at a constant rate. Also, the disk enclosure 14 is provided with a voice coil motor (VCM) 18, and the voice coil motor is equipped with heads 22-1 to 22-4 at ends of arms of a head actuator and positions the heads to the recording surface of the magnetic disks 20-1 and 20-2. In addition, the heads 22-1 to 22-4 are equipped with a write head and a read head as an integral part. The heads 22-1 to 22-4 are connected to a head IC 24 by signal lines, and the head IC 24 selects any one head which executes write or read according to a head selection signal based on a write command or a read command from a host which is an upper apparatus. Also, the head IC 24 is provided with a write amplifier for a write system and a pre-amplifier for a read system. The control board 12 is provided with a read channel (read/write LSI) 26, a hard disk controller (HDC) 28, an interface circuit unit 30 which is a target of the invention, RAM 32, MPU 34 which acts as firmware, ROM 36, DSP 38 which executes motor control, positioning control and others. The interface circuit unit 30 provided on the hard disk controller 28 is connected to an interface circuit unit 40 of the host 11 via the serial transmission line 15 and, in this embodiment, for example, a serial ATA interface (SAT interface) is applied to this.

FIG. 2 is a block diagram of an embodiment of the interface circuit unit according to the invention, which is provided on the hard disk device 10 of FIG. 1. In FIG. 2, the interface circuit unit 30 provided on the hard disk controller 28 is consists of a physical layer 42, a link layer 44, a transport layer 46 and an application layer 48, and each layer consists of hardware which achieves each function. According to specifciations of the serial ATA interface, the physical layer 42 is referred to as a serial physical interface plant; the link layer 44 is referred to as a serial link digital control; the transport layer 46 is referred to as a serial digital transport control; and the application layer 48 is referred to as a software control buffer memory DMA engine. In the interface circuit unit 30 of the invention, in order to receive a command packet for a read access or a write access to the hard disk drive which is issued by the interface circuit unit 40 of the host 11 and enable to receive a next command during a command execution, a receive FIFO 50 which stores the received command into the transport layer 46 first-in first-out, a command detection circuit 52 which detects the next command received during data transfer according to the command execution and stored in the receive FIFO 50 and issues an interruption signal (command detection signal) 55 to the MPU 34 as firmware and a send FIFO 60 are provided. Further, the application layer 48 is provided with a receive task file register 54, as well as a task control file register 58 as a send task file register. In addition to the interface circuit unit 30 with such a hardware configuration, an available time generation unit 64 which is achieved by program control and a mid-transfer command processing unit 66 are provided on the side of the MPU 34 which acts as firmware. The mid-transfer command processing unit 66 is comprised of each function of a suspend processing unit 68, a command decode unit 70, a transfer abort unit 72 and a transfer resume unit 74. The available time generation unit 64 generates certain available time for receiving the next command from the host during data transfer based on the command reception. As the timing for generating this available time, the available time are set by detecting break points of data packets which are transferred in multiple times. The available time in this case may be the time needed for a command packet transfer from the host 11, for example about 100 to 300 ns. If a command packet is received from the host 11 during the available time set by the available time generation unit 64, the mid-transfer command processing unit 66 suspends the data transfer currently executed by the hardware of the interface circuit unit 30, and after decoding the received command and executing the process, resumes the data transfer. In this embodiment, the command content of the next command received from the host 11 during data transfer has the instruction detail for continuing or canceling the data transfer currently executed. More specifically, these processes of the mid-transfer command processing unit 66 are achieved by each function of the suspend processing unit 68, the command decode unit 70, the transfer abort unit 72 and the transfer resume unit 74. When the command detection circuit 52 outputs the interruption signal 55 based on the command detection for the next command received during the available time and stored in the received FIFO 50, the suspend processing unit 68 instructs suspend of the data transfer to the hardware of the interface circuit unit 30 and saves parameters for this suspend into the RAM 32. The command decode unit 70 loads the command content stored in the receive FIFO 50 into the task file register 54 and decodes the loaded command content. In this embodiment, since the next command received during data transfer based on the command execution has the command instruction detail for continuing or canceling the data transfer, if the command decode unit 70 determines that the data transfer is aborted, the transfer abort unit 72 discards the currently executed command and parameters saved in the RAM 32 and terminates the data transfer of the interface circuit unit 30. On the other hand, if the command decode unit 70 determines that the data transfer is continued, the transfer resume unit 74 operates To throw the command content of the next command stored in the receive task file register 54 into a command queue 56 of the RAM, store reception response information to the reception of the next command into the send FIFO 60 at the transport layer 46, transmit a response packet for the command reception to the host 11 via the link layer 44 and the physical layer 42, release the suspend of the interface circuit unit 30 and set the parameters saved in the RAM 32 to resume the data transfer.

Figure 3A:
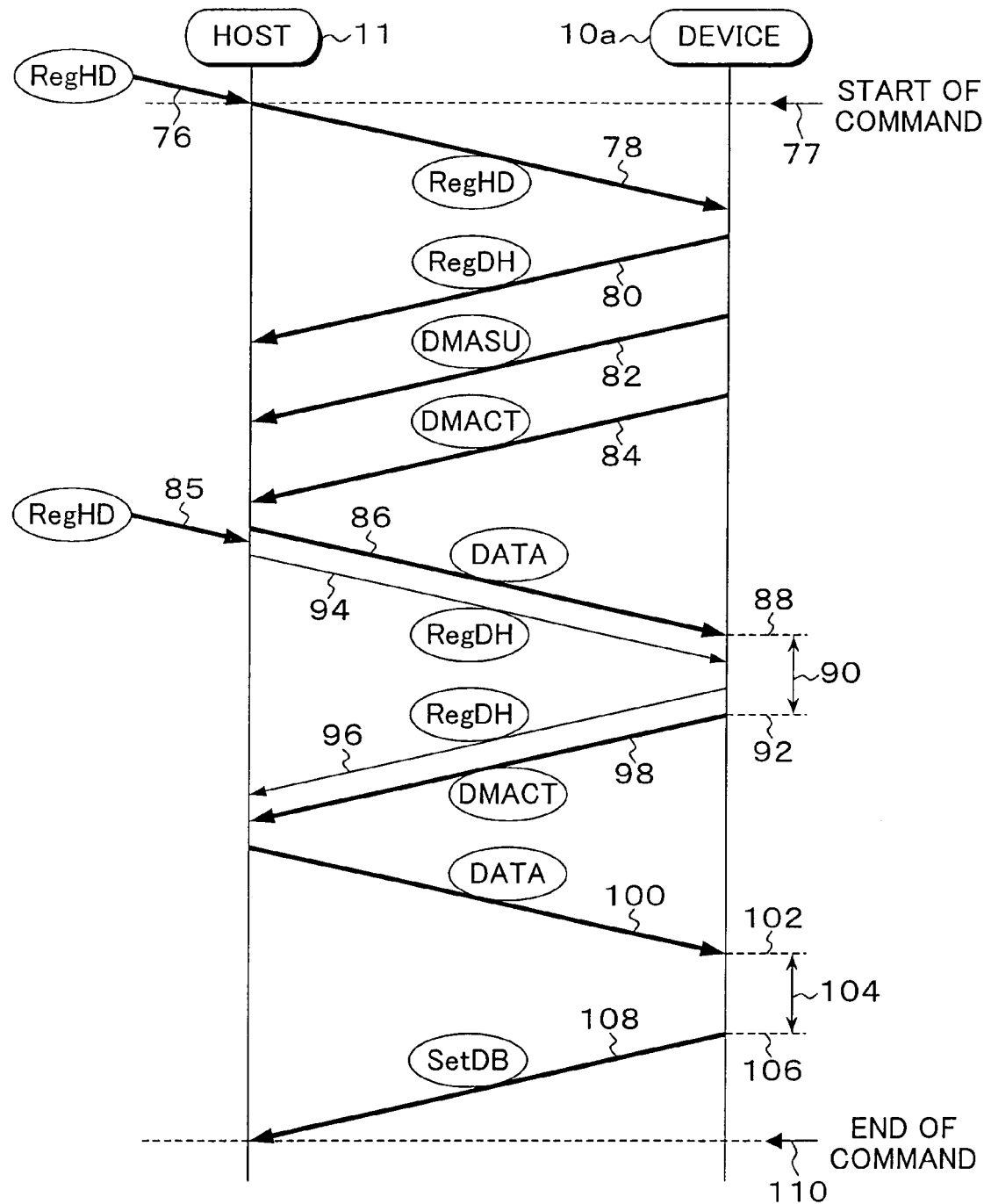
FIGS. 3A and 3B are time charts of a packet transfer at the time of write access according to the invention.
Figure 3B:
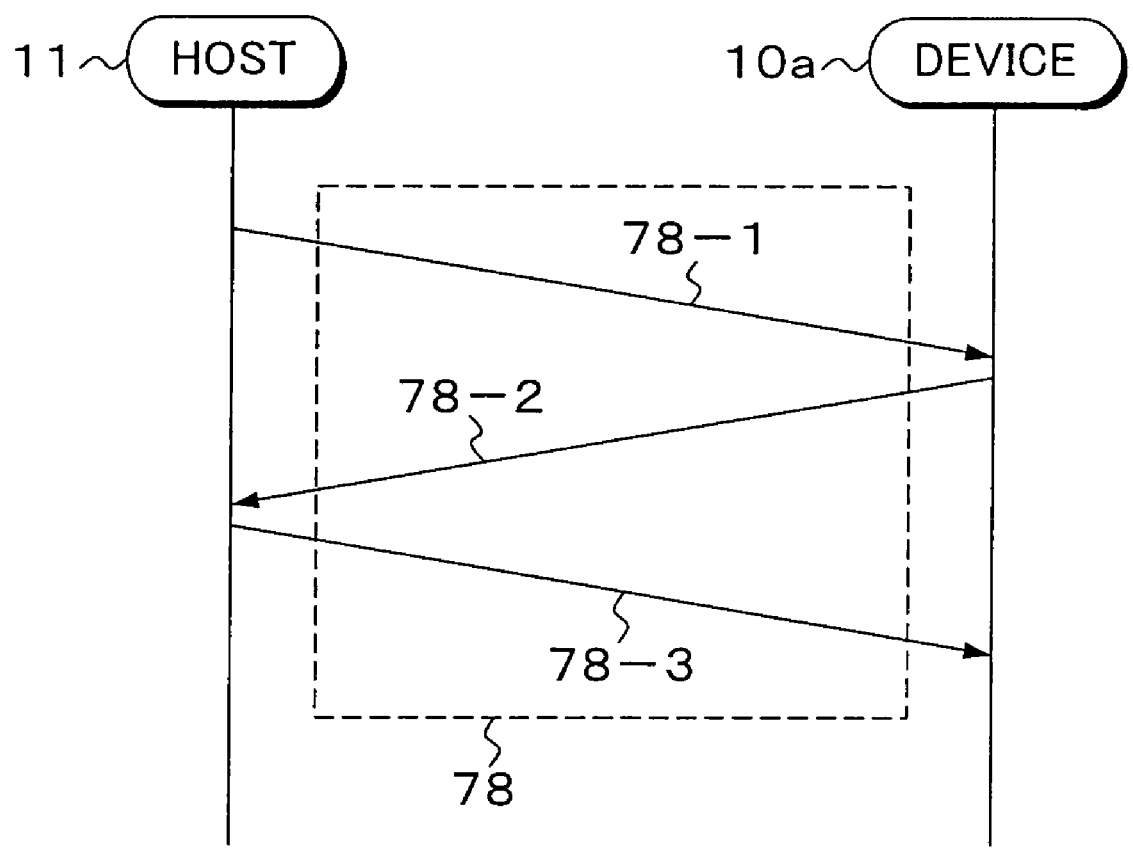
Figure 4:
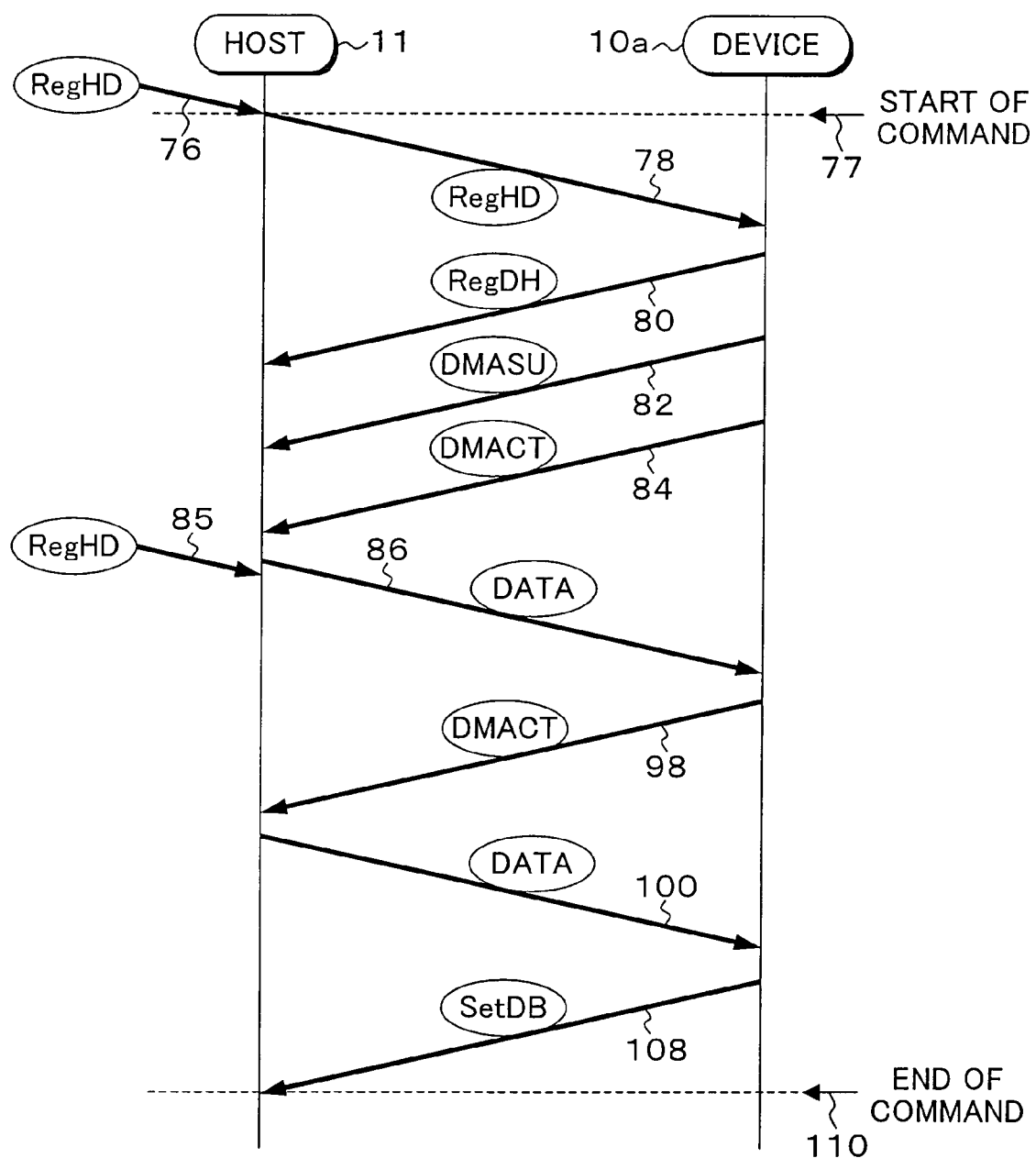
FIG. 4 is a time chart of a packet transfer at the time of conventional write access.

FIGS. 3A and 3B are time charts of a packet transfer at the time of the write access according to the interface apparatus of the invention, and in contrast to this, FIG. 4 illustrates a time chart of a conventional packet transfer at the time of the write access in which the next command can not be received during data transfer.

Figure 5:
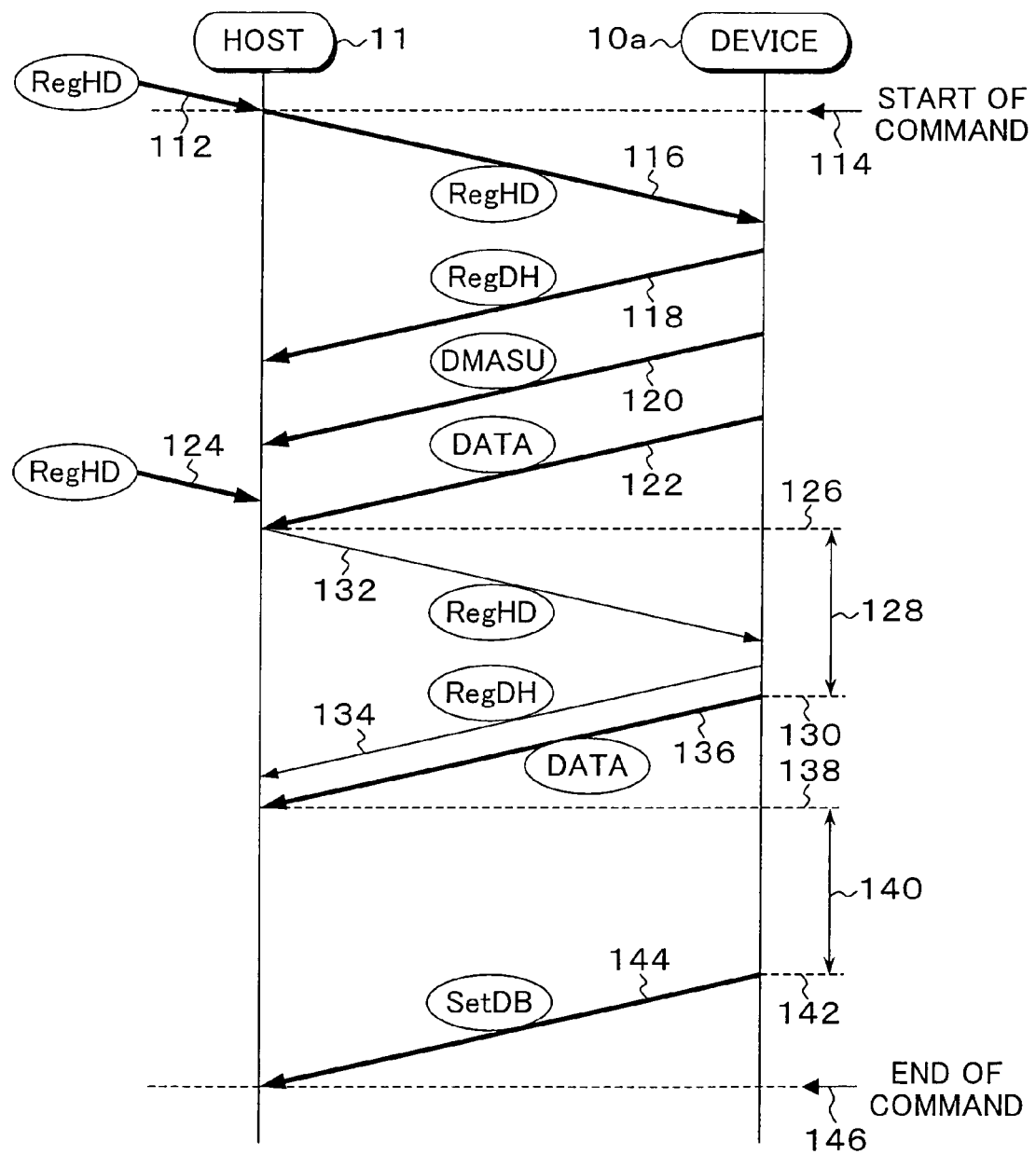
FIG. 5 is a time chart of a packet transfer at the time of read access according to the invention.
Figure 6:
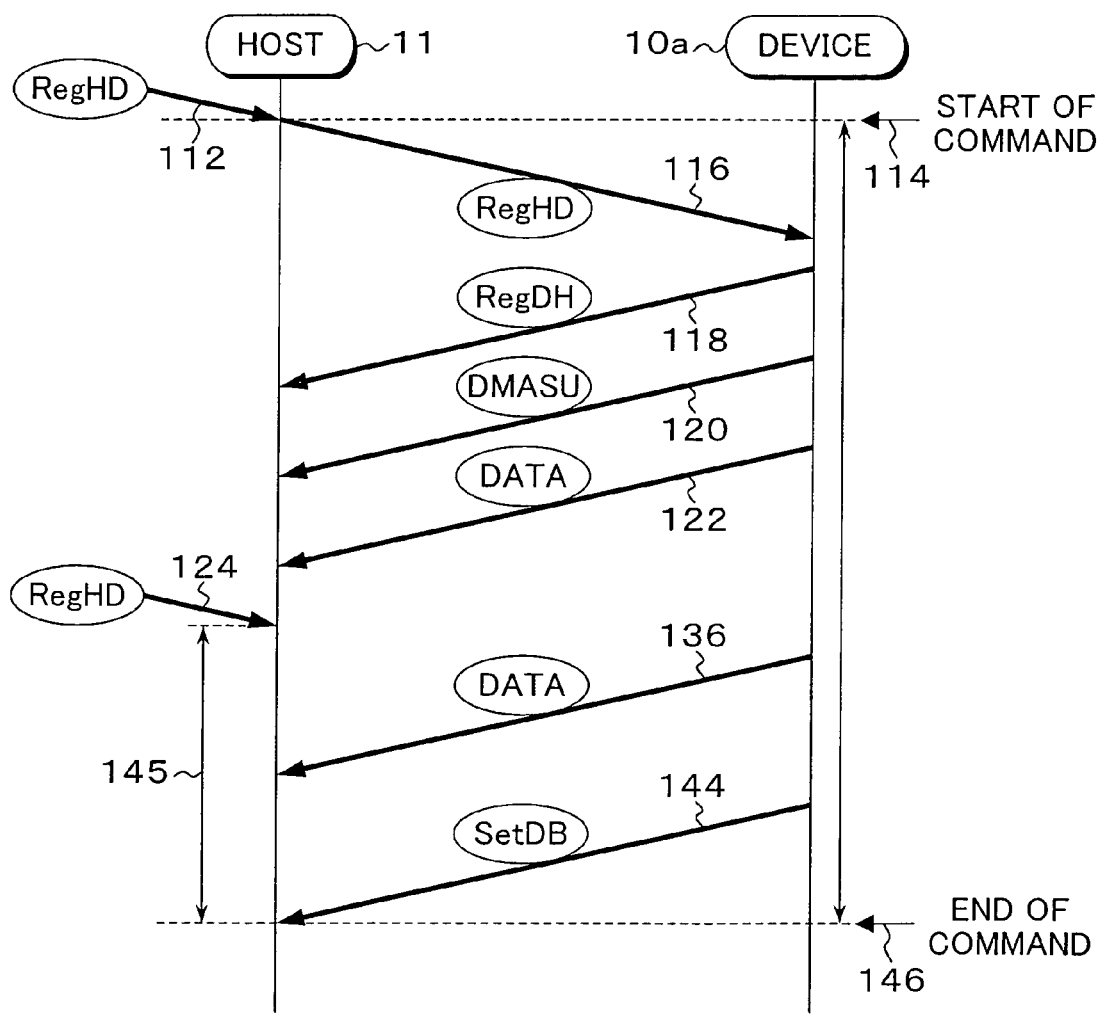
FIG. 6 is a time chart of a packet transfer at the time of conventional read access.

Further, FIG. 5 is a time chart of a packet transfer at the time of the read access according to the invention, and similarly, FIG. 6 illustrates a conventional packet transfer at the time of the read access in which the next command can not be received during data transfer.

At this point, the packets defined in the serial ATA interface used for the packet transmission processes of FIGS. 3A and 3B to FIG. 6 are mainly as follows.

(1) RegHD packet
(2) RegDH packet
(3) DMA setup packet (DMA Setup)
(4) DMA activate packet (DMA Activate)
(5) Data packet (Data)
(6) Set device bits packet (Set Device Bits)

Figure 7:
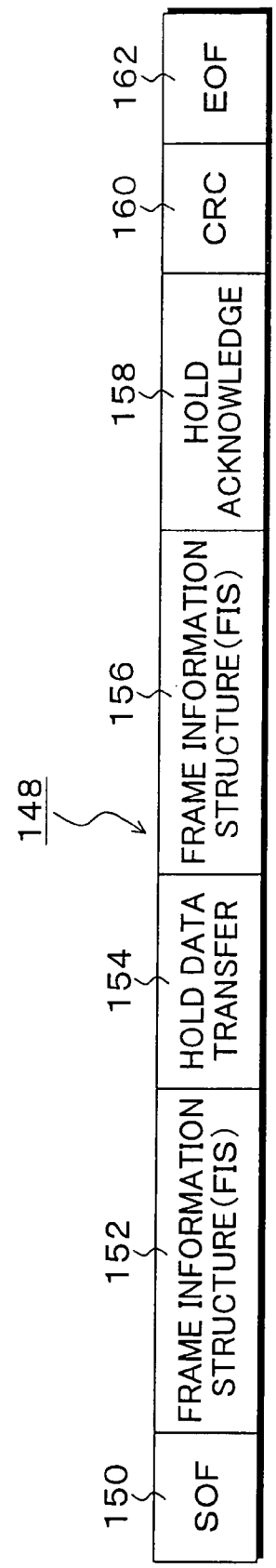
FIG. 7 is an explanatory diagram of a serial ATA transmission sequence to which the invention is applied.

Further, FIG. 7 is a basic pattern of a serial ATA transmission sequence 148 which is covered by the invention, and this is a transmission sequence which is started by a head most start of frame (SOF) 150 and terminated by an endmost end of frame (EOF) 162. Next to the headmost start of frame 150, a frame information configuration (FIS) 152 is provided, and this content consists of packets shown in FIG. 8 to FIG. 13. A next hold data transfer 154 is set about wait time in the case that a payload of the packet can not be prepared at the source of transfer. A next frame information configuration (FIS) 156 consists of packets of FIG. 8 to FIG. 13 as well. A hold acknowledged 158 is a response to the hold data transfer 154. Subsequently, after CRC 160 to the preceding transmission packet is provided, the end of frame 162 is provided.

FIG. 8 is an explanatory diagram of a RegHD packet 164, and the RegHD packet 164 is a command packet which sends a command from the host to the device.

FIG. 9 is a RegDH packet 166, and the RegDH packet 166 is a status packet which sends error information and status information from the device to the host.

FIG. 10 is a DMA setup packet 168, which is a command for sending parameters needed for DMA transfer of data from the device side to the host and setting up, when a write command is received and decoded by the RegHD packet 164 of FIG. 8 on the device side.

Figure 11:
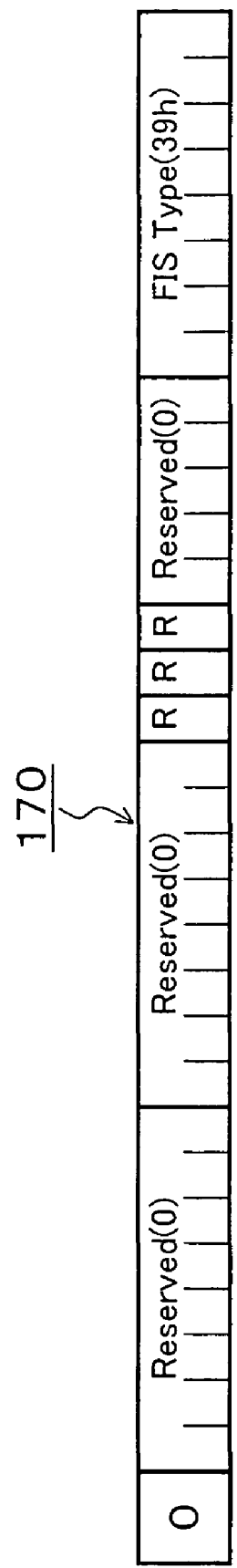
FIG. 11 is an explanatory diagram of a DMA activate packet transferred from the device to the host.

FIG. 11 is a DMA activate packet 170, which is issued to the host from the device side, following the DMA setup packet 168 of FIG. 10, and thereby DMA transfer of a data packet from the host to the device is started.

Figure 12:
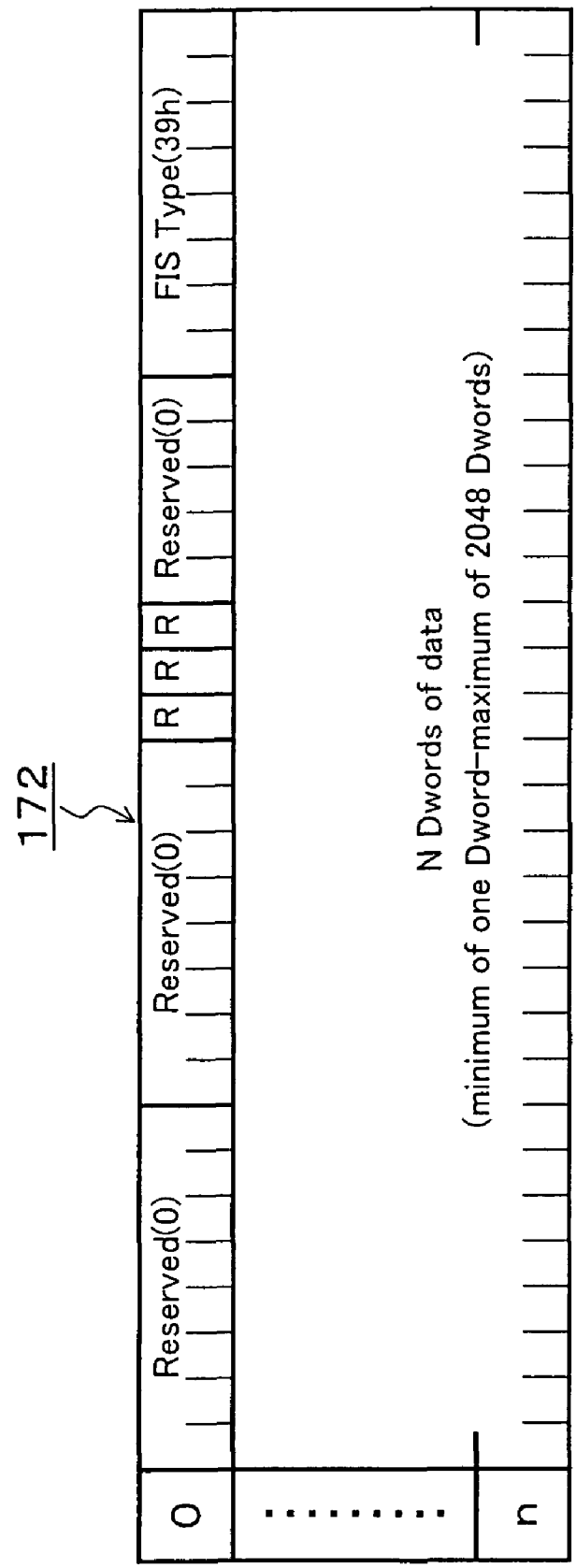
FIG. 12 is an explanatory diagram of a data packet.

FIG. 12 is a data packet 172, which is divided into 0 to n sectors, and one (1) sector is 512 bytes, and the maximum number n of the sectors is n=16. In serial ATA interface, since one (1) word is two (2) bytes, four (4)bytes data is defined as one (1) double word, and the data packet 172 can be loaded with double words ranging from 1 to 2048.

FIG. 13 is a set device bits packet 174, which is transferred from device at the time of termination of data transfer and notifies error information and status information to the host.

Referring to FIGS. 3A and 3B, the packet transmission process at the time of the write access is described as follows.

In FIG. 3A, when a command issuance request 76 for the write access is performed on the side of the host 11, a start of command 77 is performed, and the interface circuit unit 40 of the host 11 transfers a command packet to the device 10a which is the hard disk drive side, as the RegHD packet 78. At this point, when RegHD packet 78 is taken as an example, packet transfer protocols between the host 11 and the device 10a is shown as FIG. 3B.

(1) A transmission ready signal (XRDY signal) 78-1 is sent from the source of transfer to the destination of transfer based on the packet transmission request.

(2) If the transfer is OK, the destination of transfer sends a reception ready signal (RRDY signal) 78-2.

(3) Based on the reception of the reception ready signal (RRDY signal) 78-2, the source of transfer transfers a packet signal 78-3.

In FIG. 3A, these packet transfer protocols are put together into a heavy-line arrow and illustrated as a packet transfer.

Referring to FIG. 3A again, the device 10a which receives the RegHD packet 78 transfers RegDH packet 80 to the host 11, as a status packet indicating completion of normal reception of the command packet. Subsequently, after the DMA setup packet 82 is transferred to the host 11 based on the decoded write command, the DMA activate packet 84 is transferred to the host 11, and based on this, the data packet 86 is transferred from the host 11 to the device 10a based on the DMA transfer. On the side of the device 10a, when a break point 88 which is an endpoint of the data packet 86 from the host 11 is detected, an available time 90 for allowing the host 11 to issue the next command is generated by the available time generation unit 64 provided to MPU 34 of FIG. 2. At this time, if a command issuance request 85 is generated on the host 11 side subsequently to the transfer of the data packet 86, since the available time 90 which can accept the command issuance is set on the device 10a side at this timing, the next command is transferred to the device 10a by the RegHD packet 94, and after this command is processed by receiving and decoding it on the device 10a side, RegDH packet 96 is sent to the host 11, as the response status packet indicating the completion of the command reception. Subsequently, on the device 10a side, the suspended data transfer is resumed at the end time 92 of the available time 90, and by transferring the DMA activate packet 98 to the host 11, transfer of a next data packet 100 from the host 11 is accepted. For this transfer of the data packet 100, a break point 102 of the data packet 100 is detected, and an available time 104 for allowing a next command issuance is generated on the device 10a side. For this available time 104, the next command is not issued from the host 11 side, therefore, the device 10a side resumes the data transfer again at the time of point 106 after a certain period of time 104 has passed, and because all the data from the host 11 has been received in this case, a set device bits packet 108 indicating the normal termination of the command is transferred to the host 11, and the end of command 110 is performed. Although the next command from the host 11 can be received in the middle of the packet transfer in such write access of the invention, in a packet transfer in the conventional write access of FIG. 4, which is the same packet transfer of FIGS. 3A and 3B, if a command issuance request 85 of the next command is generated between the start of command 77 and the end of command 110, the data transfer according to the currently executed command is not interrupted, and the command issuance request 85 has to wait until the end of command 110. As specific protocols, the transmission ready signal (XRDY) is sent based on the command issuance request 85, but the device 10a side does not send the reception ready signal (RRDY) because the packet reception can not be ready, and by sending the reception ready signal (RRDY) after the packet reception becomes OK at the time of the end of command 110, the next command is sent by the packet transfer.

FIG. 5 is a time chart of a packet transfer at the time of the read access according to the invention. In FIG. 5, if a command issuance request 112 of the read access from the host 11, a start of command 114 is performed at this point of time, and a RegHD packet 116 is transferred as a command packet to the device 10a. If this command packet is normally received, the device 10a transfers a RegDH packet 118 as a status packet to the host 11. Subsequently, in order to transfer the read data from the device 10a to the host 11, first, a DNA setup packet 120 is transferred, then, the data packet 122 is transferred to the host 11. At this point, if the command issuance request 124 of the next command is generated in the host 11 at the timing which is immediately before the transfer of the data packet 122, the available time generation unit 64 provided to MPU 34 of the device 10a detects a break point 126 of packets to which the transfer of the data packet 122 is terminated and generates a certain available time 128 for enabling to receive the next command from the host 11. Therefore, the command issuance request 124 generated in the host 11 is immediately executed and transferred to the device 10a as a RegHD packet 132, and after the decoding process of the received command is executed, RegDH packet 134 is transferred as a statue packet indicating the normal reception of the command to the host 11. Subsequently, at the end time 130 of the available time 128, the device 10a resumes the suspended data transfer and transfers a data packet 136 to the host 11. For this data packet 136, an available time 140 for allowing the command issuance in the host 11 is generated at a break point 138 which is its end time. Since an issuance request of a next command is not present on the host 11 side in this case, the data transfer is resumed at the point of time 142 after a certain time 140 elapses, and since the transfer of all the read data is completed, a set device bits packet 144 is transferred to the host 11 in this case, and the end of command 146 is performed. Contrary to this packet transfer in the read access according to the invention of FIG. 5, in a packet transfer in the conventional read access of FIG. 6, when the command issuance request 112 is generated in the host 11; the start of command 114 is performed; and the packet transfer for commands and data is executed with the device 10a, if the next command issuance request 124 is generated in the host 11 in the middle, this is ignored until the end of command 146 and has to wait until the end of command 146. At this point, in the packet transfer at the time of the write access in FIGS. 3A and 3B and the packet transfer at the time of the read access in FIG. 5, since a certain available times 90, 104, 128, and 140 is provided in the middle of the data transfer, longer time will be needed than the conventional packet transfer process of FIG. 4 and FIG. 6. However, in the data transfer between the host 11 and the hard disk drive 10 of FIG. 1, the data transfer rate between the interface circuit units 30 and 40 of the hard disk drive 10 and the host 11 is about twice faster then the data transfer rate from the hard disk controller 28 to the magnetic disks 20-1 and 20-2 of the hard disk enclosure 14 in the hard disk drive 10. Therefore, if the available time is generated during the data transfer as shown in FIGS. 3A and 3B and FIG. 5, this extent of time is absorbed in the transmission speed of the side of the magnetic disk media which has slow transmission speed, and the performance of the data transfer between the host 11 and the hard disk drive 10 will not be reduced.

Figure 14:
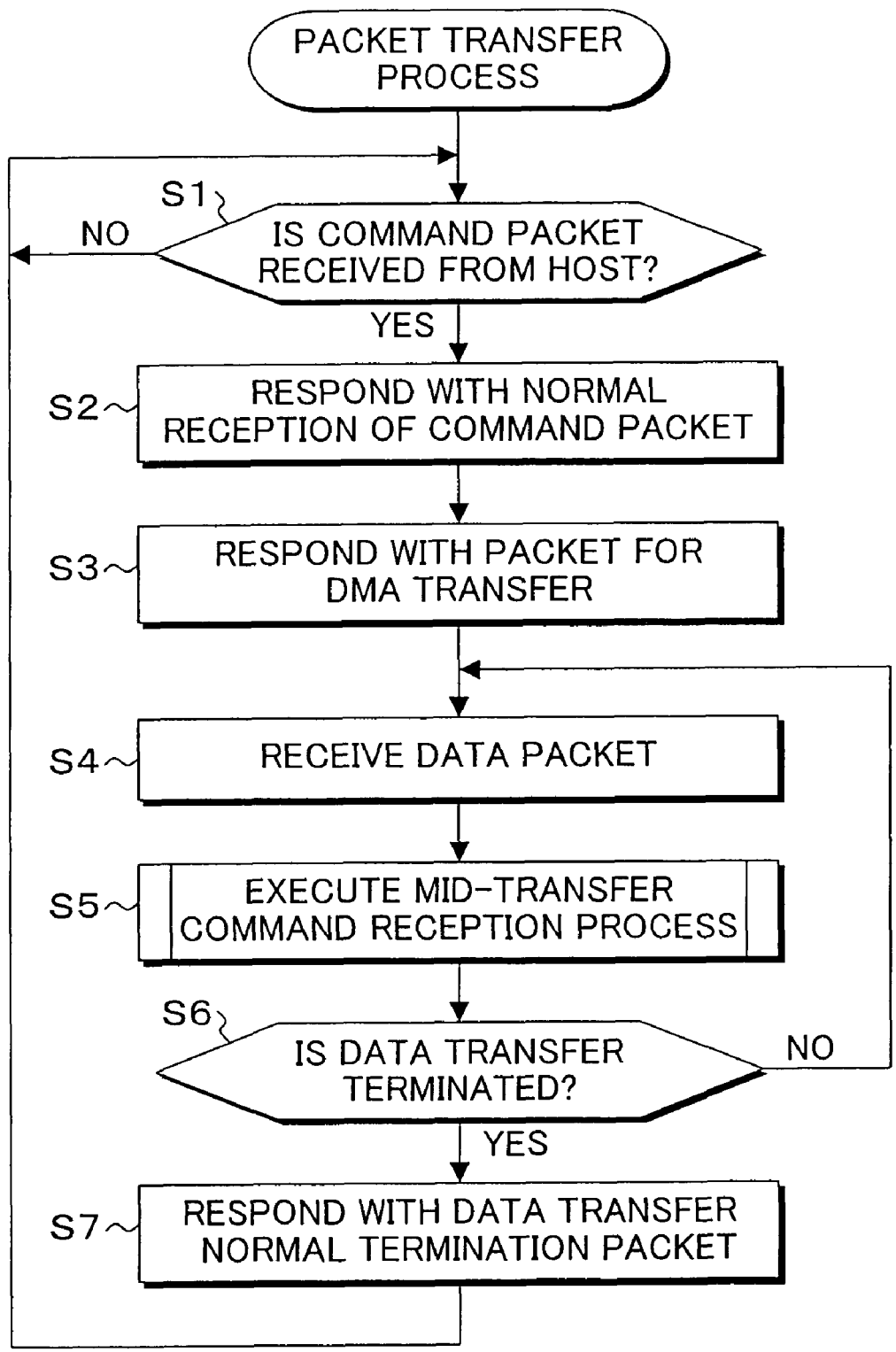
FIG. 14 is a flowchart of a packet transfer process according to the invention.

FIG. 14 is a flowchart of a packet transfer process according to the interface circuit units 30 of the invention. In FIG. 14, the reception of a command packet from the host 11 is checked in step S1, and when the command packet is received, the procedure proceeds to step S2 to transfer a status packet responding to the normal reception of the command packet. Subsequently, a packet for DMA transfer is returned in step S3. Specifically, in the case of the write access, the DMA setup packet 82 and DMA activate packet 84 of FIGS. 3A and 3B is returned, and in the case of the read access, only the DMA setup packet 120 of FIG. 5 is returned.

Subsequently, when the data packet is received in step S4, a mid-transfer command reception process of step S5 is executed at the timing of the bread point thereof, and if the command issuance request from the host side is present at this point of time, the reception process for the next command is performed. Then, whether the data transfer is terminated or not is checked in step S6, and the process from step S4 is repeated until the data transfer is terminated. When the data transfer is terminated in step S6, the packet indicating the normal termination of the data transfer, or the set device bits packet is returned, and the procedure goes back to step S1 to wait for the next command issuance.

Figure 15:
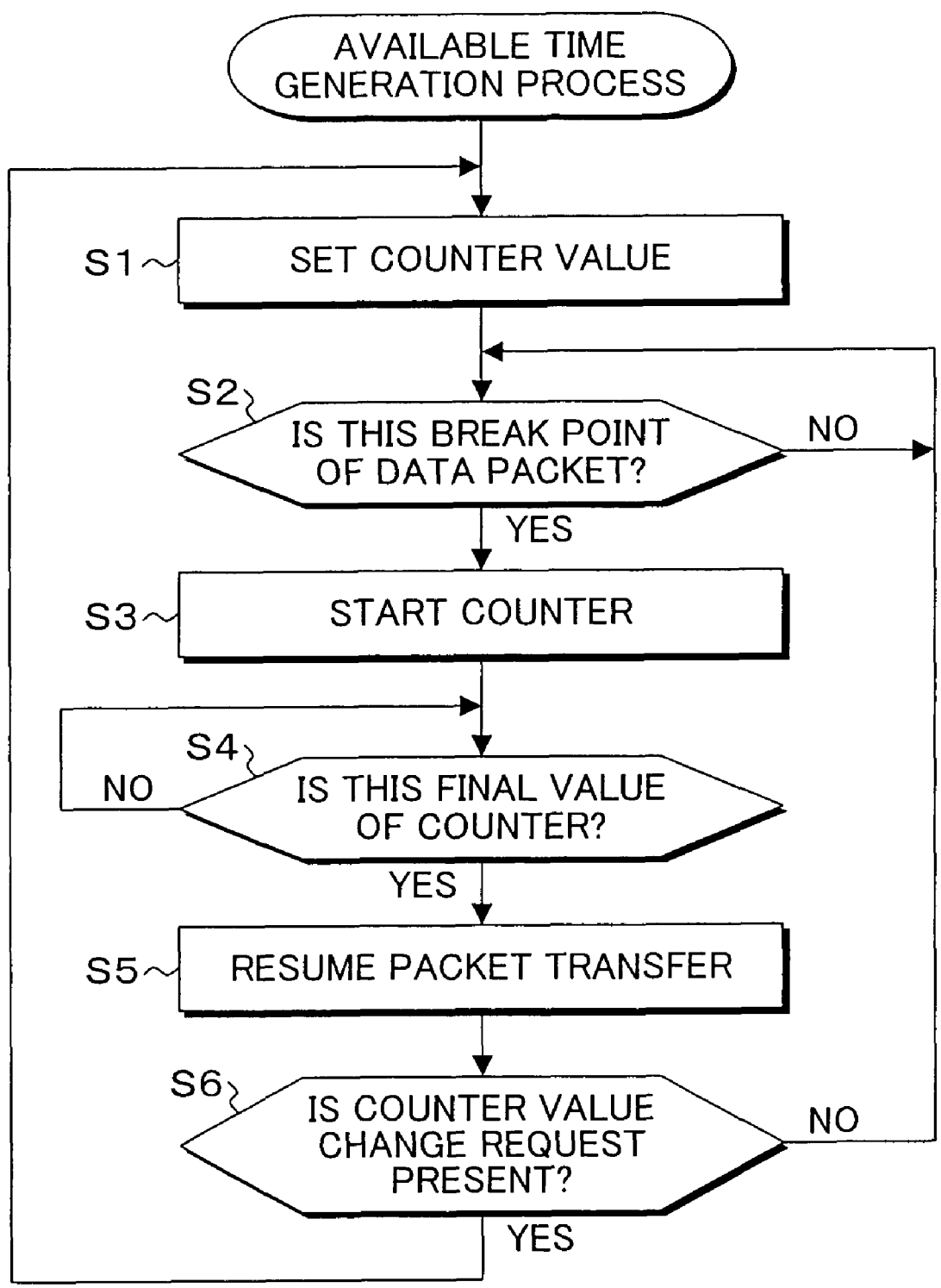
FIG. 15 is a flowchart of an available time generation process according to the invention.

FIG. 15 is a flowchart of an available time generation process according to the available time generation unit 64 provided to MPU 34 of FIG. 2. In this available time generation process, as an initialize process, a counter value is set to a certain value in step S1, then, the break point of the data packet is monitored in step S2. If the break point of the data packet is detected, the procedure proceeds to step S3, and after the counter is started, whether the final value of the counter is reached or not is determined in step S4. If the final value of the counter is reached, the procedure proceeds to step S5, and the packet transfer is instructed to resume. Further, if a counter value change request is present in step S6, the procedure goes back to step S1 to set the counter value to the requested value, and on the other hand, if a counter value change request is not present, the procedure goes back to step S2 to wait for a next available time generation process without changing the current counter value.

Figure 16A:
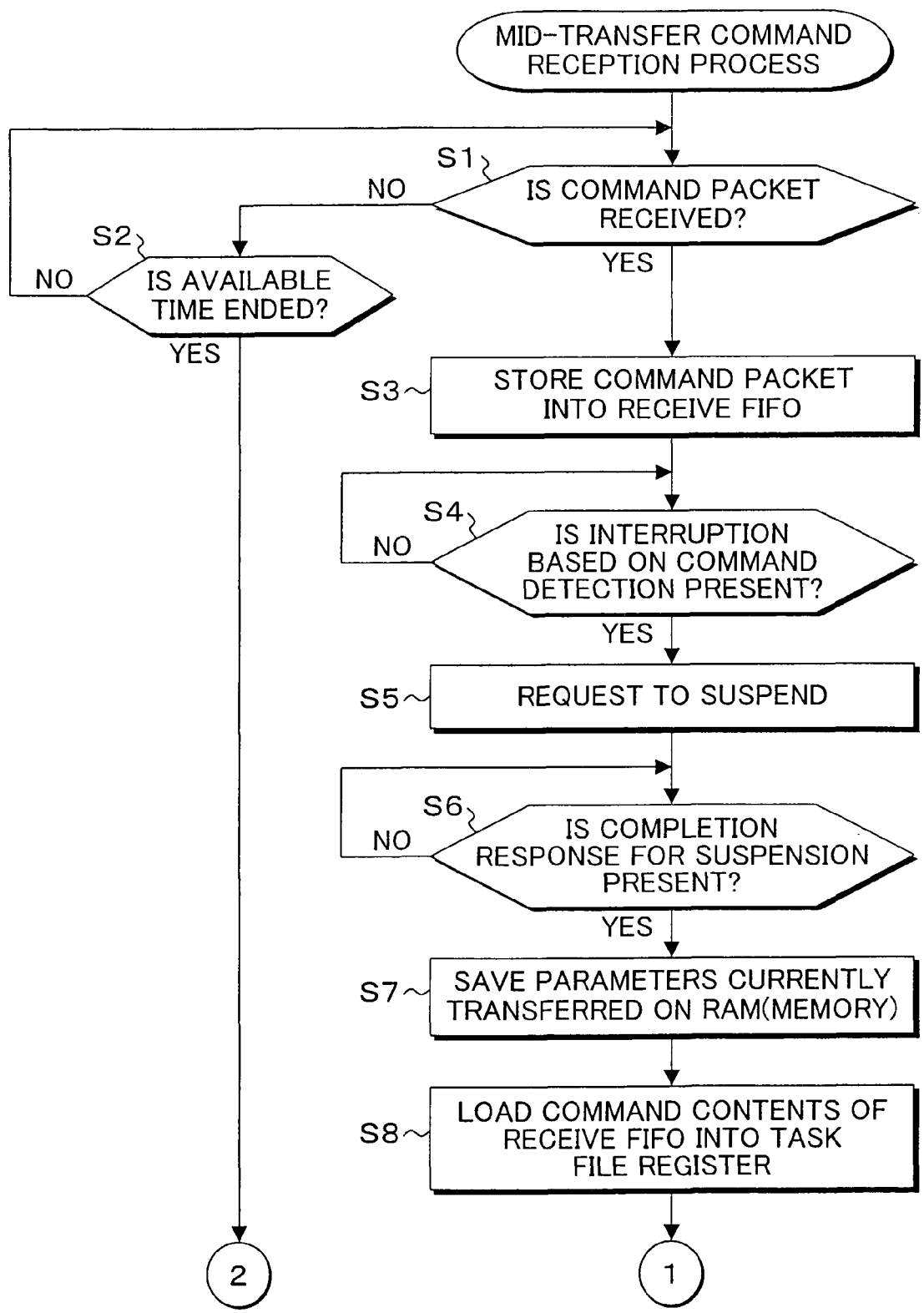
FIG. 16A is a flowchart of a mid-transfer command reception process in step S5 of FIG. 14.
Figure 16B:
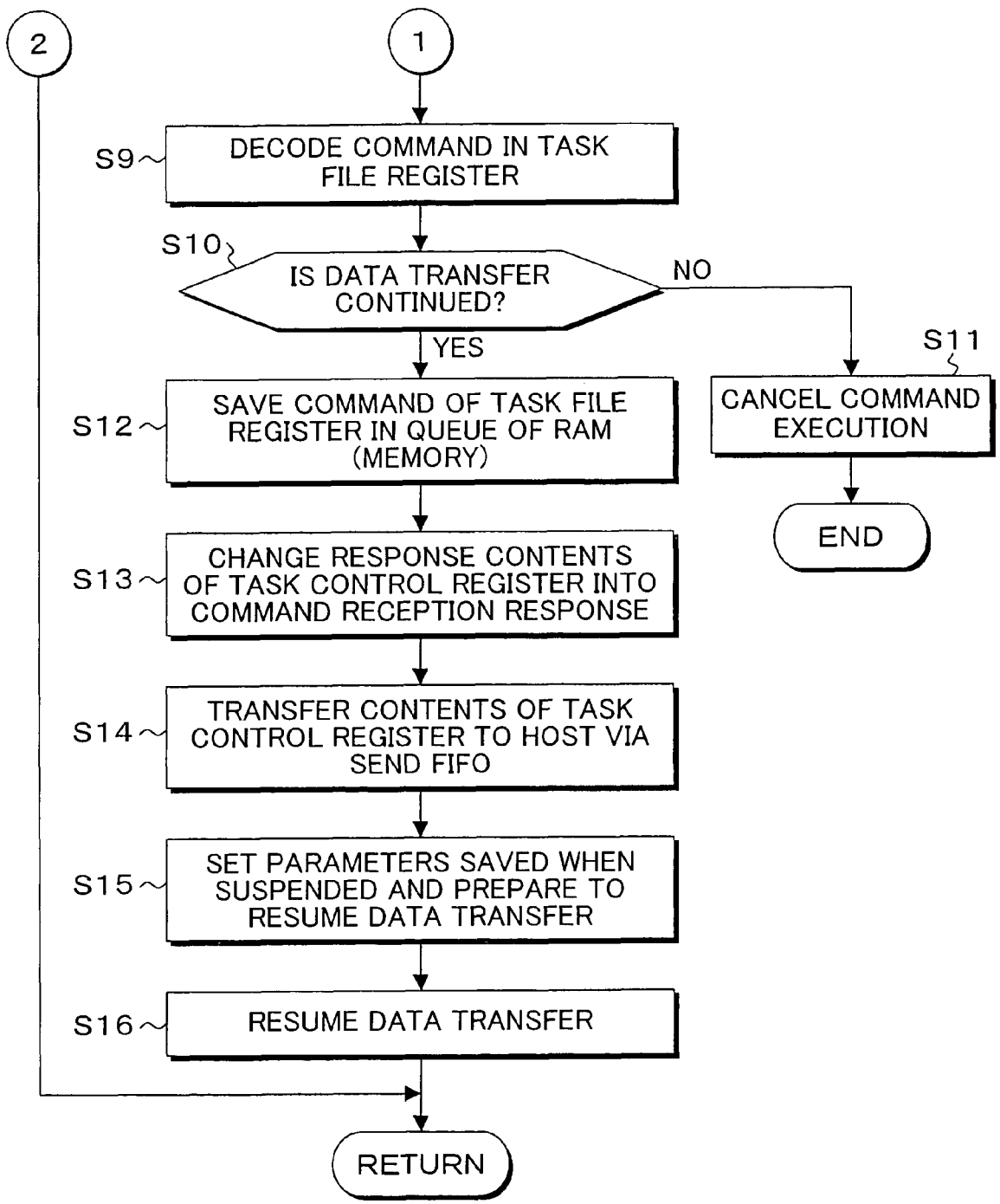
FIG. 16B is a flowchart of a mid-transfer command reception process continued from FIG. 16A.

FIGS. 16A and 16B are flowcharts illustrating details of the mid-transfer command reception process in step S5 of FIG. 14, and this is executed for each certain available time set by the available time generation process of FIG. 15. The mid-transfer command reception process of FIG. 16A is described with reference to FIG. 2 as follows. First, in step S1, whether the command packet according to the next command issuance request from the host is received or not is checked, and if the command packet is not received, whether the available time is terminated of not is checked in step S2, and if the available time is terminated, the procedure is returned to the main routine of FIG. 14 via FIG. 16B. When the command packet according to the next command issuance request from the host is received before the available time is terminated in step S1, the procedure proceeds to step S3, the command packet is stored into the receive FIFO 50 provided on the transport layer 46. Subsequently, in step S4, the command detection circuit 52 performs the command detection at the timing when the command packet stored by reaches the final stage and generates the interruption signal 55 based on the command detection, and if this interruption signal is determined to be present, the procedure proceeds to step S5, and suspend of the data transfer is requested to the hardware constituting the interface circuit unit 30. To this suspend request, if it is determined that the completion of the suspend is returned from the interface circuit unit 30 in step S6, the procedure proceeds to step S7, and currently transferred parameters in the interface circuit unit 30 is saved in RAM 32, and then in step S8, the command content of the next command stored in the receive FIFO 50 is loaded to the task file register 54 at the application layer 48. Subsequently, the command in the task file register 54 is decoded in step S9. In this embodiment, the command content of the next command during data transfer instructs continuance or cancellation of the data transfer. Therefore, in step S10, if the data transfer is continued from the result of the command decoding, the procedure proceeds to step S12, and if the data transfer is cancelled, the procedure proceeds to step S11. If the cancellation of the data transfer is determined in the command decoding, in step S11, the cancellation of the currently executed data transfer is instructed to the interface circuit unit 30, and the parameters saved in RAM 32 is erased to restore the interface circuit unit 30 to the initial status. If the data transfer is continued from the result of the command decoding in step S10, then after the command content of the task file register 54 is saved into the command queue 56 in step S10, the response content of the task control file register 58 is changed to the reception response of the command received during the data transfer in step S13, and the procedure proceeds to step S14 to transfer the content of the task control file register 58 to the host through the serial transmission line 15 via the send FIFO 60 at the transport layer 46, the link layer and the physical layer 42. At this point, if the suspend is performed by the instruction to the interface circuit unit 30, since this is at the timing when the reception of, for example, the data packet 86 of FIGS. 3A and 3B is completed, as the response packet to this, data for transferring the DMA activate packet 98 is already written in the task control file register 58. Therefore, in the invention, in step S13, this data for the DMA activate packet transfer is changed to the data for transferring the RegDH packet 96 of FIGS. 3A and 3B which indicates termination of the reception of the next command received during data transfer, and in step S14, this is transferred to the host as RegDH packet. Subsequently, in step S15, the parameters saved in RAM 32 for suspension are set into the interface circuit unit 30 to prepare for the resume of the data transfer. At this time, in the task control interface register 58, the data needed for transferring, for example, the unchanged DMA activate packet 98 of FIGS. 3A and 3B which is changed in step S13 is written again. Then, in step S16, the suspension of the interface circuit unit 30 is released to resume the data transfer.

(Conclusion of Data Packet Transfer upon Error)

Figure 17:
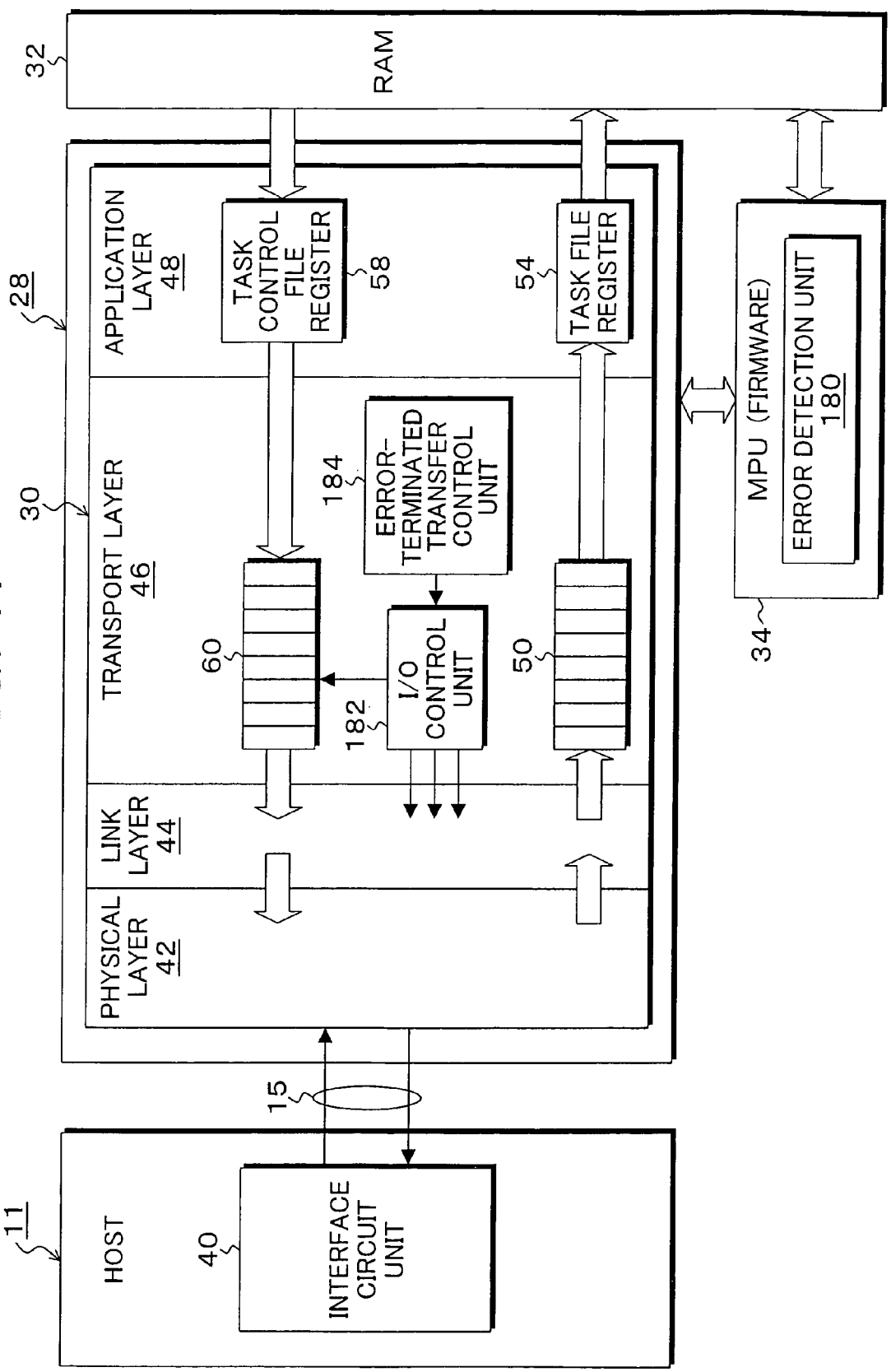
FIG. 17 is a block diagram illustrating an embodiment of the invention which concludes transfer of a data packet to the host even if data input to the send FIFO is halted by an error.

FIG. 17 is a block diagram of the interface circuit unit 30 provided on the hard disk controller 28 of FIG. 1, which is a embodiment of the invention for concluding data packet transfer to the host even if data input to the send FIFO 60 is halted by an error. In FIG. 17, the interface circuit unit 30 which is a target of the invention and provided on the hard disk controller 28 is consists of a physical layer 42, a link layer 44, a transport layer 46 and an application layer 48, just like the embodiment of FIG. 2. The transport layer 46 is provided with the receive FIFO 50 and the send FIFO 60. Also, the application layer 48 is provided with the task file register 54 and the task control file register 58. In this embodiment, in addition to these reception system and transmission system in the interface circuit unit 30, an I/O control unit 182 and an error-terminated transfer control unit 184 are further provided on the send FIFO 60. Also, in order to notify error detection to the error-terminated transfer control unit 184, an error detection unit 180, which is, for example, achieved by program control as firmware of MPU 34 in this embodiment, is provided. At the time of the packet transfer for the read data when the command packet for the read access from the host 11 is received, The I/O control unit 182 performs input control from the task control file register 58 and output control to the link layer 44 such that predefined one (1) unit of data stays in the send FIFO at the transport layer, and at the same time, inputs and outputs head signals, synchronizing with input and output of the data located at headmost position of the packet, and inputs and outputs tail signals, synchronizing with input and output of the endmost data of the packet. Specifically, if the tail signal is not present, the I/O control unit 182 forces one (1) unit of data to stay in the send FIFO 60, and if the tail signal is present, it forces the data not to stay. For the head signal corresponding to the packet headmost data and the tail signal corresponding to the packet endmost data, since the number of bytes of the transferred data is known from the received command when the packet transfer of the read data is executed, by counting the number of bytes of the data which in input to the application layer via the hard disk controller 28, it is possible to identify the headmost data and the endmost data to generate the head signal and the tail signal. When receiving a notification of detection of a data error to which error-correction cannot be performed, or so-called the uncorrectable error, from the error detection unit 180 provided on MPU 34, since the data input to the send FIFO 60 is halted by this occurrence of the error, the error-terminated transfer control unit 184 outputs the staying data in the send FIFO 60 to the link layer 44 with the tail signal in this condition, thereby makes the link layer 44 realize in a pseudo manner that the data of the data packet reaches the end, concludes the input data needed for the data packet even if the error occurs and make the interface circuit unit 40 of the host 11 conclude the transfer of the data packet from the link layer 44 via the physical layer 42. At this point, as one (1) unit of the staying data in the send FIFO 60, since the serial ATA interface is taken as an example in this embodiment, four (4) bytes of one (1) double word data, which is the minimum unit thereof, is forced to stay. Also, the capacity of the send FIFO 60 will be substantially small capacity relative to the size of the data packet transferred to the host 11 by the interface circuit unit 40. Specifically, in the serial ATA interface, the available data size for packet transfer, such as the data packet 172 shown in FIG. 12, is from minimum on (1) double word to maximum 2048 double words, and as the capacity of the send FIFO 60, 2048 double words (8192 bytes), which is the maximum capacity, may be considered. But, if such large size send FIFO 60 is utilized, the amount of hardware in the interface circuit unit 40 is increased, and the input and output process for the send FIFO 60 takes long time, therefore, in the send FIFO 60 in the invention, the memory capacity of two (2) double word may be used as the minimum configuration for enabling the process in which one of one (1) double word data, which is the minimum unit, always remains when input-output control is performed. Of course, two (2) double words or more may be used if needed, but the capacity does not have to be increased so much.

Figure 18A:
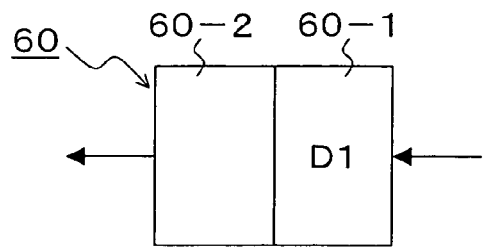
FIGS. 18A to 18D are explanatory diagrams of data input-output control for a send FIFO.
Figure 18B:
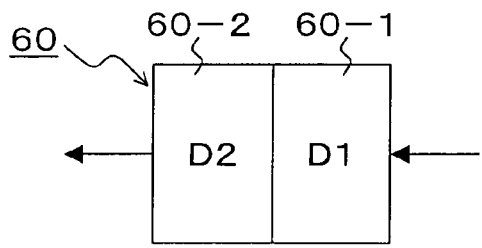
Figure 18C:
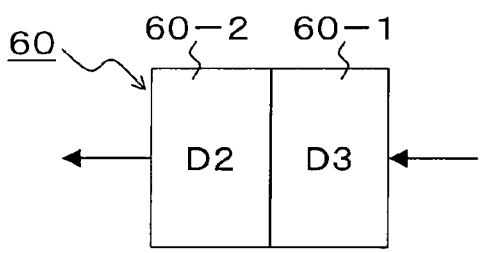
Figure 18D:
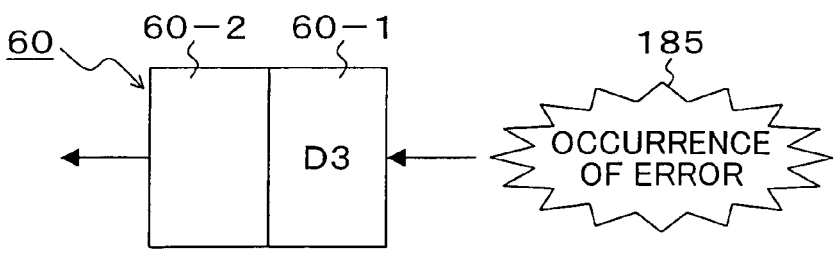

FIGS. 19A to 19D are explanatory diagrams of data input-output control in the case that the send FIFO 60 of FIG. 17 is the minimum configuration and illustrates an operation which forces data to stay without the tail signal. FIG. 18A is the case that a first headmost data D1 for packet transfer is input, and the send FIFO 60 is comprised of one-double-word-size areas 60-1 and 60-2 as the minimum configuration, therefore, for example, the headmost data D1 is stored into the area 60-1. Then, if a next data D2 is received as shown in FIG. 18B, after outputting the data D1 which is received and stored in advance, the next D2 is stored. Subsequently, a third data D3 is received as shown in FIG. 18C, after outputting the data D2 which is received in advance, the D3 is stored. If an error 185 occurs as shown in FIG. 18D after this data D3 is received, and data can not be received any more, the data D3, which is the last data before the error occurs, will always remain in the send FIFO 60. In this way, if the data D3 remains in the send FIFO when the error 185 occurs, by forcibly outputting the tail signal in synchronism with the output of this data D3, it is possible to recognize the endmost data of the packet data in the link layer 44, generate the data packet based on this, transfer it to the host side and conclude the transfer process of the data packet.

FIGS. 19A to 19H are time charts of normal input-output control in the send FIFO 60 of FIG. 17. FIGS. 19A to 19D show an input valid signal, an input head signal, an input tail signal and an input data to the send FIFO 60, respectively. Corresponding to these, FIGS. 19E to 19H show an output valid signal, an output head signal, an output tail signal and an output data from the send FIFO 60, respectively. When the first head data D1 needed for the transfer of the data packet is received as shown in FIGS. 19A to 19D, the input valid signal and the input head signal is generated by synchronizing to this. In this way, after a second data D2 is received and stored into the send FIFO 60, the head data D1 stored in the send FIFO 60 are read out as the head data D1 as shown in FIGS. 19E to 19H and, simultaneously, the output valid signal and the output head signal are generated to be sent to the link layer 44. Similarly, for the input of data D2 to D9, after waiting for each input, the data output to the link layer 44 and the generation of the output valid signal in synchronism with this are performed. When it is recognized from a valid count of the input data that the received data D10 is the endmost data of the packet, the input tail signal of FIG. 19C is generated based on the reception of the tail data D10, and the output tail signal and the output valid signal are sent to the link layer 44 by subsequent output control of FIGS. 19E to 19H, synchronizing to the readout of the tail data D10. In other words, since the tail signal is present, the data D10 are transferred without staying. In the link layer 44, when the output head signal is obtained, the start of frame (SOF) shown in FIG. 7 is generated and sent; then the pack t of FIG. 12 according to the frame information configuration (FIS) is structured and transferred; and finally, when the output tail signal is obtained, the end of frame (EOF) shown in FIG. 7 is generated and sent.

FIGS. 20A to 20H are time charts of input-output control when an error occurs in the send FIFO 60 of FIG. 17. The input and output of the data D1 to D5 in the input control of FIGS. 20A to 20D and the output control of FIGS. 20E to 20H are the same as the normal case in FIGS. 18A to 18D. However, it is assumed that the error 185 occurs immediately after the data D6 is stored into the send FIFO 60 as the input data of FIG. 20D, therefore the reception of the data is halted after that. At the time when the data input is halted by the occurrence of the error 185 in this way, the data D6 which is received immediately before the occurrence of the error 185 remains in the send FIFO 60. Therefore, according to the instruction to the I/O control unit 182, and as shown in the timing after the occurrence of the error 185 in FIGS. 20E and 20H, the error-terminated transfer control unit 184 which receives the error notification from the error detection unit 180 in FIG. 17 outputs the data D6 remaining in the send FIFO 60 and simultaneously generates the output valid signal, and in order to handle the data D6 as the tail data based on the error termination, generates the output tail signal and sends it to the link layer, as shown in FIG. 20G. Therefore, in the link layer 44, by recognizing the data D6 output from the send FIFO 60 as the endmost data based on the output tall signal output by the I/O control unit 182, transferring the data packet to the interface circuit unit 40 of the host 11 via the physical layer 42 and further generating and transferring the end of frame (EOF) of FIG. 12, the transmission sequence can be terminated.

FIGS. 21A to 21H are time charts in the case that the operation is halted because data does not remain in the send FIFO when an error occurs, as a comparative example of the time chart of the invention in FIGS. 21A to 21H. In FIGS. 21A to 21H, for the data D6 which is received immediately before the error 185, the data D6 is output with the output valid signal as shown in FIGS. 21E to 21H, according to the output control in the case that the condition of the output side in the normal FIFO is realized. Then, after that, since the data input to the send FIFO is completely cut off by the occurrence of the error 185, the data transfer and the output of the tail signal can not be performed, therefore the link layer 44 continues to wait for the data input, and finally, the error termination is performed by overtime. During this period, since the packet transfer to the host 11 is halted and in wait state, other packets can not be transferred, and the performance of transfer is deteriorated. For this problem, in the invention, if the data input to the send FIFO 60 is halted by the occurrence of error, data always remains according to the configuration of the input and output conditions in which, in the case that the tail signal is not present, the data received in advance is not output unless the next data is received, and by outputting the remaining last data in synchronism with the forcible generation of the tail signal for concluding the data for the packet because the error is detected, it is possible to conclude the packet data to the link layer 44 and, for the data obtained up to the occurrence of the error, normally transfer the data packet to the host 11 despite of the occurrence of the error. In addition, as the process after the packet transfer of the partially received data to the host 11 side because of the occurrence of the error, by notifying the occurrence of the error with the status packet from the device side to the host 11, the process in which the host 11 side accommodates this is executed in response to the notification of the occurrence of the error, and more specifically, the corresponding process such as read access to the remaining data is executed, because the data before the occurrence of the error has been normally received. Further, in the embodiment of FIG. 17, although specific processes are not shown for the side of the receive FIFO 50 and the task file register 54, the embodiment of FIG. 2 may be directly applied to this.

(Control Based on the Number of Packets)

Figure 22:
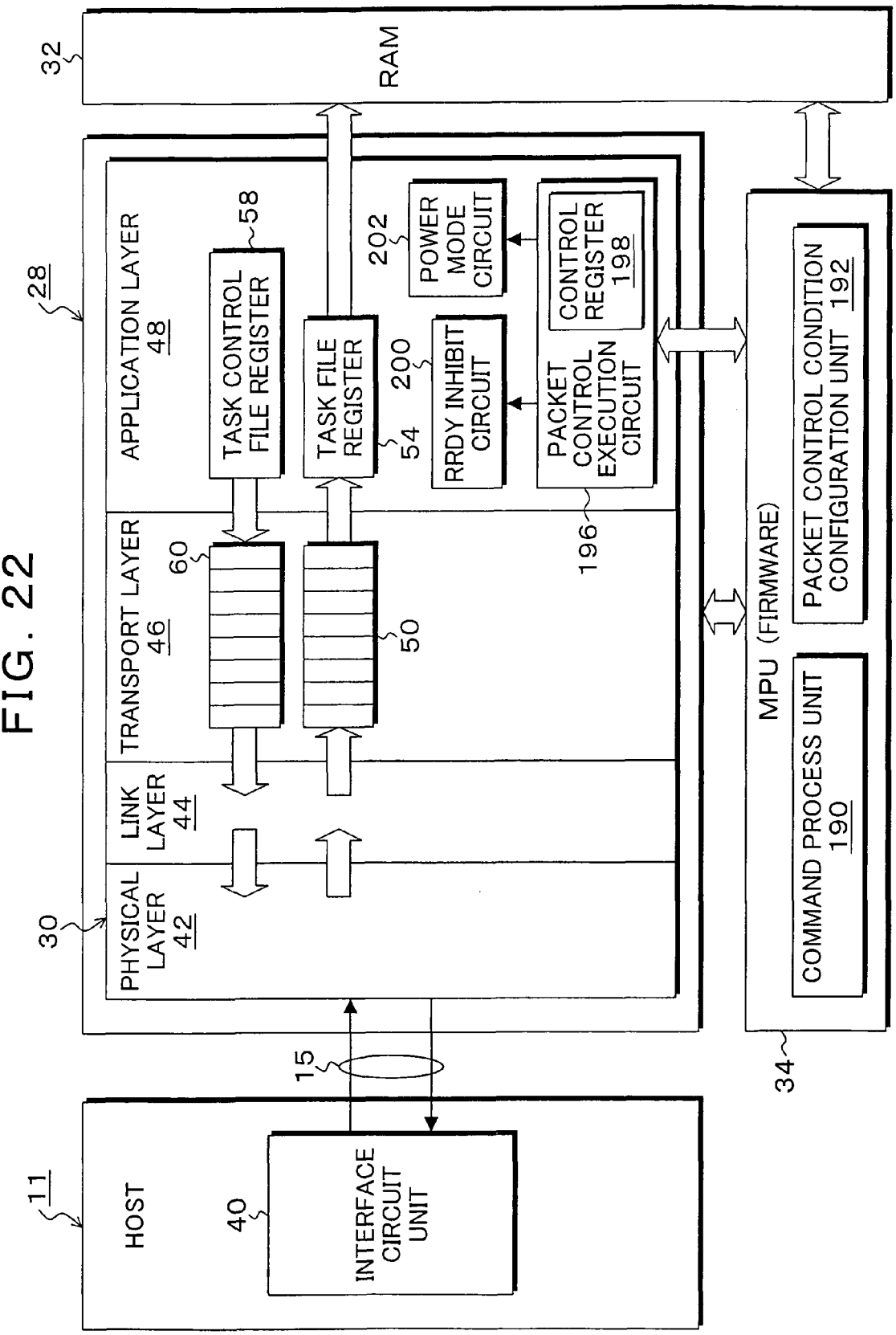
FIG. 22 is a block diagram of another embodiment of the invention which controls certain function according to the number of transferred packets.

FIG. 22 is a block diagram illustrating another embodiment of the invention which controls certain functions of the device interface according to the number of transferred packets and illustrates a hardware configuration of the interface circuit unit 30 of the hard disk controller 28 provided on the hard disk drive 10 of FIG. 1 and functions of MPU 34 as firmware. In FIG. 22, the interface circuit unit 30 provided on the hard disk controller 28 is consists of a physical layer 42, a link layer 44, a transport layer 46 and an application layer 48, just like the embodiment of FIGS. 3A and 3B. The transport layer 46 is provided with the receive FIFO 50 and the send FIFO 60, and the application layer 48 is provided with the task file register 54 and the task control file register 58. In this embodiment, in addition to this, a command processing unit 190 and a packet control condition setting unit 192 are further provided on MPU 34 which acts as firmware, and corresponding to this, a packet control execution circuit 196 comprising a control register 198, a reception ready inhibition circuit (RRDY inhibition circuit) 200 and a power mode circuit 202 is provided as hardware in the application layer 48 of the interface circuit unit 30. Based on the analysis result of the command which is received in the packet transfer from the interface circuit unit 40 of the host 11 and analyzed by hardware of the interface circuit unit 30, the command processing unit 190 provided on the MPU 34 as firmware executes the packet transfer control preparation to the host according to the command type and initiates protocols of the packet transfer to the host 11. The packet control condition setting unit 192 decodes the command received by the command processing unit 190 from the host 11 and, when the packet transfer is started, sets the type of a certain control function executed after start of the packet transfer and the number of received or transmitted packets which defines the start or end of the control function to the control register 198 of the packet control execution circuit 196. In this embodiment, as functions controlled by the number of the transferred packets, two (2) functions, which are:

(1) Cancellation of inhibition of the reception ready response (reception ready); and
(2) Control of turning to the power mode after receiving a certain command and transferring a packet, are taken as examples.

In order to achieve such control functions according to the number of the transferred packets, the application layer 48 is provided with the reception ready inhibition circuit 200 and the power mode circuit 202. The control register 198 which sets the control type and the number of packets at the time of the packet transfer preparation according to the packet control condition setting unit 192 has, for example, a configuration of FIG. 23. The control register 198 is, for example, the 16 bits control register and, when seen from the upper bit side, is provided with a reception ready inhibition bit 204 in 15th bit, a reception ready inhibition cancellation bit 206 in 14th bit and a power mode start bit 208 in 13th bit, and the number of packets 210 can be set in bit 12 to 0. Now, the inhibition and the inhibition cancellation of the reception response according to the number of transferred packets are described first. In the serial ATA interface to which the embodiment of FIG. 22 is applied, for example, the write commands according to DMA transfer from the host 11 to the hard disk controller 28 are taken as examples, four (4) types exist, which are:

(1) Write DMA Command;
(2) Legacy Queued Write DMA Command;
(3) First Pattern of First Party Queued Write DMA Command; and
(4) Second Pattern of First Party Queued Write DMA Command. In these DMA type write commands, the command processes of the packet transfer by the interface circuit unit 30 on the device side are different from each other.

Figure 24:
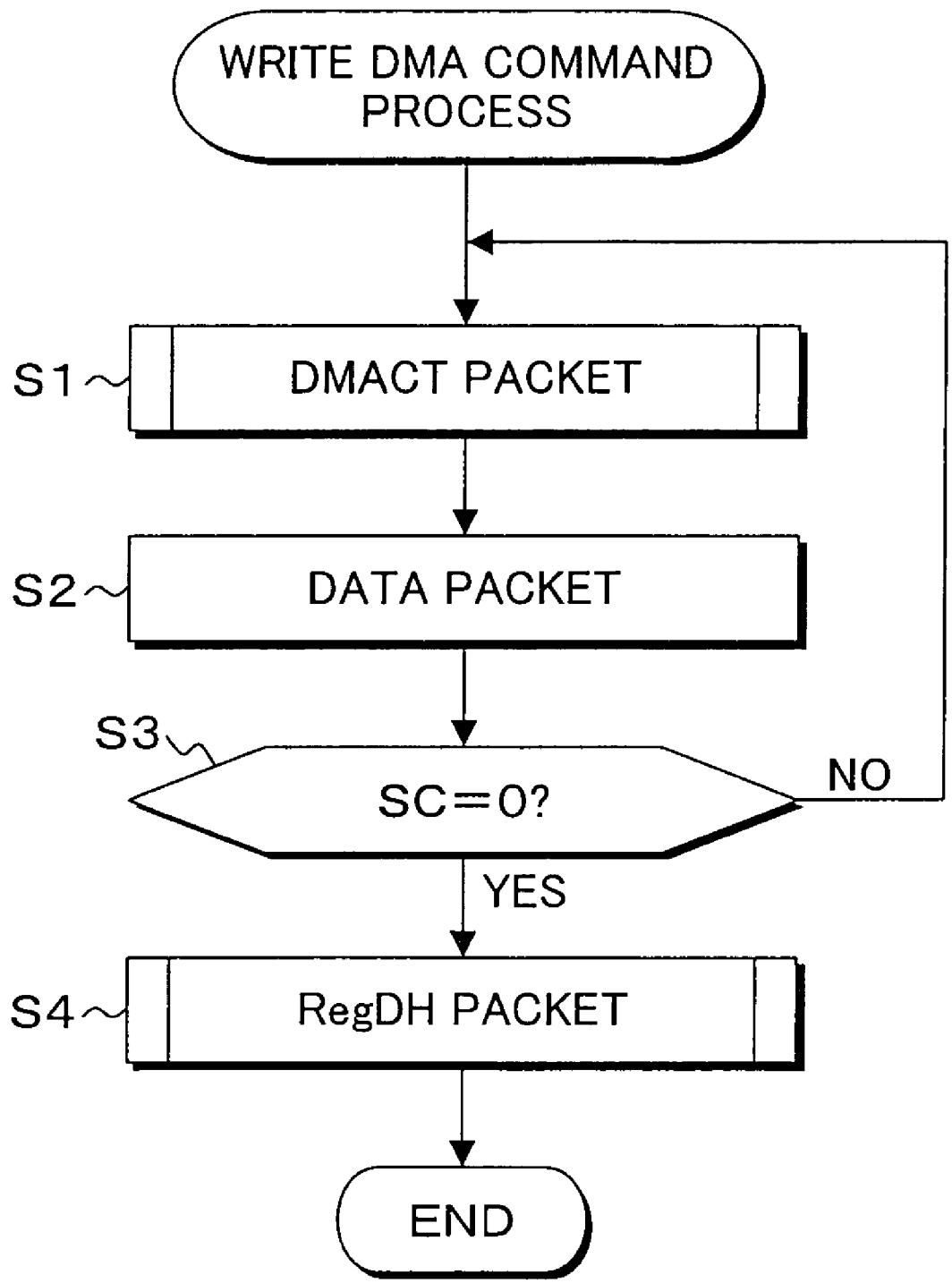
FIG. 24 is a flowchart of a write DMA command process.

FIG. 24 is a flowchart of a write DMA command process and illustrates the packet transfer process after the command received from the host 11 is analyzed. In this write DMA command process, first in step S1, the DMA activate packet (DMACT) is transferred to the host 11; then, the data packet is received from the host 11 in step S2; whether a sector counter SC increased by the received data reaches 0 or not is checked in step S3; and the process from step S1 is repeated until it reaches 0. If the sector counter SC reaches 0, termination of the transfer of the data packet is identified; proceed to S3 to S4; and the RegDH packet indicating the termination of the transfer is transferred to th3 host 11.

Figure 25:
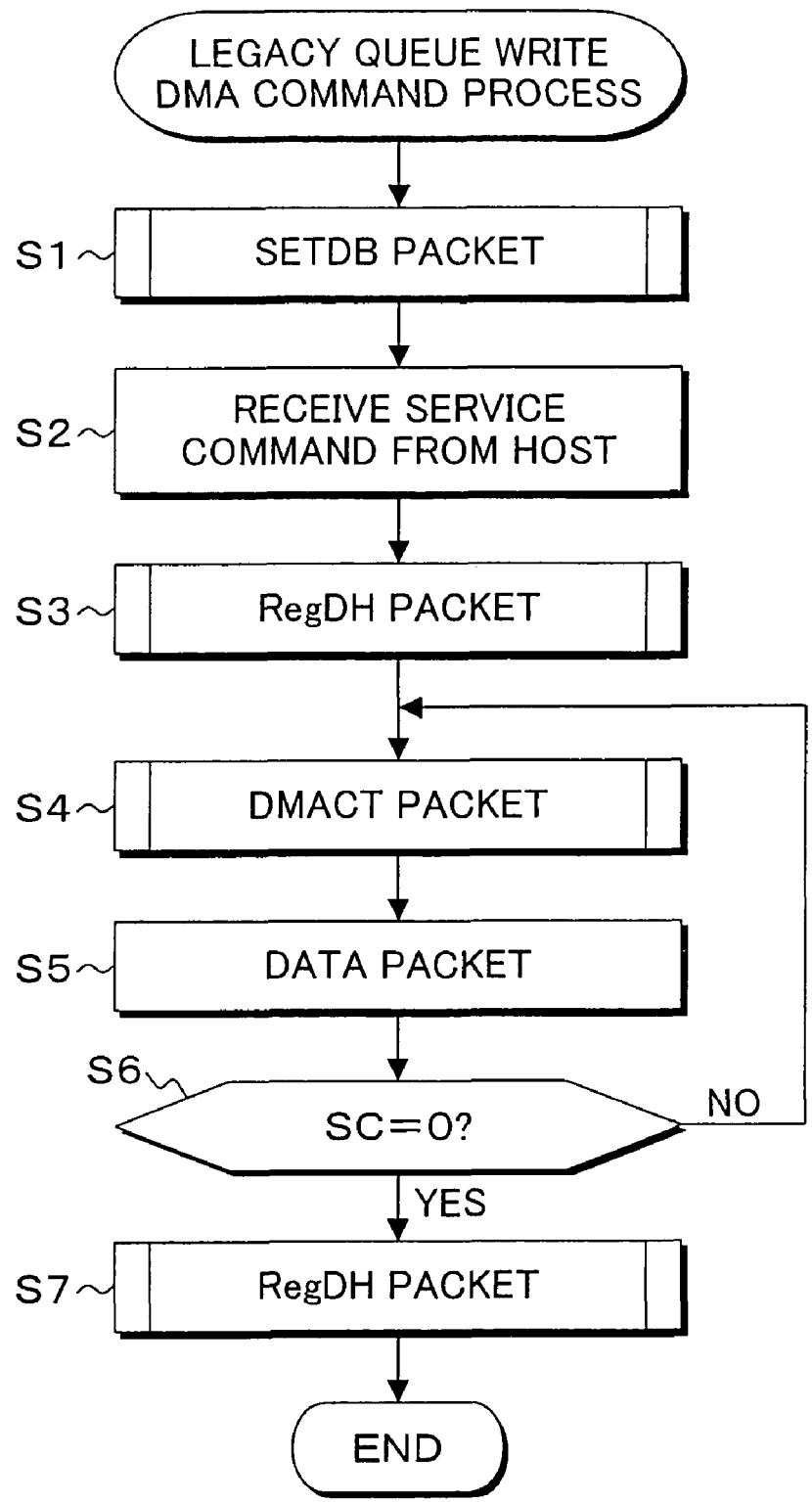
FIG. 25 is a flowchart of a legacy queue write DMA command process.

FIG. 25 is a legacy queued write DMA command process, and when the packet transfer is started by decoding the reception command from the host 11, first in step S1, the set device bits packet (SETDB packet) is transferred to the host 11; and then, a service command is received from the host 11 in step S2. Subsequently, after the RegDH packet is transferred to the host 11 in step S3, the DMA activate packet (DMACT packet) is transferred to the host 11 in step S4, then the data packet is received from the host in step S5, and the sector counter SC is checked in step S6. Then, the packet transfer in steps S4 and S5 is repeated until the sector counter SC becomes 0 in step S6, and if the sector counter SC becomes 0 by terminating the transfer of the data packet, the procedure proceeds to step S7, and the RegDH packet is transferred to the host 11 to notify the termination of the packet transfer.

Figure 26:
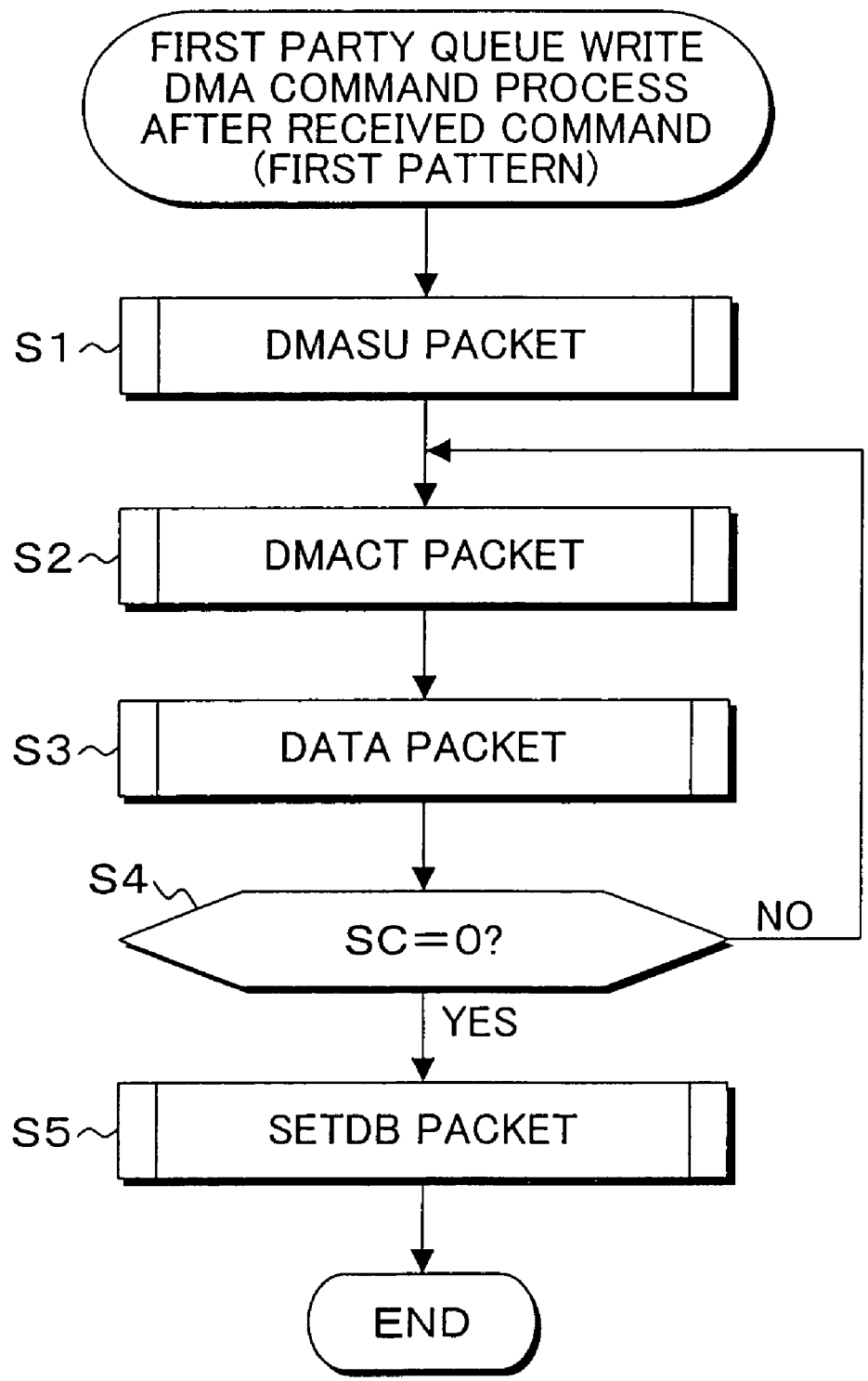
FIG. 26 is a flowchart of a first party queued write DMA command process as a first pattern.

FIG. 26 is a flowchart of a first party queued write DMA command process. In this case, the packet transfer is started after the command received from the host 11 is analyzed, and first, the DMA setup packet (DMASU) is transferred to the host 11 in step S1. Subsequently, after the DMA activate packet (DMACT packet) is transferred to the host 11 is step S2, the data packet is received from the host 11 is step S3. Then the sector counter SC is checked in step S4, and the packet transfer in steps S2 and S3 is repeated until it becomes 0. If the sector counter SC becomes 0, the procedure proceeds to step S5, and the set device bits packet (SETDB packet) indicating the termination of the packet transfer is transferred.

Figure 27:
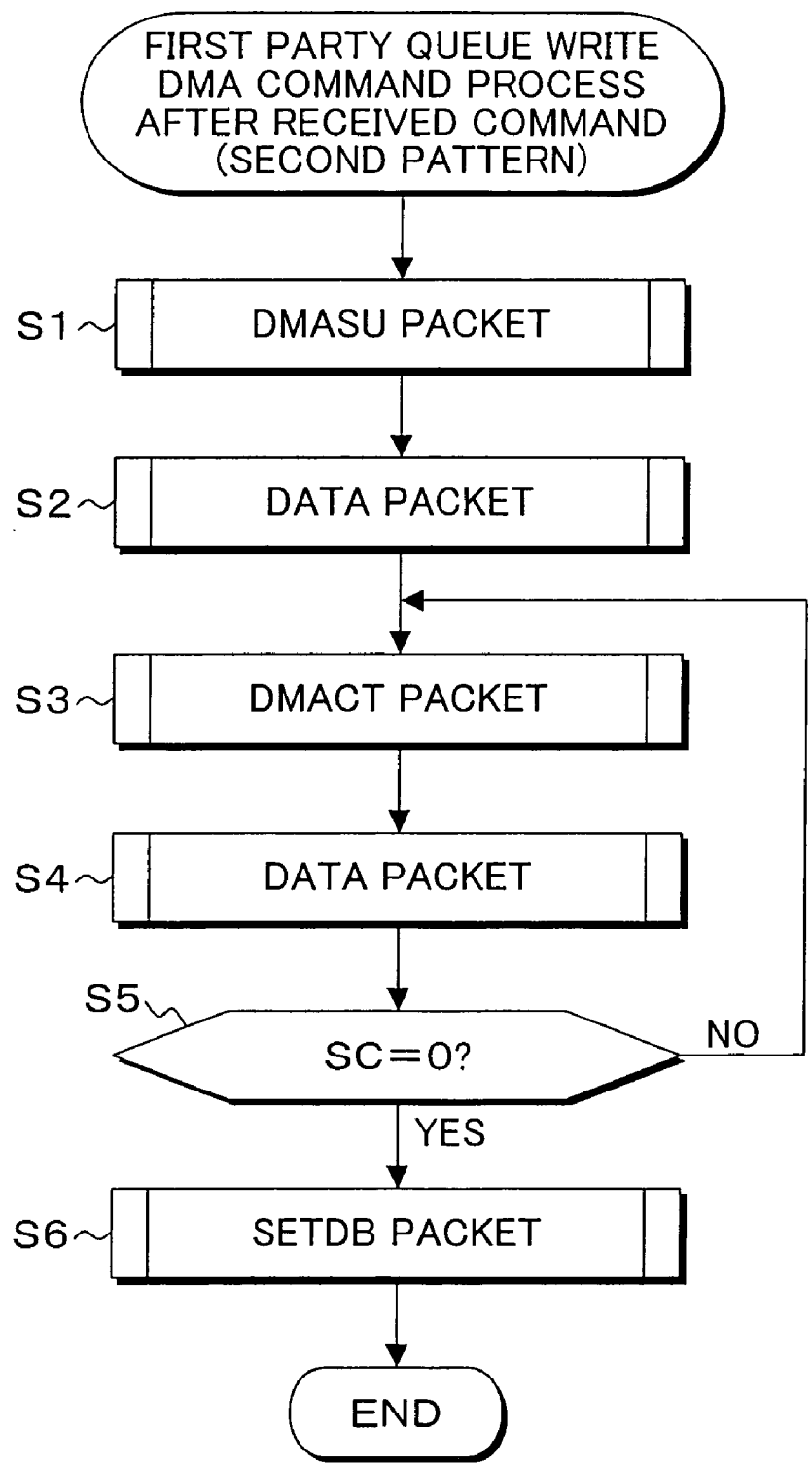
FIG. 27 is a flowchart of a first party queued write DMA command process as a second pattern.

FIG. 27 is a first party queued write DMA command process same as the FIG. 26, but this is a second pattern, contrary to the first pattern of FIG. 26. In addition, whether the first patter of FIG. 26 or the second pattern of FIG. 27 is utilized is set in the manufacturing phase of the apparatus. In the command process of the second pattern of FIG. 27, transferring the DMA setup packet (DMASU) to the host 11 is step S1 is same as the first pattern, but in the second pattern, the data packet is immediately received in next step S2, and then the transfer of the DMA activate packet (DMACT packet) and the data packet is repeated is step S3 until the sector counter SC becomes 0. When the sector counter SC becomes 0, the set device bits packet (SETDB packet) indicating the termination of the packet transfer is transferred to the host 11. Therefore, the efficiency of the data packet transfer is higher in the second pattern. If the next command packet request is generated in the host 11, and the transmission ready signal is sent during the packet transfer of the write DMA command from the host as shown in FIG. 24 to FIG. 27, in the interface circuit unit 30 on the device side, the packet transfer of the currently executed command is suspended, and the packet reception of the next command from the host 11 is performed. However, according to use of the command in some cases, if the next command transmission request from the host 11 is present during the packet transfer, it may be desirable to inhibit it and continue the packet transfer up to a certain packet. For example, in the second pattern of first party queued write DMA command process, after executing the command reception and the packet transfer preparation, it is needed to inhibit the packet transfer request according to the next command from the host 11, until the RegDH packet for response to the command reception and the subsequent DMASU packet of step S1 of FIG. 26 are transferred. In these cases, in the embodiment of FIG. 22, at the phase of the packet transfer preparation process based on the command analysis result of the command processing unit, to the control register 198 of the packet control execution circuit 196 provided on the application layer 48 of the interface circuit unit 30, or to the control register 198 of FIG. 23, the packet control condition setting unit 192 sets bit 1 as the reception ready inhibition bit 204, simultaneously sets the number of packets=2 as the number of packets 210, and then starts the packet transfer. When the setting of the reception ready inhibition bit 204 to the control register 198 and the configuration of the number of packets 210 to "2" are performed to start the packet transfer, the number of the transferred packet is matched with the set number of the transferred packets in the control register 198 at the time when the transfer of the RegDH packet for the command reception response to the device 11 and following DMA setup packet (DMASU packet) is completed in step S1 of FIG. 27, and at this point of time, the packet control execution circuit 196 resets the reception ready inhibition bit 204 in the control register 198 of FIG. 23 from the current value of 1 to 0 and simultaneously set the reception ready inhibition cancellation bit 205 from 0 to 1 by hardware thereof. Consequently, in the reception ready inhibition circuit 200 provided on the application layer 48, the reception ready inhibition control is performed until two (2) packets are transferred from the start of the packet transfer of the interface circuit unit 30, and if the transmission ready signal of the next command is received from the interface circuit unit 40 of the host 11, the reception ready signal is not returned, and the interruption of the packet transfer is inhibited. Then, after the second packet is transferred, the inhibition cancellation of the reception ready signal is automatically executed by hardware, and if the transmission request of the next command from the host 11 side is present during the further packet transfer, this is accepted, and the current packet transfer is interrupted to execute a new command reception process.

Figure 28B:
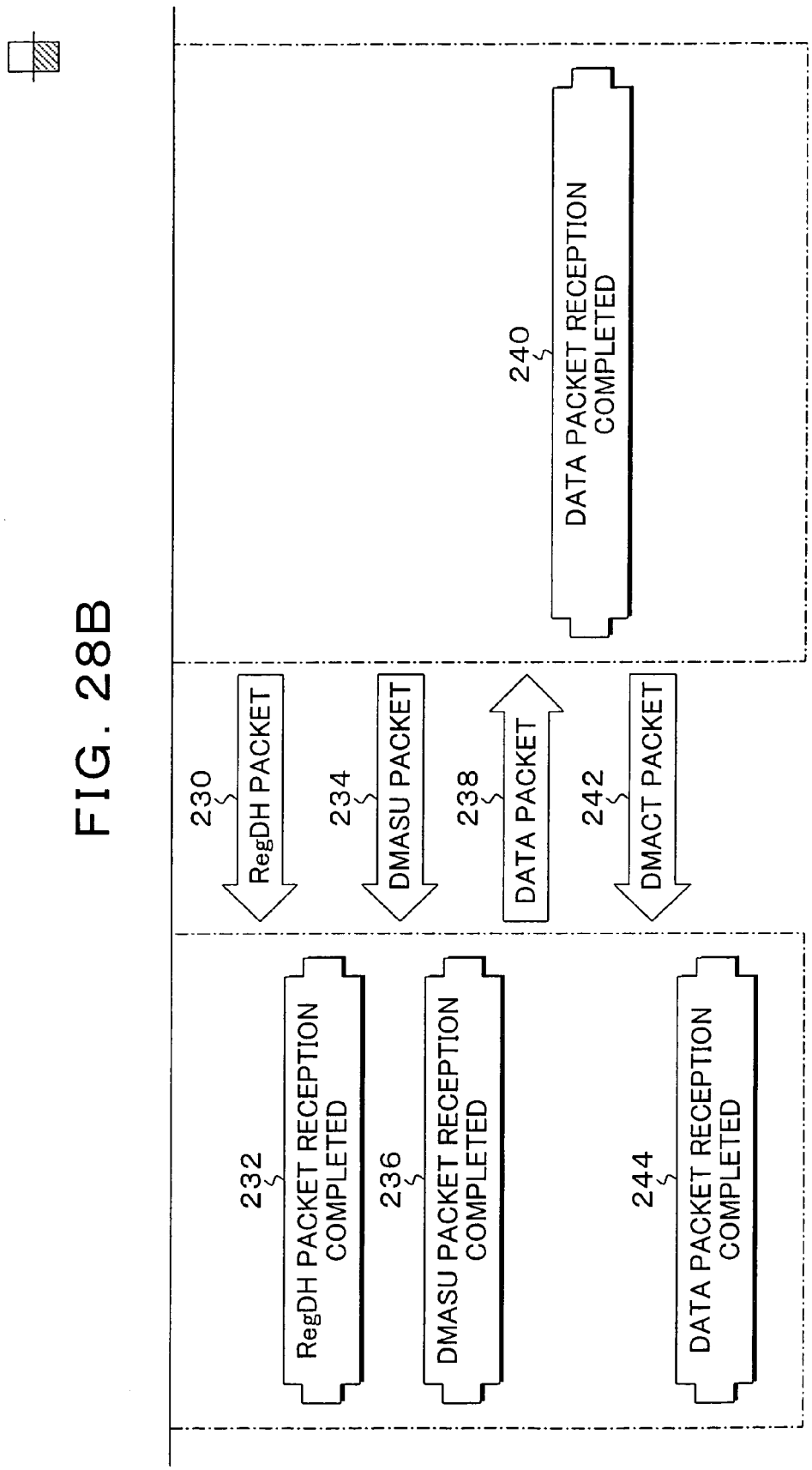

FIGS. 28A and 28B are time charts of a packet transfer in the command process of FIG. 27 in the embodiment of FIG. 22, in the case that the transmission request of the next command is not present during the packet transfer. In FIGS. 28A and 28B, if the command packet transmission request 212 is generated in the host, the transmission ready signal (XRDY) transmission 214 to the device 10a which is the hard disk drive is performed; the reception ready signal (RRDY) transmission 218 is performed if the device 10a side is in the packet reception OK state 216; the host 11 performs the command packet transmission 220 in response to this; the command packet is sent to the device 10a by the packet transfer 224; and the command RegHD packet reception is completed 226. At this point, in protocols for transferring the command from the host 11 to the command 10a, the packet transfer is performed via three (3) stages of the signal transmission, which are:

(1) Transmission ready signal (XRDY) transmission 214;
(2) Reception ready signal (RRDY) transmission 218; and
(3) Packet transmission 224, and these three (3) transfer process is put together to illustrate the transfer of the RegHD packet 224, as shown in the surrounding dotted lines.

Therefore, for the purpose of simplifying the description, the packet transfer after the RegHD packet 224 is shown by block arrows in which the transmission ready signal (XRDY), the reception ready signal (RRDY) and the packet transmission are put together. This is the same for each packet shown in FIGS. 3A to FIG. 6 corresponding to the embodiment of FIG. 2. Referring to FIG. 28A and 28B again, in the device 10a, when the command RegHD packet reception is completed 226, the command analysis is performed by hardware of the application layer 48, and based on this command analysis result, MPU 34 as firmware executes the packet preparation process 228. This packet preparation process 228 consists of following process steps.

Step S1: process packet information analyzed by hardware.
Step S2: prepare packet to send.
Step S3: configure start of the packet transfer.

When this packet preparation process 228 by firmware is performed, then the RegDH packet 230 is transferred to the host 11 as the response packet indicating the normal reception of the command, and in the host 11, the RegDH packet reception is completed 232. Subsequently, the device 10a transfers the DMA setup packet (DMASU packet) 234, and in the host 11, the DMA setup packet reception is completed 236. Then, the host 11 transfers the data packet 238 to the device 10a, and in the device 10a, the data packet reception is completed 240 in response to this. Next, the device 10a send the DMA activate packet (DMACT packet) 242 to the host 11, and the DMACT packet reception is completed 244 in response to this. After that, the reception of the data packet from the host 11 and the transmission of the DMACT packet to the host are repeated until the sector counter becomes 0 according to the reception of the data packets on the device 10a side, and finally, the process is terminated by transferring the set device bits packet (SETDB packet) from the device 10a to the host 11 as shown in step S6 of FIG. 25.

FIGS. 29A and 29B are time charts of a packet transfer process, which is similar to FIGS. 28A and 28B, for the second pattern of the command reception in FIG. 27, and in this case, after the transfer process of the RegDH packet 230 is executed in the device 10a, and the RegDH packet reception is completed in the host 11, a next command packet transmission request 246 is generated. If the next command packet transmission request 246 is generated, and the reception ready inhibition is not performed in the device 10a side, then, in response to the transmission ready signal (XRDY) transmission 248 associated with the next command packet transmission request 246, the reception ready signal (RRDY) transmission 250 is performed, then the packet transmission 254 is performed by the next command packet transmission 252, and in the device 10a, the packet reception for the next command is completed 256. The transmission ready signal (XRDY) transmission 248, the reception ready signal (RRDY) transmission 250 and the packet transmission 254 are the transfer of the RegDH packet 255 for the next command transfer, and during this period, the packet transfer after the DMASU packet 234 performed in FIG. 28 is aborted in the device 10a, therefore a time delay is generated in the currently executed packet transfer. Thus, in this case, in the embodiment of FIG. 22, when the packet preparation process is executed by MPU 34 as firmware associated with the completion of the command reception, the packet control condition setting unit 192 sets the number of the transfer packets until the inhibition and the inhibition cancellation of the reception ready signal (RRDY) in the control register 198 and forces to inhibit the packet transmission request of the next command from the host 11 until the transfer of packets up to the set number is completed.

Figure 30A:
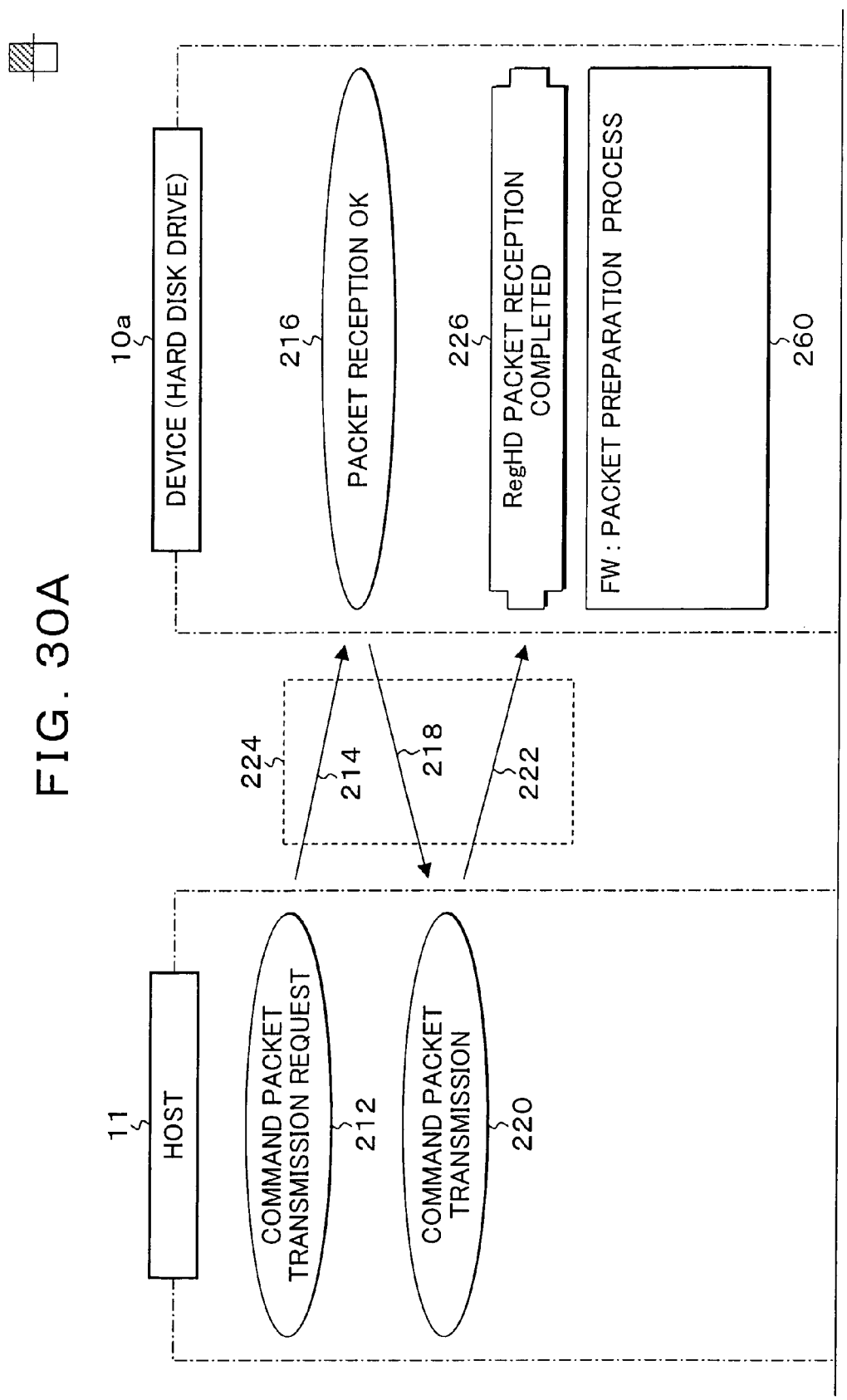
FIGS. 30A and 30B are time charts of packet transfer control according to the embodiment of FIG. 22 which inhibits next command request from the host during packet transfer.
Figure 30B:
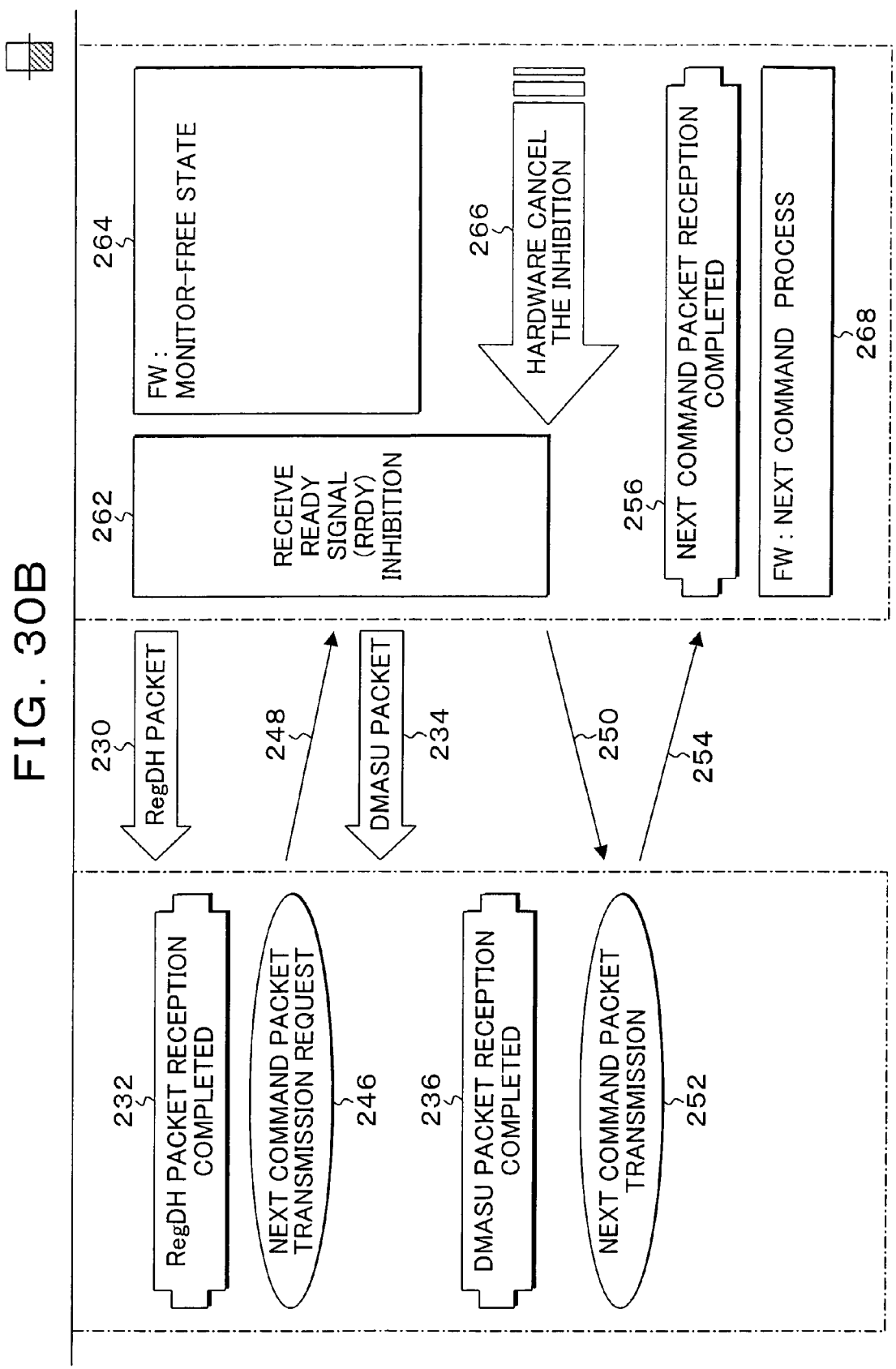

FIGS. 30A and 30B are time charts of a packet transfer process according to the embodiment of FIG. 22 which inhibits the next command request from the host 11 and cancels the inhibition after the transfer of packets up to the number set in the packet preparation process phase is completed during the packet transfer. In FIGS. 30A and 30B, from the command packet transmission request 212 of the host 11 to the RegHD packet reception completion 226 of the device 10a is the same as FIG. 30, but after setting of the reception ready signal (RRDY) inhibition bit 204, resetting of the reception ready signal (RRDY) inhibition cancellation bit 206 and setting of the number of packets 210 to "the number of packets=2" in the control register 198 of FIG. 23 is performed in the next packet preparation process 260 by MPU 34 as firmware, the packet transfer is started. In this case, the reception ready signal (RRDY) inhibition 262 is performed until reaching the number of packets=2 after start of the transfer. Therefore, as is the case with FIG. 29, after the transfer of the RegDH packet 230, when the next command packet transmission request 246 is generated in the host 11, and the transmission ready signal (XRDY) transmission 248 is performed, the reception response signal (RRDY) to the host 11 is not sent according to the reception ready signal (RRDY) inhibition 262, and the next DAMSU packet 234 is transferred based on the current executed command. When this transfer of DAMSU packet 234 is completed, the hardware of the interface circuit unit 30 on the device 10a side determines that the set number of packets is matched with the number of the transferred packets, and by resetting the reception ready signal (RRDY) inhibition bit 204 from 1 to 0 and simultaneously setting the reception ready signal (RRDY) inhibition cancellation bit 206 from 1 to 0 in the control register 198 of FIG. 23, a hardware inhibition cancellation 266 shown in FIGS. 30A and 30B is performed. Therefore, for th already received transmission ready signal (XRDY) transmission 248 associated with the next command packet transmission request 246, the reception ready signal (RRDY) transmission 250 is performed from the device 10a in response to the inhibition cancellation; the next command packet transmission 252 is achieved; the packet transmission 254 is performed; the next command packet reception is completed 256 in the device 10a; and MPU 34 as firmware executes the next command process 268. At this point, during the reception ready signal (RRDY) inhibition 262 in the interface circuit unit 30 of the device 10a is in progress, MPU 34 as firmware is in a monitor-free state 264 in which monitoring of the packet transfer status for canceling the inhibition of the reception ready signal is not needed, and in the monitor-free state, it can execute other internal processes.

Figure 31:
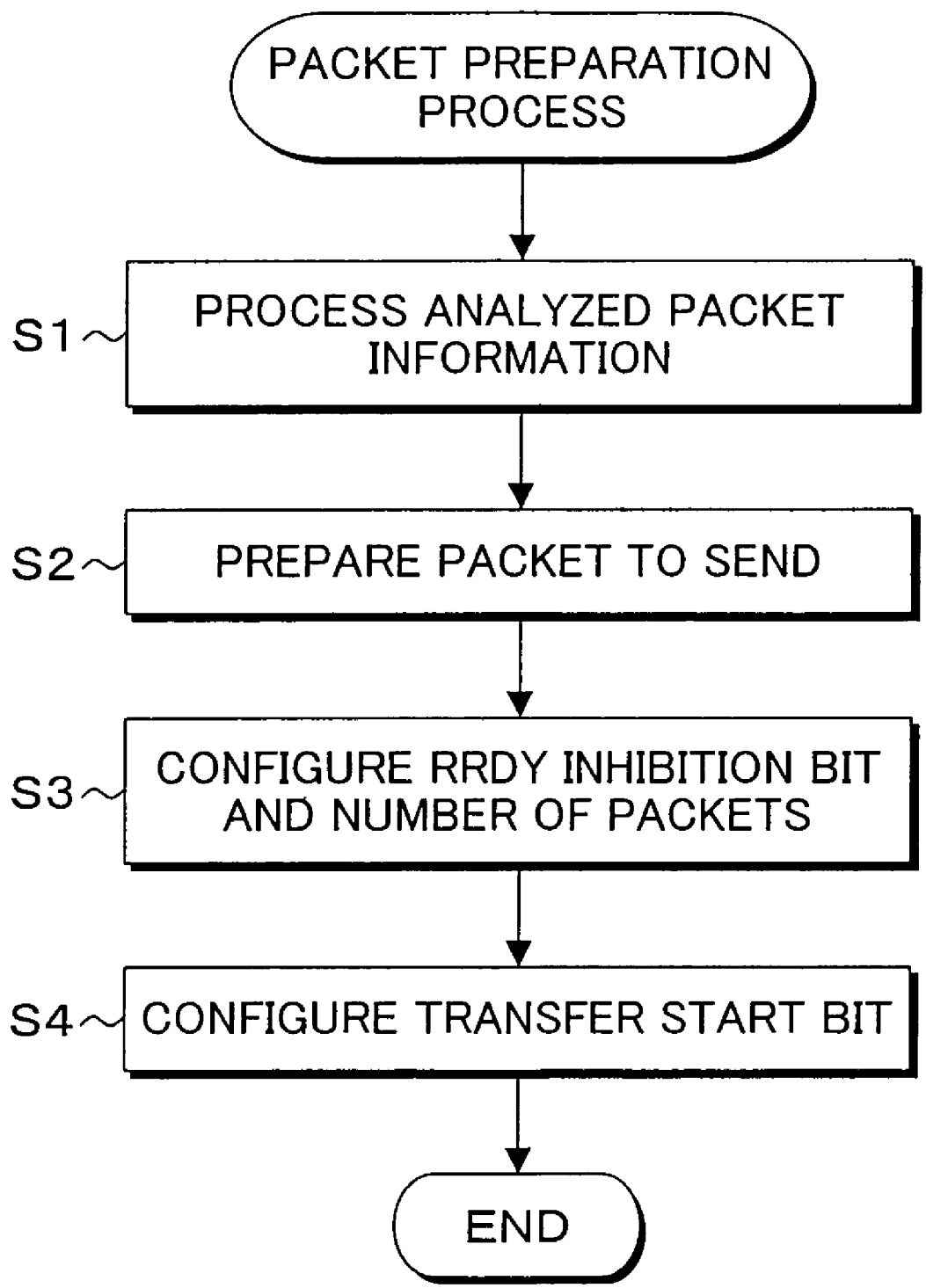
FIG. 31 is a flowchart of a packet preparation process by a firmware on the device side of FIGS. 30A and 30B.

FIG. 31 is a flowchart illustrating a process procedure of the packet preparation process 260 by MPU 34 as firmware in the device 10a of FIGS. 30A and 30B. In this packet preparation process, the packet information analyzed by the hardware of the interface circuit unit 30 is processed in step S1, and after the transmission packet is prepared in step S2, the inhibition bit of the reception ready signal (RRDY) and the number of packets at which the inhibition cancellation is executed are set in the control register 198 of FIG. 23 in step S3, and after that, the transfer start bit is set in step S4 to start the packet transfer process. Next, a power mode control process when the packet transfer is terminated by receiving a certain command in the embodiment of FIG. 22 is described. The power mode process associated with the packet transfer is, for example, the process in the case that a seek request command is received from the host 11.

Figure 32:
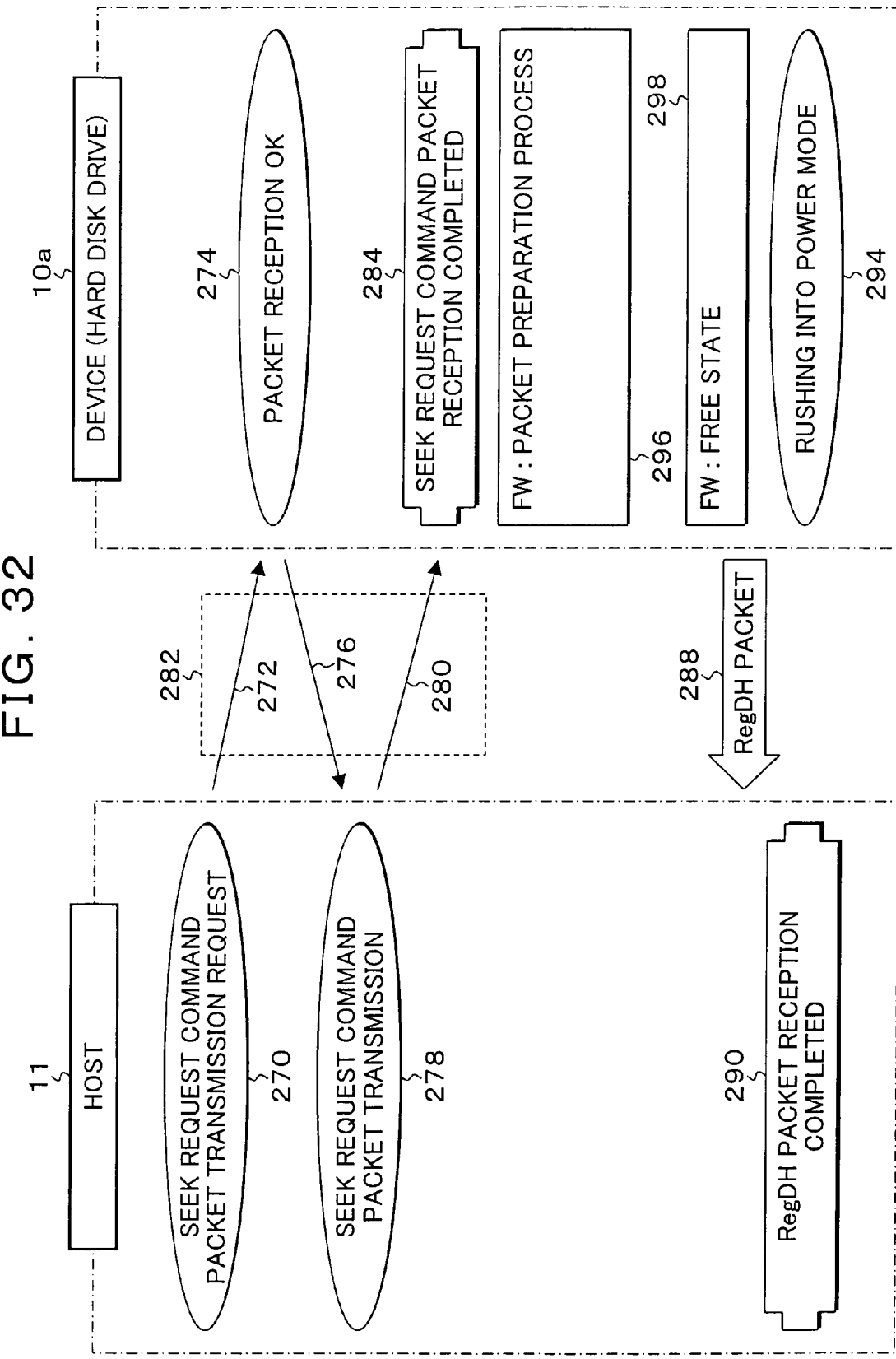
FIG. 32 is a time charts of packet transfer control according to the embodiment of FIG. 22 which enters a power mode when transfer of a response packet to a seek request command is terminated.

FIG. 32 is a time chart of control which forces into power mode according to the configuration of the number of packets after the seek request command is received. In FIG. 32, when the seek request command packet transmission request 270 is generated from the host 11, as shown collectively by the RegHD packet 282, the transmission ready signal (XRDY) transmission 272 is executed, and if the device 10a side is in the packet reception OK state 274, the reception ready signal (RRDY) transmission 276 is executed. In response to this, the host 11 executes the packet transmission 280 according to the seek request command packet transmission 278, and in the device 10a side, the seek request command packet reception is completed 284. Subsequently, MPU 34 as firmware executes the packet preparation process 296.

Figure 33:
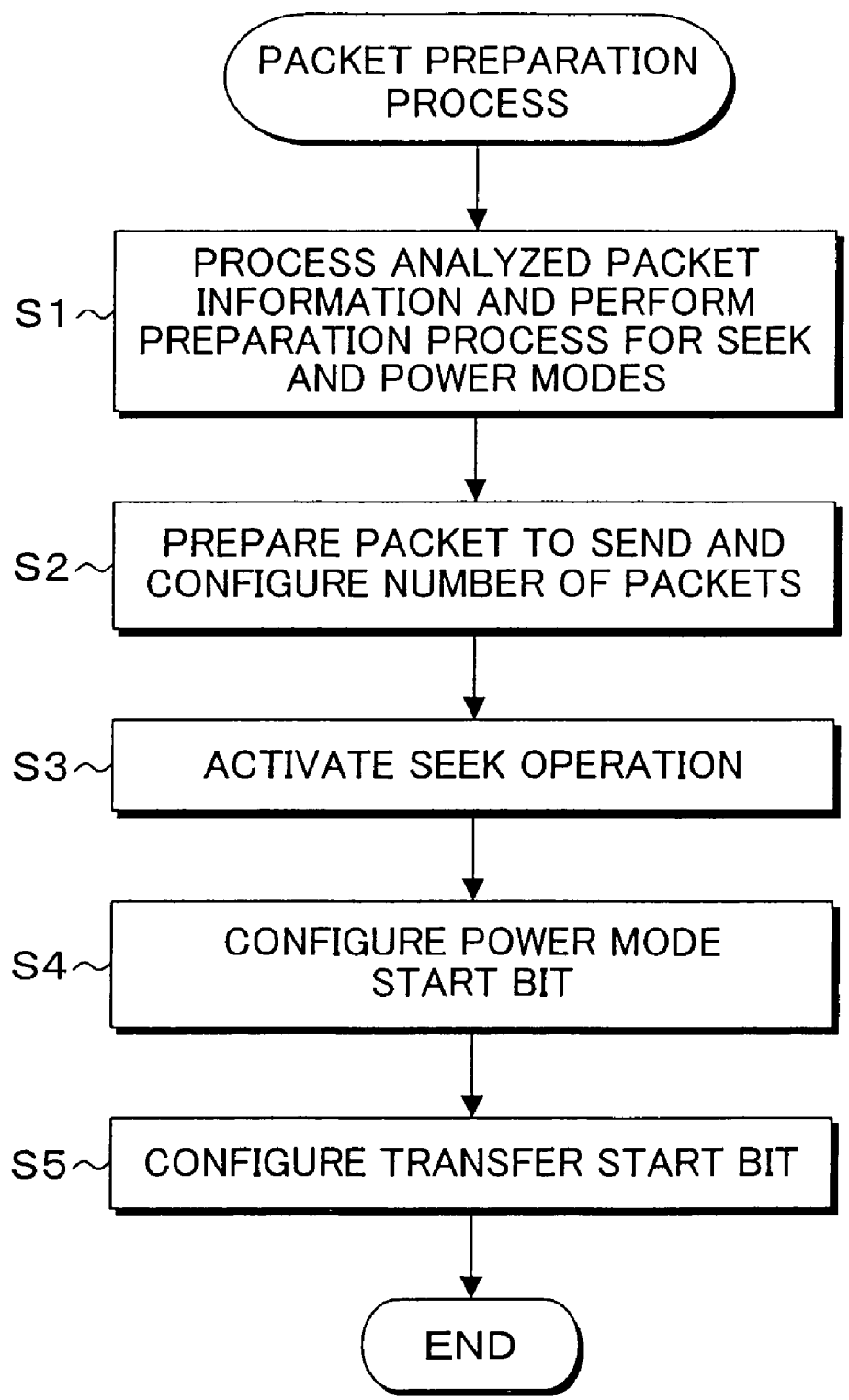
FIG. 33 is a flowchart of a packet preparation process by a firmware on the device side of FIG. 32.

This packet preparation process 296 is executed as shown in a flowchart of FIG. 33. First, the packet information analyzed by the hardware of the interface circuit unit 30 is processed in step S1, and a preparation processes for the seeking and the power mode is executed. Then, the packet to be sent is prepared in step S2, and simultaneously, the number of packets for entering the power mode is set to "the number of packets=1" in this example. Then, after executing a process for activate the seek operation in step S3, the power mode start bit 208 is set from 0 to 1 in the control register 198 of FIG. 23 in step S4, and the transfer start bit is set in step S5 to start the transfer process.

Referring to FIG. 32 again, when the packet transfer is started by this packet preparation process 296, the RegDH packet 288 is transferred as the response packet to the already received RegHD packet 282 from the host 11, and in the host 11, the RegDH packet reception is completed 290. Then, when the transfer of the RegDH packet 288 to the host 11 is completed, since the number of the transferred packets is matched with "the number of packets=2" which is set in the number of packets 210 in the control register 198 of FIG. 23, the power mode circuit 202 operates in response to a signal output by the packet control execution circuit 196 of FIG. 22, and entering power mode 294 is performed. In the process according to this entering power mode 294, the power save control is performed for reducing the power consumption in the interface circuit unit 30, unless the command transfer request from the host 11 is present, until the seek operation is completed in the interface circuit unit 30 of FIG. 22. In addition, the comparison of the number of the transferred packets and the set number of the packets for forcing the entry into the power mode 294 is performed by the hardware of the interface circuit unit 30, and during this period, MPU 34 as firmware is in free state 298 and can executes other internal processes.

Figure 34:
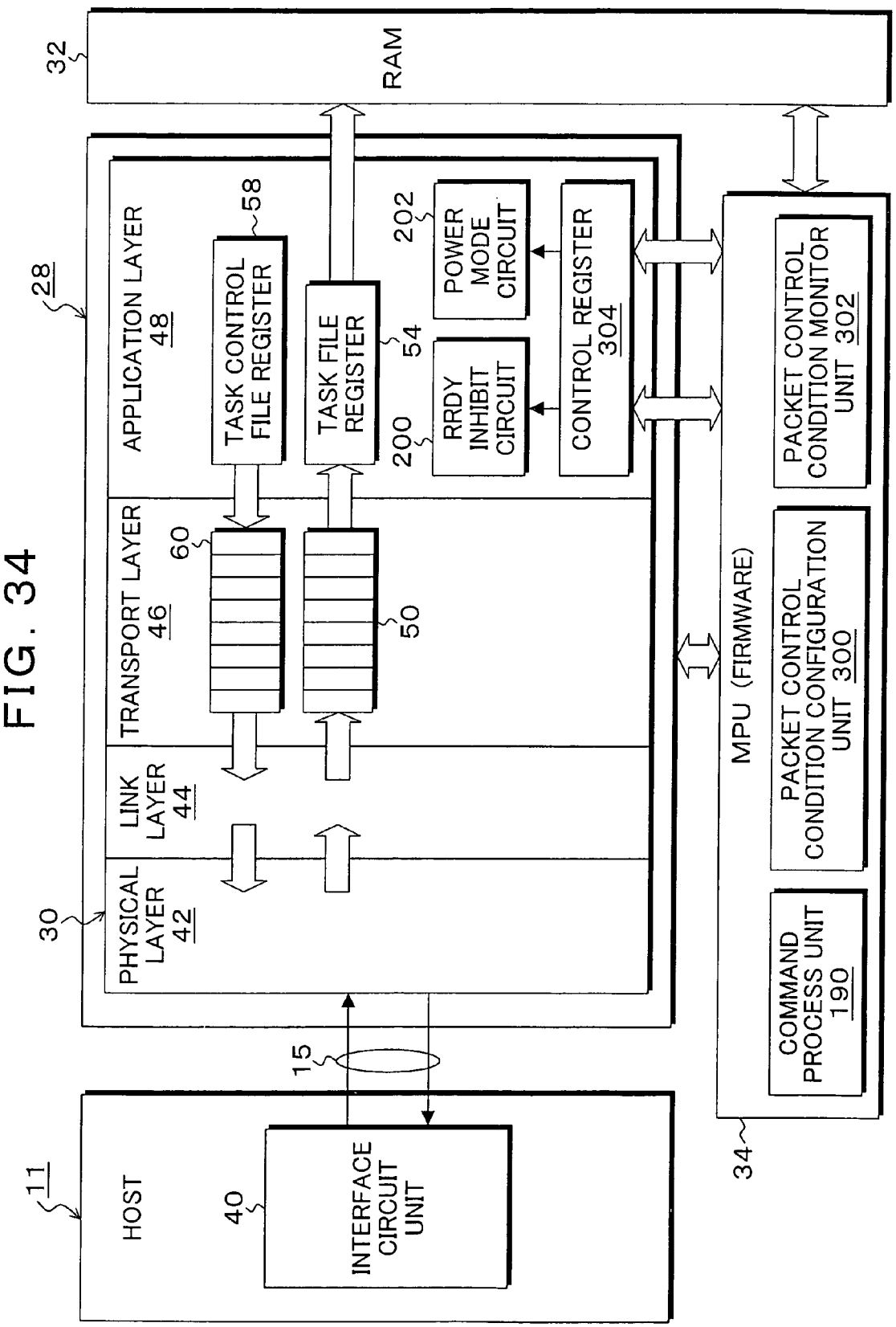
FIG. 34 is a block diagram of another embodiment of the invention which is activated or halted by monitoring certain function with a firmware according to the number of packets.
Figure 35:
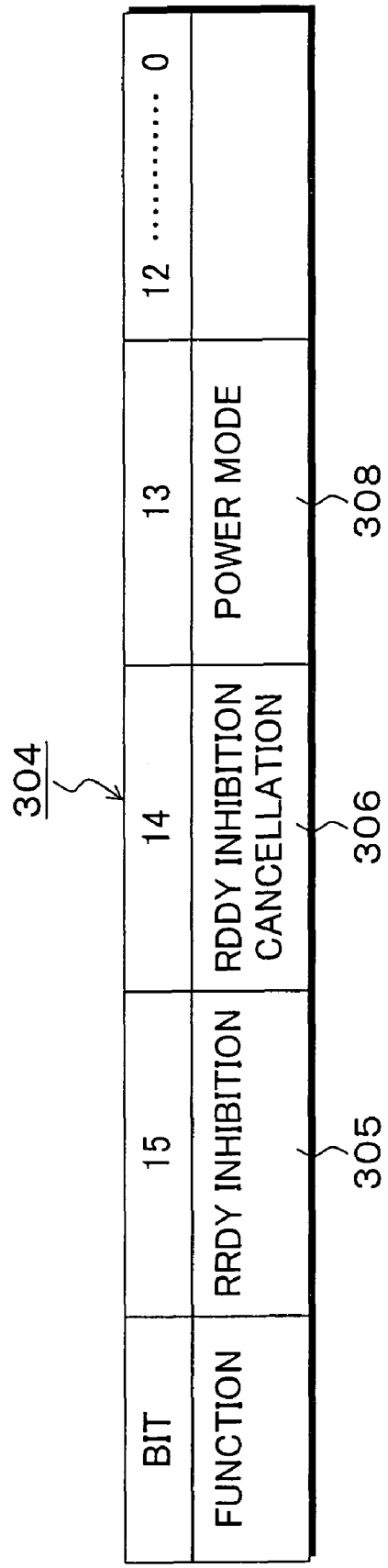
FIG. 35 is an explanatory diagram of a control register used in the embodiment of FIG. 34.

FIG. 34 is a block diagram of another embodiment of the invention which controls a certain function according to the number of the packets transferred after the command from the host is received, and although, in the embodiment of FIG. 22, the number of the packets is determined by the hardware on the side of the interface circuit unit 30 for controlling a certain function, but this embodiment is wherein this is performed on the side of MPU 34 as firmware. Therefore, in the embodiment of FIG. 34, MPU 34 as firmware is provided with a packet control condition monitor unit 302, in addition to the command processing unit 190 and the packet control condition setting unit 300. Also, on the side of the interface circuit unit 30, the reception ready (RRDY) inhibition circuit 200 and the power mode circuit 202 are provided as is the case with FIG. 22, but since the monitoring of the number of the transferred packet is performed on the MPU 34 side, only the control register 304 is provided, and as shown in FIG. 35, the reception ready signal (RRDY) inhibition bit 305, the reception ready signal (RRDY) inhibition cancellation bit 306 and the power mode start bit 308 are provided on this control register 304, but the configuration of the number of the packets as shown in FIG. 23 is not executed.

Figure 37:
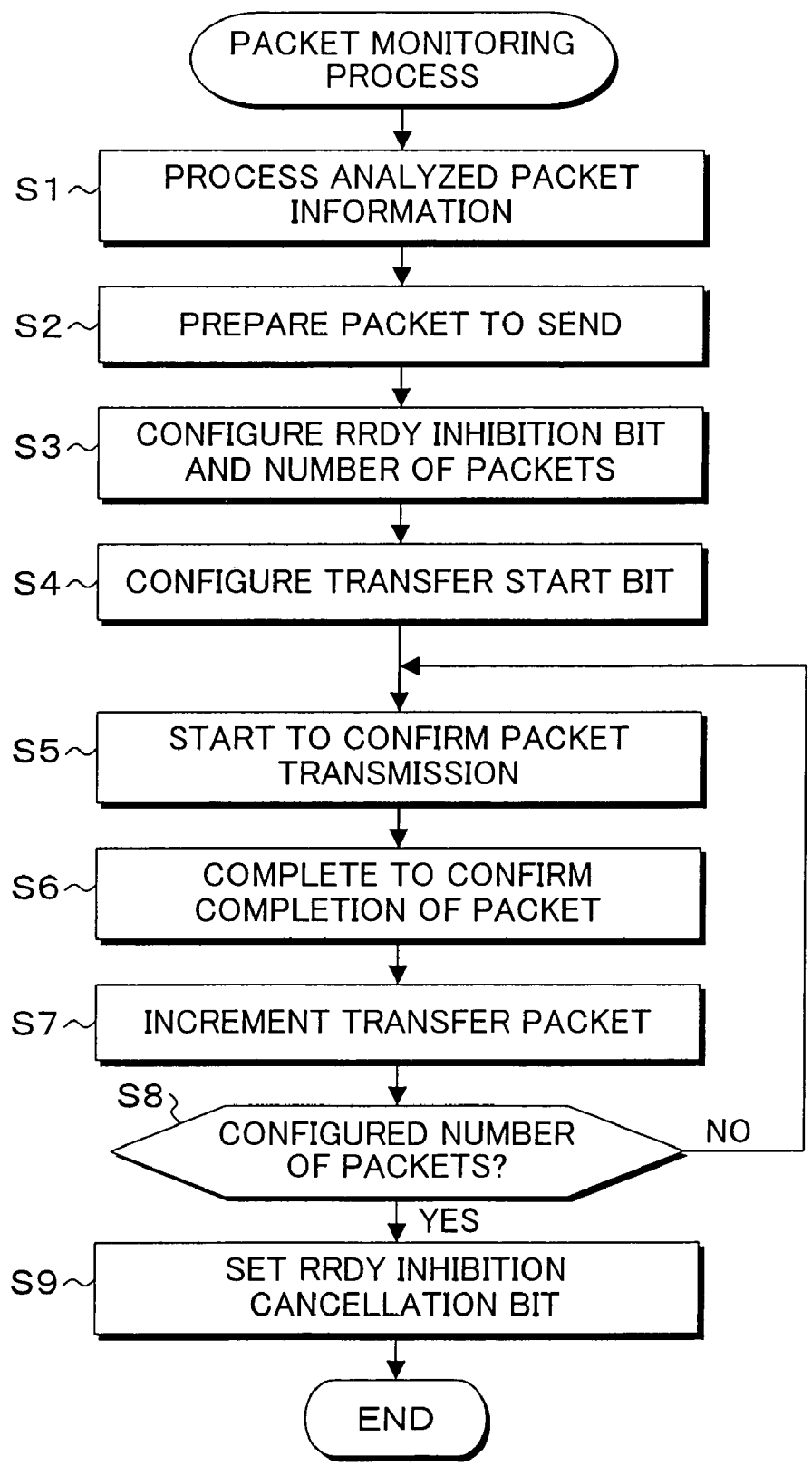
FIG. 37 is a flowchart of a packet monitoring process by the firmware of FIGS. 36A and 36B.

FIGS. 36A and 36B are time charts in the case that the transfer request of the next command from the host 11 is inhibited during the period for the two (2) headmost packets of the packet transfer from the device according to the second pattern of the command process in FIG. 27 in the embodiment of FIG. 34. Comparing FIGS. 36A and 36B to the case of FIGS. 30A and 30B that the number of the transferred packet is monitored by the hardware, it is different in that the packet preparation process 310 and the packet monitor process 314 is executed by firmware, and other processes are the same. Process procedures of the packet preparation process 310 and the packet monitor process 314 by firmware in FIGS. 36A and 36B are as shown in FIG. 37. In FIG. 37, steps S1 to S4 are the packet preparation process 310, and next steps S5 to S9 are the packet monitor process 314. In this transferred packet monitor process, after the packet information analyzed by the hardware of the interface circuit unit 30 is processed in step S1, and the transmission packet is prepared in step S2 as a preparation process, in step S3, the reception ready signal (RRDY) inhibition bit and the number of packets are set in the control register 304 of FIG. 35. In this case, the number of packets at which the inhibition is executed is set to "the number of packets=2". Subsequently, the transfer start bit is set in step S4, and after the packet transfer process is initiated, a monitor process from step S5 starts. In the packet monitor process, the start of the packet transmission is confirmed in step S5; completion of the packet transmission is confirmed in step S6; the number of the transferred packets is incremented by 1 in step S7; by comparing this to the set number of packets in the control register 304, whether it is matched or not is determined in step S8; and the process from step S5 is repeated until it is matched. If the number of the transferred packets is matched with the set number of packets, the procedure proceeds to step S9 to set the reception ready signal (RRDY) inhibition cancellation bit 306 of FIG. 35, and in this way, the transmission request of the next command from the host 11 is allowed to be accepted.

Figure 38:
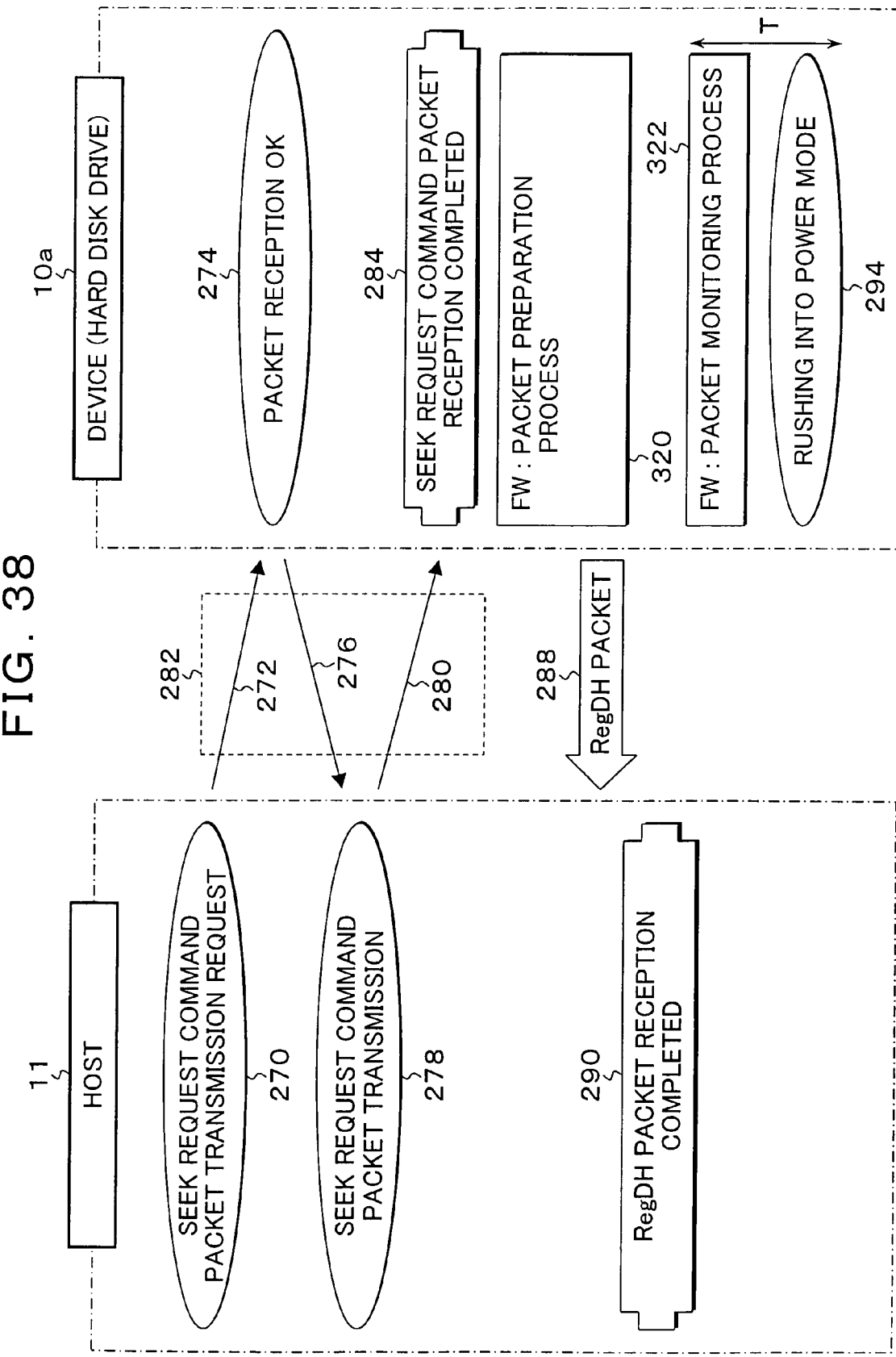
FIG. 38 is a time charts of packet transfer control according to the embodiment of FIG. 22 which monitors with a firmware that transfer of a response packet to a seek request command is terminated and enters a power mode.
Figure 39:
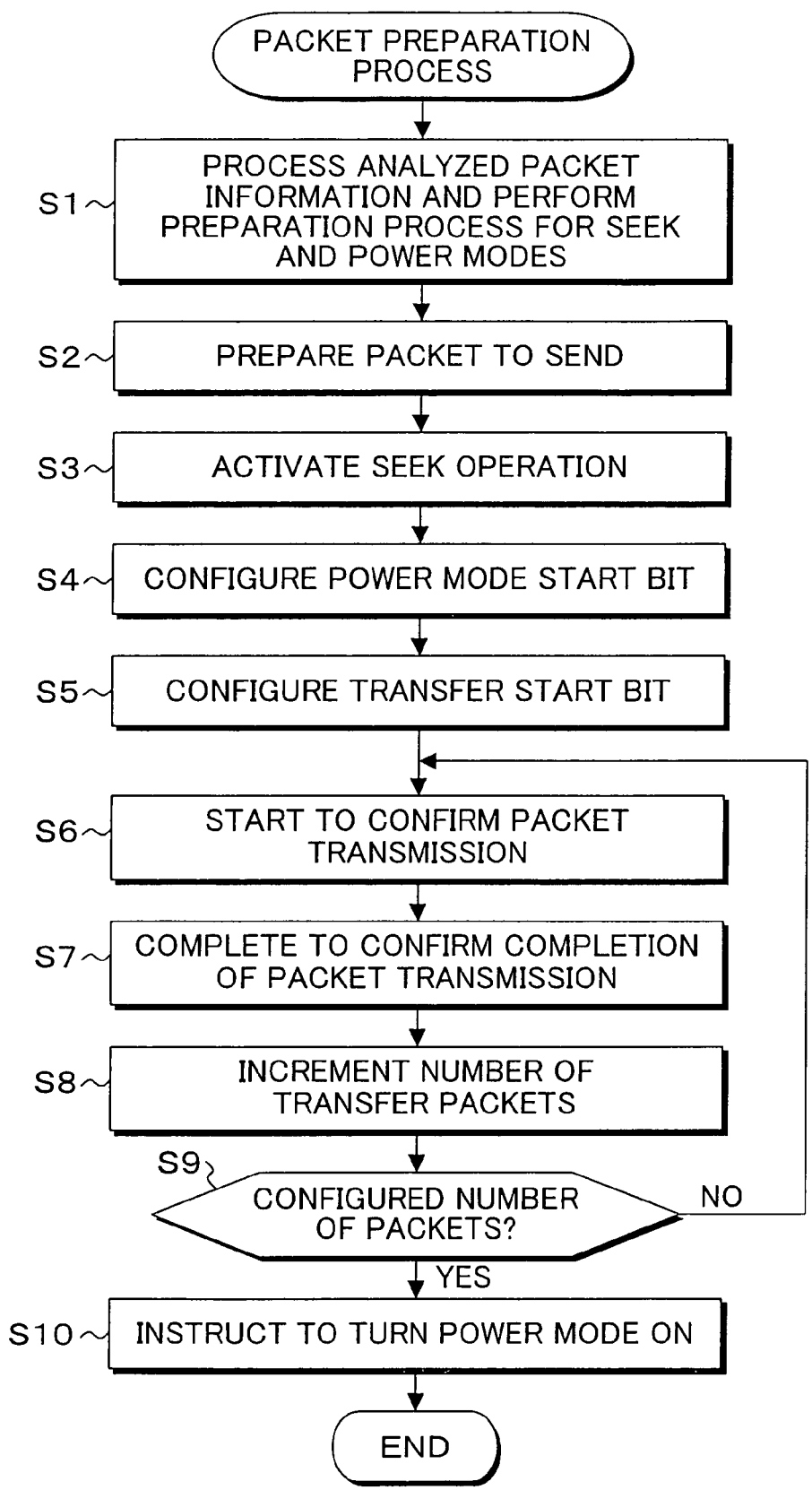
FIG. 39 is a flowchart of a packet preparation process by a firmware of FIG. 38.

FIG. 38 is a time chart of a control process for entering the power mode after receiving the seek request command from the host 11 and transferring the predefined number of packets in the subsequent packet transfer in the embodiment of FIG. 34. This control for entering the power mode according to the transfer associated with the execution of the seek request command is basically the same as the embodiment in FIG. 32 that the number of the transferred packets are monitored by the hardware of the interface circuit, but it is different in that the packet preparation process 320 and the packet monitor process 322 is executed by MPU 36 as firmware. Process procedures of the packet preparation process 320 and the packet monitor process 322 executed by firmware are as shown in a flowchart of a packet preparation monitor process of FIG. 39. In the flowchart of FIG. 39, steps S1 to S5 are the packet preparation process 320, and remaining steps S6 to S10 are the packet monitor process 322. First, in the packet preparation process, the packet information for the seek request command analyzed by the hardware of the interface circuit unit 30 is processed in step S1, and the preparation processes for the seeking and the power mode is executed. Then, the packet to be transferred is prepared in step S2. Further, after activating the seek operation in step S3, the power mode start bit 308 is set in the control register 304 of FIG. 35 in step S4, and the transfer start bit is set in step S5 to start transfer. In the packet monitor process during the transfer, the start of the packet transmission is confirmed in step S6; completion of the packet transmission is confirmed in step S7; the number of the transferred packets needed for entering the power mode is incremented by 1 in step S8; and it is compared to the previously set number of the transferred packets needed for entering the power mode, for example, "the number of the transferred packets=1" in step S9. In this case, since the set number of packets is reached by the transfer of one (1) packet, the procedure proceeds to S10, and the instruction for turning power mode on is performed to the power mode circuit 202 to force the interface circuit unit 30 to enter into the power save operation state for reducing the power consumption. At this point, in the embodiments of FIG. 22 and FIG. 34, although the inhibition and the inhibition cancellation of the reception ready response or the turning the power mode on after receiving the seek request command are taken as examples of certain functions controlled by the number of the transferred packets, this can be directly applied to any other functions for which control is started or stopped by the number of the transferred packets needed on the device side associated with the packet transfer with the host.

Also, in above embodiments, the case that the serial ATA interface is applied to the invention is taken as an example of the packet transfer using the serial transmission line, but the invention is not limited thereto and can directly apply to any suitable serial interface.

Further, in above embodiments, the data transfer between the host and the hard disk drive is taken as an example, but the device may be any suitable device other than the hard disk drive.

What is claimed is:

1. A device interface apparatus having a physical layer, a link layer, a transport layer and an application layer, for transferring commands and data in packet format by serial transmission between a device and a host, the interface apparatus comprising:

a receive FIFO disposed at the transport layer and configured to store on a first-in first-out basis a command packet or a data packet received from the host via the physical layer and the link layer;

a command detector configured to detect the command packet stored in the receive FIFO during data transfer and to output a command detection signal;

a receive task file register disposed at the application layer and configured to load the command content of the receive FIFO;

a send task file register disposed at the application layer and configured to load a command or data for packet sending;

a send FIFO disposed at the transport layer and configured to store on a first-in first-out basis the content of the send task file register, the send FIFO causing a command packet or a data packet to be sent to the host via the link layer and the physical layer;

an available time generator configured to generate an available time for receiving another command packet from the host during data transfer; and a mid-transfer command processor unit, when a command packet is received from the host during the available time, configured to suspend the data transfer to decode the received command packet for execution of processing and thereafter to resume the data transfer;

wherein the mid-transfer command processor comprises a firmware implemented by execution of a program, and wherein the mid-transfer command processor comprises:

a suspend processor, when the command detection signal is output from the command detector for the command packet received during the available time and stored in the receive FIFO, configured to suspend the currently executed data transfer and to save parameters upon the suspension into a memory;

a command decoder configured to decode the command content loaded from the receive FIFO into the receive task file register;

a data transfer abort module, when abortion of the data transfer is determined by the command decoder, configured to discard the currently executed command packet and the saved parameters and to terminate the data transfer; and a transfer resume module, when continuance of the data transfer is determined by the command decoder, configured to throw the command content of the receive task file register into a command queue, to store command reception response information into the send FIFO and sending a command reception response packet to the host via the link layer and the physical layer, the transfer resume module configured to thereafter release the suspend of the data transfer and to set the saved parameters to resume the data transfer.

2. The interface apparatus according to claim 1, wherein the available time generator is configured to detect completion of the transfer of the data packet sent to or received from the host and to generate the available time upon detecting the completion.

3. The interface apparatus according to claim 1, wherein the transfer resume module is configured to rewrite the data stored in the send FIFO upon suspending of data transfer into response data to the received command packet for transfer of a command reception response packet, the transfer resume module is configured to thereafter set the saved parameters to resume the data transfer.

4. A device interface apparatus for transferring commands and data in packet format by serial transmission between a device and a host, the interface apparatus comprising:
   a receive FIFO configured to store on a first-in first-out basis a command packet or a data packet received from the host;
   a command detector configured to detect the command packet stored in the receive FIFO during data transfer and to output a command detection signal;
   a receive task file register configured to load the command content of the receive FIFO;
   a send task file register configured to load a command or data for packet sending;
   a send FIFO configured to store on a first-in first-out basis the content of the send task file register and to cause a command packet or a data packet to be sent to the host;
   an available time generator configured to generate an available time for receiving another command packet from the host during data transfer; and
   a mid-transfer command processor, when a command packet is received from the host during the available time, configured to suspend the data transfer to decode the received command packet for execution of processing and thereafter to resume the data transfer;
   wherein the mid-transfer command processing unit is firmware implemented by execution of a program, and wherein the mid-transfer command processor comprises:
      a suspend processor, when the command detection signal is output from the command detector for the command packet received during the available time and stored in the receive FIFO, configured to suspend the currently executed data transfer and to save parameters upon the suspension into a memory;
      a command decoder configured to decode the command content loaded from the receive FIFO into the receive task file register;
      a data transfer abort module, when abortion of the data transfer is determined by the command decoder, configured to discard the currently executed command packet and the saved parameters and to terminate the data transfer; and
      a transfer resume module, when continuance of the data transfer is determined by the command decoder, configured to throw the command content of the receive task file register into a command queue, to store command reception response information into the send FIFO and to send a command reception response packet to the host, the transfer resume module thereafter configured to release the suspend of the data transfer and to set the saved parameters to resume the data transfer.

5. The interface apparatus according to claim 4, wherein the available time generator is configured to detect completion of the transfer of the data packet sent to or received from the host and to generate the available time upon detecting the completion.

6. The interface apparatus according to claim 4, wherein the transfer resume module is configured to rewrite the data stored in the send FIFO upon suspending of data transfer into response data to the received command for transfer of a command reception response packet, the transfer resume module thereafter configured to set the saved parameters to resume the data transfer.

7. A packet transfer method for a device interface having a physical layer, a link layer, a transport layer and an application layer, the device interface transferring commands and data in packet format by serial transmission between a device and a host, the device interface including:
   a receive FIFO disposed at the transport layer and configured to store on a first-in first-out basis a command packet or a data packet received from the host via the physical layer and the link layer;
   a command detector configured to detect the command packet stored in the receive FIFO during data transfer and to output a command detection signal;
   a receive task file register disposed at the application layer and configured to load the command content of the receive FIFO;
   a send task file register disposed at the application layer and configured to load a command or data for packet sending; and
   a send FIFO disposed at the transport layer and configured to store on a first-in first-out basis the content of the send task file register, the send FIFO causing a command packet or a data packet to be sent to the host via the link layer and the physical layer;
   the packet transfer method comprising:
   an available time generation step generating an available time for receiving another command packet from the host during data transfer; and
   a mid-transfer command processing step, when a command packet is received from the host during the available time, configured to suspend the data transfer to decode the received command packet for execution of processing and thereafter to resume the data transfer;
   wherein the mid-transfer command processing step comprises:
      a suspend processing step, when the command detection signal is output from the command detector for the command packet received during the available time and stored in the receive FIFO, configured to suspend the currently executed data transfer and to save parameters upon the suspension into a memory;
      a command decode step configured to decode the command content loaded from the receive FIFO into the receive task file register;
      a data transfer abort step, when abortion of the data transfer is determined by the command decode step, configured to discard the currently executed command packet and the saved parameters and to terminate the data transfer; and
      a transfer resume step, when continuance of the data transfer is determined by the command decode step, configured to throw the command content of the receive task file register into a command queue, to store command reception response information into the send FIFO, to send a command reception response packet to the host via the link layer and the physical layer, thereafter to release the suspend of the data transfer and to set the saved parameters to resume the data transfer.

8. The packet transfer method according to claim 7, wherein
the available time generation step includes detecting completion of the transfer of the data packet sent to or received from the host and generating the available time upon detecting the completion.

9. The packet transfer method according to claim 7, wherein
the transfer resume step includes rewriting the data stored in the send FIFO upon suspending of data transfer into response data to the received command for transfer of a command reception response packet and thereafter setting the saved parameters to resume the data transfer.

10. A packet transfer method for a device interface transferring commands and data in packet format by serial transmission between a device and a host, the device interface including:
a receive FIFO configured to store on a first-in first-out basis a command packet or a data packet received from the host;
a command detector configured to detect the command packet stored in the receive FIFO during data transfer and to output a command detection signal;
a receive task file register configured to load the command content of the receive FIFO;
a send task file register configured to load a command or data for packet sending;
and a send FIFO configured to store on a first-in first-out basis the content of the send task file register and to cause a command packet or a data packet to be sent to the host;
the packet transfer method comprising:
an available time generation step generating an available time for receiving another command packet from the host during data transfer; and
a mid-transfer command processing step, when a command packet is received from the host during the available time, suspending the data transfer to decode the received command packet for execution of processing and thereafter to resume the data transfer;
wherein the mid-transfer command processing step comprises:
a suspend processing step, when the command detection signal is output from the command detector for the command packet received during the available time and stored in the receive FIFO, configured to suspend the currently executed data transfer and to save parameters upon the suspension into a memory;
a command decode step configured to decode the command content loaded from the receive FIFO into the receive task file register;
a data transfer abort step, when abortion of the data transfer is determined by the command decode step, configured to discard the currently executed command packet and the saved parameters and to terminate the data transfer; and
a transfer resume step, when continuance of the data transfer is determined by the command decode step, configured to throw the command content of the receive task file register into a command queue, to store command reception response information into the send FIFO, to send a command reception response packet to the host, thereafter to release the suspend of the data transfer and to set the saved parameters to resume the data transfer.

11. The packet transfer method according to claim 10, wherein the available time generation step includes detecting completion of the transfer of the data packet sent to or received from the host and generating the available time upon detecting the completion.

12. The packet transfer method according to claim 10, wherein the transfer resume step includes rewriting the data stored in the send FIFO upon suspending of data transfer into response data to the received command for transfer of a command reception response packet, and thereafter setting the saved parameters to resume the data transfer.

* * * * *